(12) United States Patent
Maceda et al.

(10) Patent No.: US 6,931,848 B2
(45) Date of Patent: *Aug. 23, 2005

(54) STIRLING ENGINE HAVING PLATELET HEAT EXCHANGING ELEMENTS

(75) Inventors: Joseph P. Maceda, Folsom, CA (US); Randall L. Peeters, Foresthill, CA (US); Felix F. Chen, Roseville, CA (US); Ross A. Hewitt, Sacramento, CA (US); Jackson I. Ito, Sacramento, CA (US); Kenneth P. Klaas, Carmichael, CA (US); John L. Grimes, Folsom, CA (US); Svein Hestevik, Holen (NO)

(73) Assignee: Power Play Energy L.L.C., Gold River, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/339,066

(22) Filed: Jan. 8, 2003

(65) Prior Publication Data

US 2003/0163990 A1 Sep. 4, 2003

Related U.S. Application Data

(63) Continuation of application No. 10/090,673, filed on Mar. 4, 2002, now Pat. No. 6,513,326.
(60) Provisional application No. 60/309,749, filed on Aug. 2, 2001, and provisional application No. 60/273,424, filed on Mar. 5, 2001.

(51) Int. Cl.[7] .................................................. F01B 29/10
(52) U.S. Cl. .......................................... 60/524; 60/517
(58) Field of Search ............................ 60/517, 524, 526

(56) References Cited

U.S. PATENT DOCUMENTS

| 3,994,136 A | * | 11/1976 | Polster ........................ 60/518 |
| 4,524,583 A | * | 6/1985 | Scheibengraber ............ 60/525 |
| 5,935,489 A | * | 8/1999 | Hershkowitz et al. ...... 252/373 |
| 6,051,331 A | * | 4/2000 | Spear et al. .................. 429/34 |
| 6,267,912 B1 | * | 7/2001 | Hershkowitz et al. ...... 252/373 |
| 6,513,326 B1 | * | 2/2003 | Maceda et al. ............... 60/517 |

* cited by examiner

Primary Examiner—Hoang Nguyen
(74) Attorney, Agent, or Firm—Bernhard Kreten

(57) ABSTRACT

The present invention provides heat exchanging elements for use in Stirling engines. According to the present invention, the heat exchanging elements are made from muliple platelets that are stacked and joined together. The use of platelets to make heat exchanging elements permits Stirling engines to run more effiecient because the heat transfer and combustion processes are improved. In one embodiment, multi-stage combustion can be introduced with platlets, along with the flexibility to use different types of fuels. In another embodiment, a single component constructed from platelets can provide the heat transfer rquirements betweeen the combustion gas/working gas, working gas in the regenerator and the working gas/coolant fluid of a Stirling engine. In another embodiment, the platelet heat exchanging element can recieve solar energy to heat the Stirling engine's working gas. Also, this invention provides a heat exchanging method that allows for multiple fluids to flow in opposing or same direction.

34 Claims, 32 Drawing Sheets

Platelet Stack

First Embodiment

Platelet Stack

First Embodiment

Top View

Section 3-3
Air Intake Paths/Layer

Section 4-4
Air Preheat Layer

Section 5-5
Combustion Layer

Section 7-7

Working Gas Expansion/Compression Layer

Platelet Stack

Second Embodiment

Top View

Section 10-10
Air Intake Paths/Layer

Section 11-11
Air Preheat Layer

Section 12-12
Combustion Layer

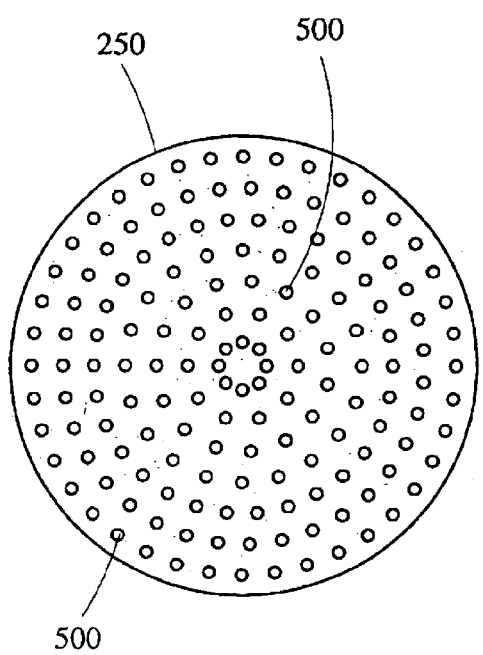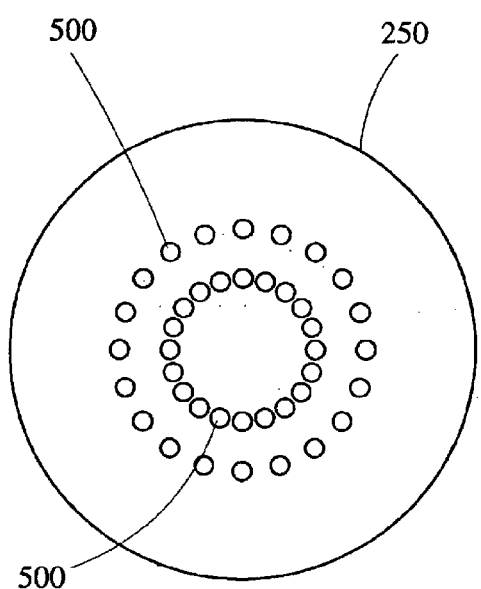
Section 13-13
Working Gas Expansion/
Compression Branched Layer
Fig. 13
Section 14-14
Working Gas Expansion/
Compression Layer
Fig. 14

Platelet Zones

Section 18-18

Section 20-20

Section 21-21

Section 22-22

STIRLING ENGINE HAVING PLATELET HEAT EXCHANGING ELEMENTS

This application is a continuation of Ser. No. 10/090,673 filed Mar. 4, 2002 now U.S. Pat. No. 6,513,326, which claims benefit of provision of 60/273,424 filed Mar. 5, 2001 and claims benefit of provision 60/309,749 filed Aug. 2, 2001.

FIELD OF THE INVENTION

The present invention relates to Stirling engines and more particularly to heat exchanging elements thereof which are formed of platelets.

BACKGROUND OF INVENTION

The basic concept of the Stirling engine dates back to the developments of Robert Stirling in 1817. Over the years, numerous applications for the Stirling engine have been investigated and evaluated. For example, one potential use of the Stirling engine is in automobiles and the like as a prime mover. In addition, the Stirling engine may be used as an engine power unit for hybrid electric applications. Other potential applications are the use of the Stirling engine as an auxiliary power unit and the use of the Stirling engine in marine applications and solar energy conservation applications.

Stirling engines have a reversible thermodynamic cycle and therefore can be used as a means of delivering mechanical output energy from a source of heat, or acting as a heat pump through the application of mechanical input energy. Using various heat sources, mechanical energy can be delivered by the engine. This energy can be used to generate electricity or be directly mechanically coupled to a load.

One of the disadvantages of current Stirling engines is their inefficiency due to the presence of dead volume of a working gas and the overall volumetric size of a burner device of the heat exchanging assembly. A heat transfer system utilizes heat transfer from the burner device to the working gas to cause a piston to be displaced as the working gas expands under heat and then compresses (contracts) upon cooling of the working gas. One conventional burner device is an apparatus in which air and fuel are injected into the burner device and then ignited to cause heat to be generated. The working gas is carried within a plurality of heater tubes, which are positioned proximate to the burner device so that heat is transferred from the burner device to the working gas flowing within the heater tubes.

One end of each heater tube is in communication with a piston chamber which houses one or more pistons and the heated, expanded working gas causes displacement of the one or more pistons within the piston cylinder. The one or more pistons are operatively connected to other working mechanical components for moving a drive member, such as a crankshaft, to cause mechanical energy to be delivered by the engine.

Because a single burner device is used to generate and effectuate heat transfer to the working gas flowing within a number of heater tubes, heat is often not evenly distributed to the working gas within the heater tubes. The burner device in conventional devices often has a length of 14 inches or greater for a 3-kilowatt Stirling engine and the length of each heater tube from the piston cylinder to a point proximate to the burner device is about 6 inches or more. The gas therefore must travel 6 inches up the heater tube and then 6 inches back down the heater tube to the piston cylinder after it has been heated. The associated disadvantage of such a system is that conventional heater tubes usually contain a dead volume of working gas. This refers to the volume of working gas that has not moved out of the heater tube during the expansion/compression combustion process. In other words, this constitutes a volume of stagnant working gas. This results in inefficient heat transfer from the burner device to the working gas and in turn leads to inefficient operation of the Stirling engine itself.

In addition, due to the typical size of the burner device, the burner device first heats a significant volume of air before heat transfer occurs to the working gas. This results in a considerable amount of energy being consumed before the working gas is heated and as a result, the working gas is exposed to less heat due to the inefficiencies of the burner device. In other words, a lot of the heat produced by the burner device does not get transferred to the working gas.

Accordingly, there is a continuing need to design a more efficient heat transfer manifold for use in a Stirling engine.

SUMMARY OF INVENTION

The present invention is directed to a heat exchange manifold for use in a Stirling engine. According to the present invention, the heat exchange manifold is provided using a platelet construction. More specifically, the heat exchange manifold is formed of multiple platelets that are stacked and joined together. A platelet device is a device, which is designed to control and manage fluid flow and is constructed of individual layers (called platelets). The platelet construction of the heat exchange manifold provides integrated fluid management (IFM), which advantageously permits the Stirling engine to run more efficient because the heat exchange and combustion process are improved.

The platelets have openings and conduits formed therein which are orientated relative to one another to form the elements of the heat exchange manifold. For example, the manifold includes a combustion chamber having fuel and air intake conduits for delivering fuel and air to the combustion chamber and an exhaust conduit for venting exhaust gases and the like from the combustion chamber. The manifold also includes a working gas circuit, which includes one or more working gas conduits, which are formed in the platelet manifold proximate to the combustion chamber so that heat is transferred from the combustion chamber to the working gas flowing within the working gas conduits.

This platelet construction advantageously permits precision fabrication of the conduits and combustion chamber in the manifold. This results in more efficient heat transfer to the working gas as the overall size of each individual combustion chamber and each working gas circuit is substantially reduced in comparison with conventional manifolds due to the design of the present invention. More specifically, instead of having one large burner device with one combustion chamber and 36 or so working gas circuits (heater tubes) per piston cylinder, the manifold of the present invention has a substantially greater number of individual combustion chambers, e.g., over 100 and preferably over 200 per piston cylinder, as well as over 100 hundred working gas circuits. As a result, the dimensions of each combustion chamber and each working gas circuit are substantially reduced and may be precisely tailored using platelet technology. This results in a reduction of dead volume in each working gas circuit, improved heat transfer from the combustion chamber to the working gas, and improved efficiency of the combustion process performed in the combustion chamber.

In another aspect of the present invention, platelet technology is used to incorporate the internal region of the Stirling displacer cylinder head end into a platelet stack, which provides multiple heat exchangers. In a first aspect, the cylinder head end has working gas channels and ports formed therein to permit the working gas to flow to and from the cylinder head end region. By forming the working gas channels in the head end, an even more effective and efficient heat transfer surface area is provided and this results in a more compact and lighter weight Stirling engine. In another aspect, the present invention provides an integrated structure in which all of the major parts of the head end of the Stirling cycle engine are integrated into one cylindrical platelet device. The use of very small platelet coolant passageways makes possible small, yet highly efficient heat exchangers. In other words and according to one embodiment, channeled platelet members are annularly arranged to form a piston chamber and also provide all of the heat exchangers for the head end.

In yet another aspect of the present invention, a multi-stage combustor for use in the Stirling engine is provided and may or may not include inter-stage cooling. The combustors of the present invention are able to reduce the emission of $NO_x$ by having a first combustor which operates at fuel rich or stoichiometric conditions (low $NO_x$ emission) and a second combustor which introduces secondary air to dilute the combustion gases and reduce the combustion temperature while maintaining the $NO_x$ emission at low levels. High system performance is still maintained.

In yet another embodiment, the head end of the Stirling engine includes a working gas heat exchanging plate which is bonded on top of a platelet manifold which is itself coupled to the head end of the piston cylinder. The platelet manifold includes a number of channels, which receive the working gas and serve to both distribute the working gas to the heat exchanging plate and also provide communication ports to the piston chamber, so that the working gas may flow into and out of the piston chamber. The heat exchanging plate has a number of heat transfer passageways to efficiently heat the working gas and to provide metal cooling capability. The heat exchanging plate is in fluid communication with the platelet manifold so that the heated working gas flows into and out of the channels of the manifold. The working gas is heated as it flows through the plate because one surface of the plate is in direct contact with the hot combustion gases formed during the combustion process and actually, the plate partially forms the combustion chamber.

A platelet air injector is provided and is a platelet manifold for unburned combustion air and acts to simultaneously cool the air manifold platelets and preheat the incoming combustion air. The platelet air injector has a number of swirler orifices formed therein for injecting air into the hot combustion gases as they flow from the combustion chamber. The air is aimed at an upper surface of the heat exchanging plate to enhance combustion mixing and aid in the heat transfer between the hot combustion gases and the plate. This embodiment utilizes multi-staged micro-combustion for burning the fuel rich gas to completion resulting in many advantages described hereinafter.

Other features and advantages of the present invention will be apparent from the following detailed description when read in conjunction with the accompanying drawings.

BRIEF DESCRIPTION OF THE DRAWINGS

FIG. 13 is a cross-sectional view taken along the line 13—13 of FIG. 8;

FIG. 14 is a cross-sectional view taken along the line 14—14 of FIG. 8;

DETAILED DESCRIPTION OF PREFERRED EMBODIMENTS

Referring to FIGS. 1–7, a heat transfer manifold for use in a Stirling engine is shown and indicated at 10. It will be appreciated and will be described in greater detail hereinafter, that the heat transfer manifold 10 is intended to be used with conventional type Stirling engines and the heat transfer manifold 10 is designed to replace the existing "hot end" of the Stirling engine. The term "hot end" is used herein to refer to the end of the Stirling engine which includes a heat transfer system. As previously mentioned, the hot end of a conventional Stirling engine generally includes an air inlet, a fuel inlet, exhaust means, a fuel/air mixing chamber, a burner device (combustion chamber) and a number of heater tubes, which carry the working gas, spaced around the burner device. Combustion of the fuel/air mixture within the burner device causes heating and expansion of the working gas. The working gas flows into and out of a piston cylinder which houses a displacer piston operatively connected to a working piston. As the gas expands, the displacer piston and working piston are displaced within the piston chamber.

Figure 1:
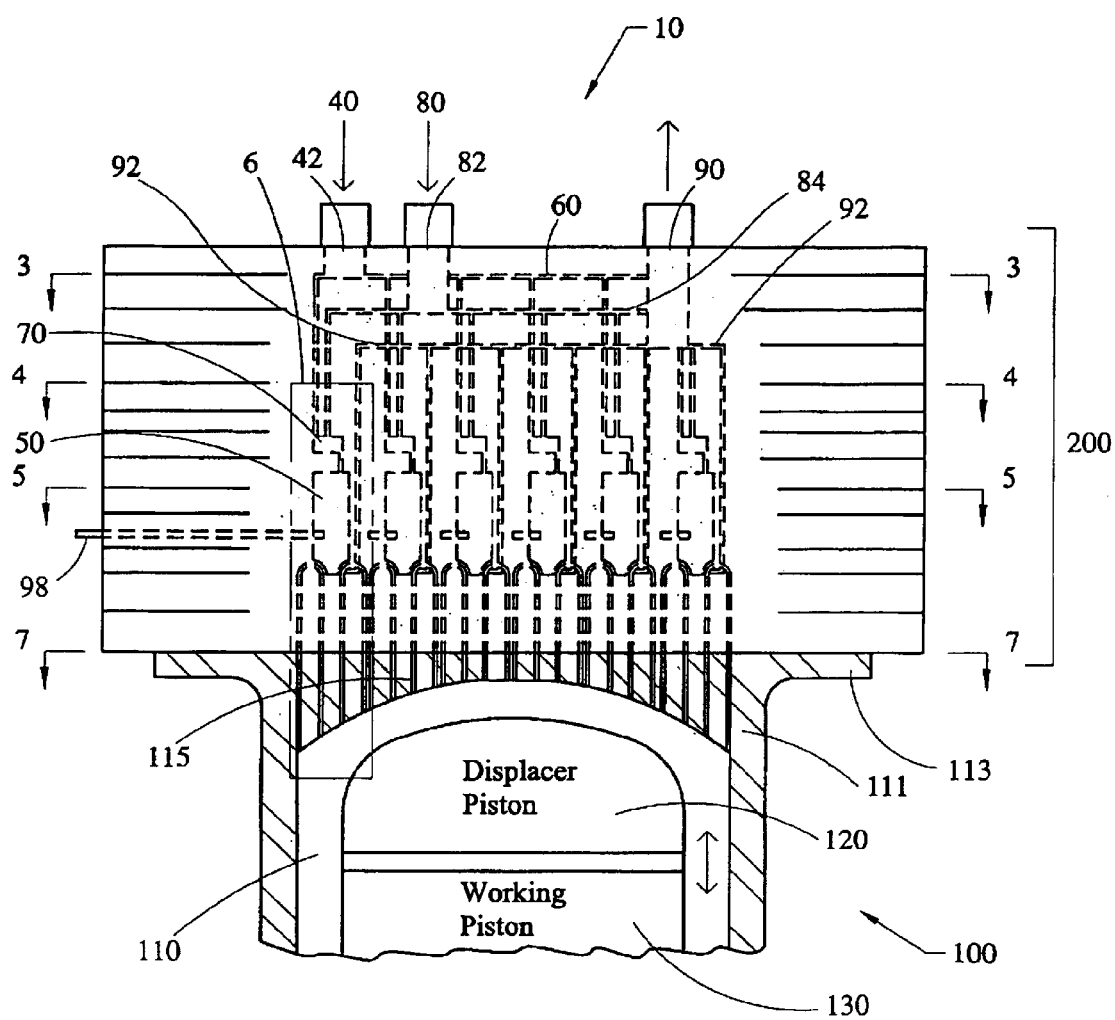
FIG. 1 is a schematic of a heat transfer manifold for use in a Stirling engine according to one embodiment.

According to the present invention, the heat transfer manifold 10 is designed to replace the burner device, heating tubes, and other related components of the heat transfer system of a conventional Stirling engine. The heat transfer manifold 10 shown in FIGS. 1–7 is preferably used in combination with one piston assembly, generally indicated at 100. The piston assembly 100 includes a piston cylinder 110, which houses a displacer piston 120 and a working piston, partially shown at 130. The displacer piston 120 is operatively connected to the working piston 130. Generally, the piston assembly 100 has an annular shape with the piston cylinder 110 being an annular cavity in which the displacer piston 120 and working piston 130 move in an axial direction therein. The end of the piston assembly 100 which faces and seats against the heat transfer manifold 10 typically has a heater head member 111. As shown in FIG. 1, the exemplary heater head member 111 partially encloses the piston cylinder 110 and also forms a flange 113, which extends outwardly from a wall of the piston cylinder 110. The flange 113 serves as a support surface for the heat transfer manifold 10. According to one aspect of the present invention and as will be described in greater detail hereinafter, the heater head member 111 has a number of openings 115 formed there through for providing fluid communication between the piston cylinder 110 and the heat transfer manifold 10.

Broadly, the heat transfer manifold 10 generates and transfers heat to a working gas which is in fluid communication with the piston cylinder 110 so that the expansion of the working gas within the piston cylinder 110 causes the displacer piston 120 and the working piston 130 to move in the axial direction away from the heat transfer manifold 10.

According to the present invention, the heat transfer manifold 10 is formed of a stack of platelets, generally indicated at 200, that have been joined together in any one of a variety of ways, such as diffusion bonding or brazing. Platelets are thin sheets of metal, metal alloys, ceramics, etc., which are joined to form a monolithic structure. The precise thickness of the platelet is not critical and typically, each platelet has an approximate thickness between 0.001 inch to about 0.040 inch.

Figure 2:
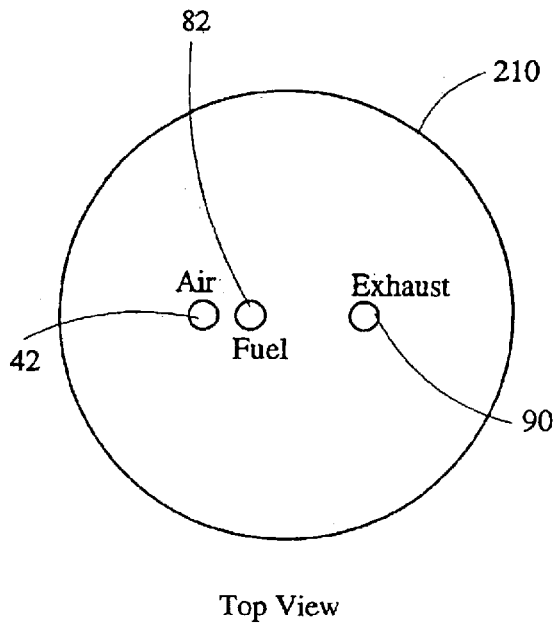
FIG. 2 is top plan view of the heat transfer manifold of FIG. 1.
Figure 3:
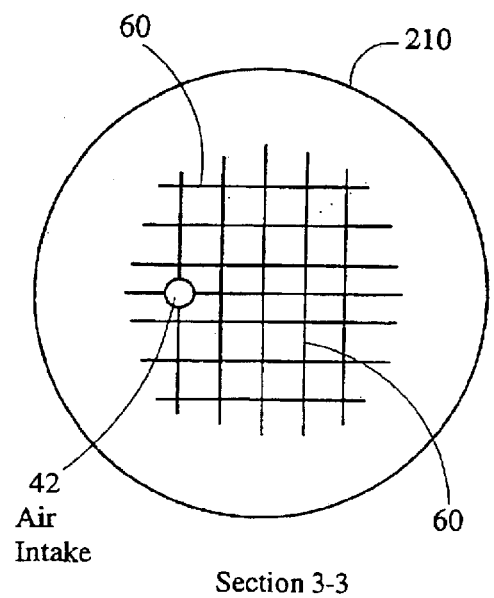
FIG. 3 is a cross-sectional view taken along the line 3—3 of FIG. 1.
Figure 4:
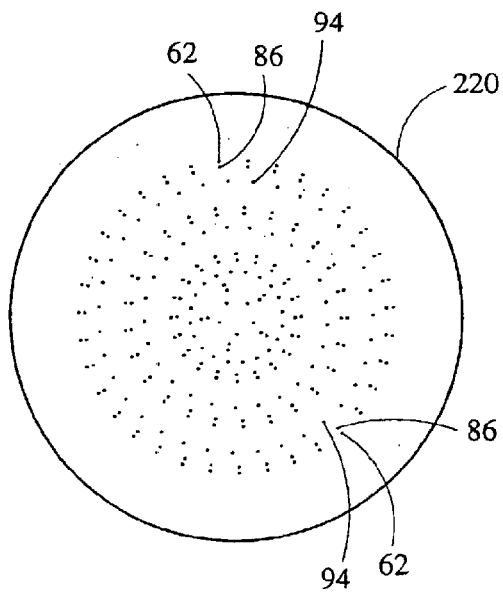
FIG. 4 is a cross-sectional view taken along the line 4—4 of FIG. 1.
Figure 6:
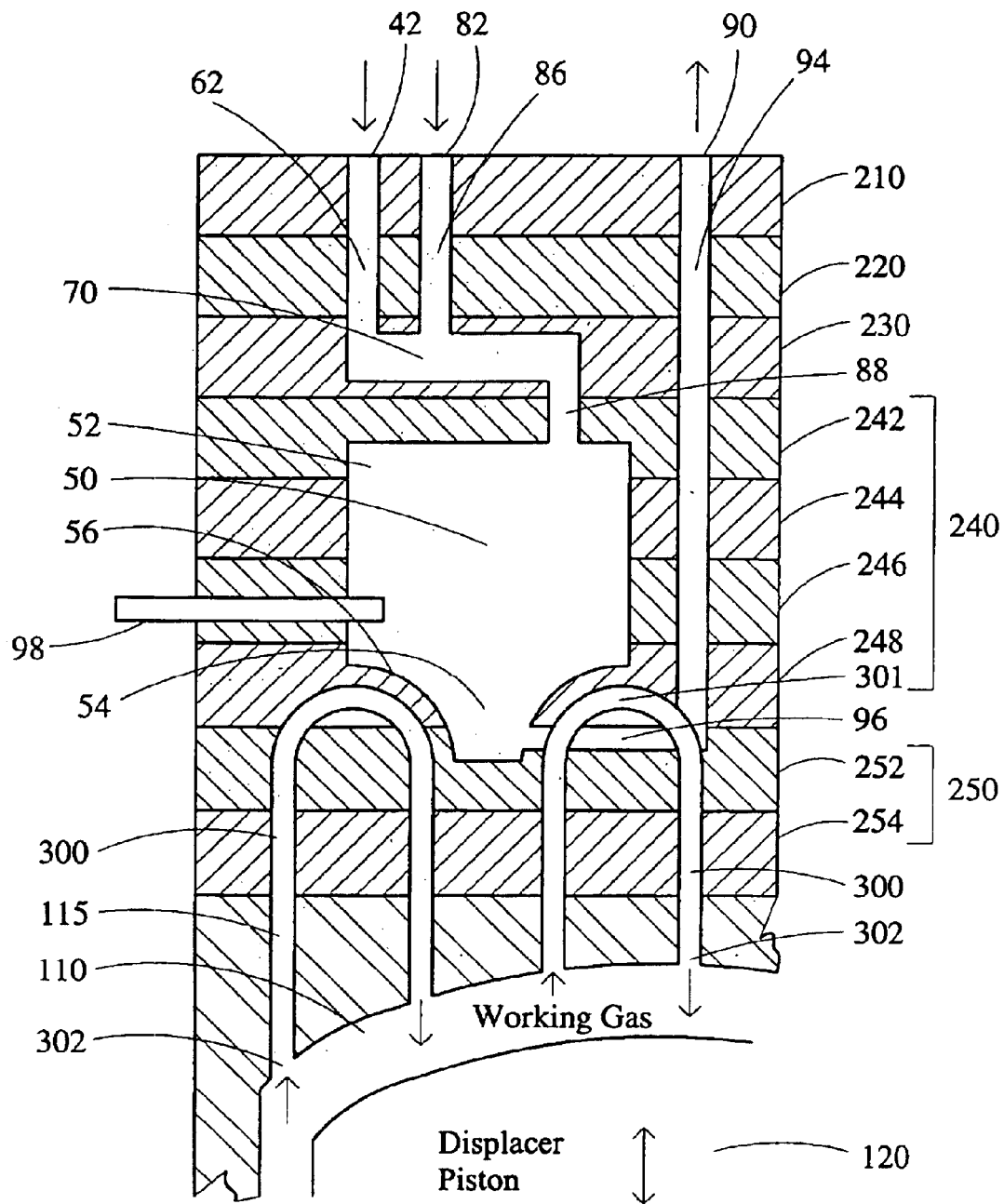
FIG. 6 is a cross-sectional view taken along the rectangle 6 shown in FIG. 1.
Figure 7:
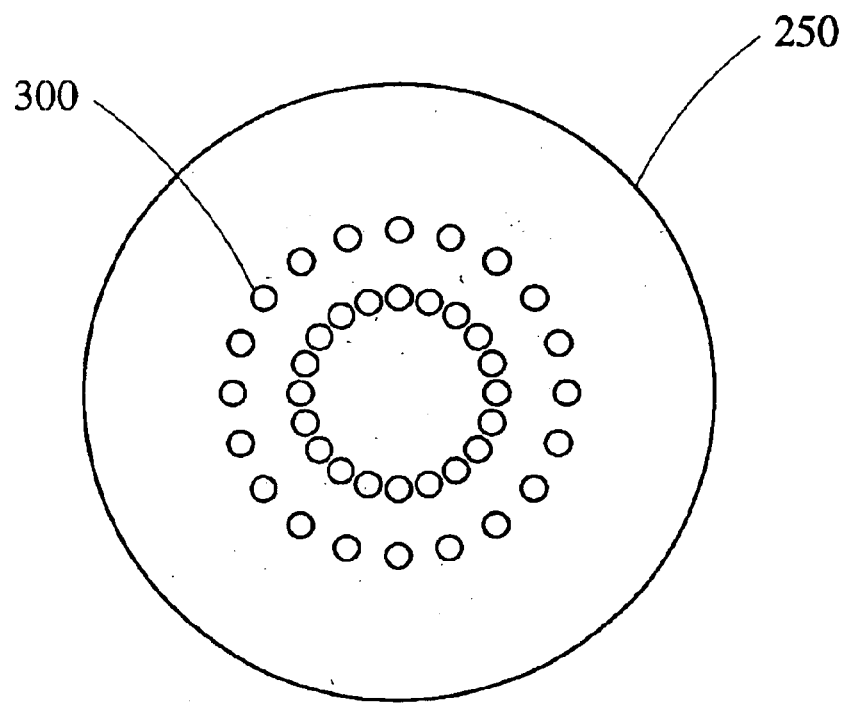
FIG. 7 is a cross-sectional view taken along the line 7—7 of FIG. 1.

The exemplary heat transfer manifold 10 includes an air inlet 40 which communicates with the surrounding environment outside of the heat transfer manifold 10 or may be connected to a supply of air or other gas which can be used to combust or catalyze the combustion of the fuel. As best shown in FIGS. 1, 2, and 6, the air inlet 40 is defined by an opening 42 formed in an air/fuel platelet zone 210, which comprises a plurality of platelets at one end of the heat transfer manifold 10. It will be understood that the plurality of platelets are stacked together such that like features are aligned. The air inlet 40 and more particularly, the opening 42 thereof is fluidly linked to a predetermined number of discrete combustion chambers 50 by a number of air intake conduits 60 which are formed in one platelet zone of the platelet construction 200. Preferably, the air intake conduits 60 are longitudinal conduits, which are formed in the air/fuel platelet zone 210 using suitable and known platelet technology. For example, the dimensions of the air intake conduits 60 may be concisely tailored to the precise application and may be formed so that dimensions of the air intake conduits 60 are substantially less than conventional air intake tubing and the like. Such precision in forming the air intake conduits 60 is possible because photo-etching technology permits the formation of air intake conduits 60 having reduced dimensions. It will be appreciated that the formation of the air intake conduits 60 and other structures mentioned hereinafter is not limited to using a photo etching process but rather other suitable techniques may be used, such as laser cutting, etc. A suitable description of a method of chemical etching is disclosed in U.S. Pat. No. 3,413,704, which is incorporated herein by reference.

The manufacture of platelet members is also described in U.S. Pat. Nos. 5,387,398; 5,455,401; 5,614,093; 5,683,828; 6,051,331; 5,858,507; 5,804,066; and 5,863,671, all of which are herein incorporated by reference.

As best shown in FIGS. 1 and 6, each combustion chamber 50 is in fluid communication with one of the longitudinal air intake conduits 60 by means of a second air intake conduit 62, which is preferably formed in multiple platelet zones of the platelet construction 200. One exemplary platelet construction 200 includes a plurality of stacked platelets including the air/fuel platelet zone 210, an air pretreat platelet zone 220, an air/fuel mixing platelet zone 230, and one more combustion platelet zones, generally indicated at 240, and an expansion/compression platelet zone 250. It will be understood that each platelet zone is actually formed of a number of stacked platelets. The second air intake conduit 62 is a vertical conduit which is preferably formed in the platelet zones 210, 220, 230 and includes a first end in fluid communication with one of the air intake conduits 60 and a second end which is in fluid communication with an air/fuel conduit 70.

Similarly, the heat transfer manifold 10 includes a fuel intake 80 having an opening 82 which is in fluid communication with the outside of the heat transfer manifold 10 to permit fuel to be delivered to the combustion device 50 through the opening 82. The opening 82 is formed in the air/fuel intake platelet zone 210 and is preferably spaced apart from the opening 42 of the air intake 40. The fuel intake 80 also has a number of fuel intake conduits 84 which are preferably formed in one layer of the platelet construction 200. Preferably, the fuel intake conduits 84 are longitudinal conduits which are formed in the air/fuel platelet zone 210. The fuel intake conduits 84 are formed within the platelet zone 210 at a different level than the air intake conduits 62 so that the fuel intake conduits 84 and the air intake conduits 62 do not cross-over and interfere with one another.

The fuel intake 80 also includes a second air intake conduit 86 which is a vertical conduit formed in the platelet zones 210, 220, 230 and includes a first end in fluid communication with one of the fuel intake conduits 84 and a second end which is in fluid communication with the air/fuel conduit 70. Thus, both air and fuel are delivered to the air/fuel conduit 70 which preferably comprises a longitudinal conduit formed in the air/fuel mixing platelet zone 230. An air/fuel inlet conduit 88 connects the air/fuel conduit 70 to one combustion chamber 50. In other words, the air/fuel inlet conduit 88 opens into the combustion chamber 50 for delivering the air/fuel mixture into the combustion chamber 50. In the illustrated embodiment, the air/fuel inlet conduit 88 is generally perpendicular to the air/fuel conduit 70 and generally parallel to the fuel intake conduit 84. It will be understood that all of the conduits forming the fuel intake 80 are preferably formed in the platelets using the above-mentioned formation techniques, e.g., photo-etching, laser cutting, etc.

As used herein, the term "fuel" refers to a material that is combusted to release heat energy. Any number of fuels may be used so long as they are suitable for use in the environments described herein. In other words, the fuel must be combustible under the conditions described herein and must generate sufficient heat energy to efficiently heat the working gas. The fuel may come in different forms and may for example be a liquid, solid or gas. One preferred fuel is natural gas, which is mixed with air in a predetermined ratio for the combustion of this mixture. Another fuel that is suitable for use is propane gas (or other types of carbon based gases) and yet another suitable fuel is diesel fuel. It will be understood that the above-listed fuels are merely exemplary and any number of other types of fuels may be used. When different fuels are used, the hot end may have to be slightly modified to permit proper introduction of the fuel into the combustion chamber 50. However, the versatility of platelets permits modifications to be easily made and also these new constructions can be made in stock platelets so as to tailor the construction for the given application. These slight modifications do not change the overriding physical principles as to how the Stirling engine of platelet construction operates.

Because a combustion reaction takes place in the combustion chamber 50, the heat transfer manifold 10 has an exhaust means incorporated into the platelet structure 200 for venting exhaust gases and the like. An exhaust port 90 is formed in the air/fuel intake platelet zone 210 and is open to the environment surrounding the heat transfer manifold 10. Similar to the openings 42 and 82, the exhaust port 90 is spaced apart from the openings 42, 82 and has an annular shape. A plurality of first exhaust conduits 92 are formed in one layer of the platelet construction 200. Preferably, the first exhaust conduits 92 are longitudinal conduits, which are formed in the air/fuel platelet zone 210. The first exhaust conduits 92 are formed within the platelet zone 210 at a different level than the air intake conduits 62 and the fuel intake conduits 84 so that the first exhaust conduits 92 do not cross-over and interfere with the other conduits formed in the platelet zone 210.

A second exhaust conduit 94 is provided in the form of a vertical conduit which is formed in the platelet zones 210, 220, 230, 240 and includes a first end in fluid communication with one of the first exhaust conduits 92 and a second end which is in fluid communication with an exhaust outlet conduit 96 which is itself in fluid communication with the combustion chamber 50. The second exhaust conduit 94 is thus formed in one or more platelets of the combustion platelet zone 240. In the exemplary embodiment, combustion platelet zone 240 is actually formed of four platelet zones 242, 244, 246, 248 with the exhaust outlet conduit 96 being partially formed in the bottommost combustion platelet zone 248. As the fuel burns within the combustion chamber 50, exhaust gas is produced and the exhaust system of the present invention provides a means for venting the exhaust gas from the combustion chamber 50. Exhaust gas from individual combustion chambers 50 is vented through the respective second exhaust conduit 94 into one of the first exhaust conduits 92 and then to the exhaust port 90 for venting to the surrounding environment.

It will be appreciated that the above-described exhaust system is merely exemplary in nature and the exhaust outlet conduit 96 may be formed in a number of different locations. For example, the exhaust outlet conduit 96 may communicate with the combustion chamber 50 at an upper section 52 thereof instead of a lower section 54 thereof, as shown in FIG. 6.

The combustion chamber 50 is thus designed to receive the fuel and air mixture which is then ignited using any number of suitable ignition devices 98 resulting in heat being generated as the fuel burns. For example, suitable ignition devices 98 include but are not limited to spark generating devices, electrostatic devices, and any number of other devices, which act to cause the selective ignition of the fuel in the combustion chamber 50. The ignition device 98 may communicate with the combustion chamber 50 in a number of different ways and for purposes of illustration only, FIG. 6 shows the ignition device 98 extending longitudinally through one of the combustion platelet zones 240 and into the combustion chamber So. It will be understood that the ignition device 98 may be formed vertically within the heat transfer manifold 10 so that the ignition device 98 extends through platelet zones 210, 220, 230, 240 and communicates with the upper section 52 of the combustion chamber 50.

Like the conduit elements of the heat transfer manifold 10, the combustion chamber 50 is formed in various platelets of the platelet construction 200 using traditional techniques, e.g., photo-etching. Platelet technology permits the combustion chamber 50 to be more precisely dimensioned and shaped for individual applications. Unlike in conventional Stirling engine designs, the heat transfer manifold 10 of the present invention has a multitude of combustion chambers 50 instead of just a single burner device. For example, in one embodiment, for each piston cylinder 110, there are over 200 combustion chambers 50 for causing the axial displacement of the displacer and working pistons 120, 130, and more particularly, in one embodiment, there are approximately 260 combustion chambers 50 per each piston cylinder 110.

Figure 15:
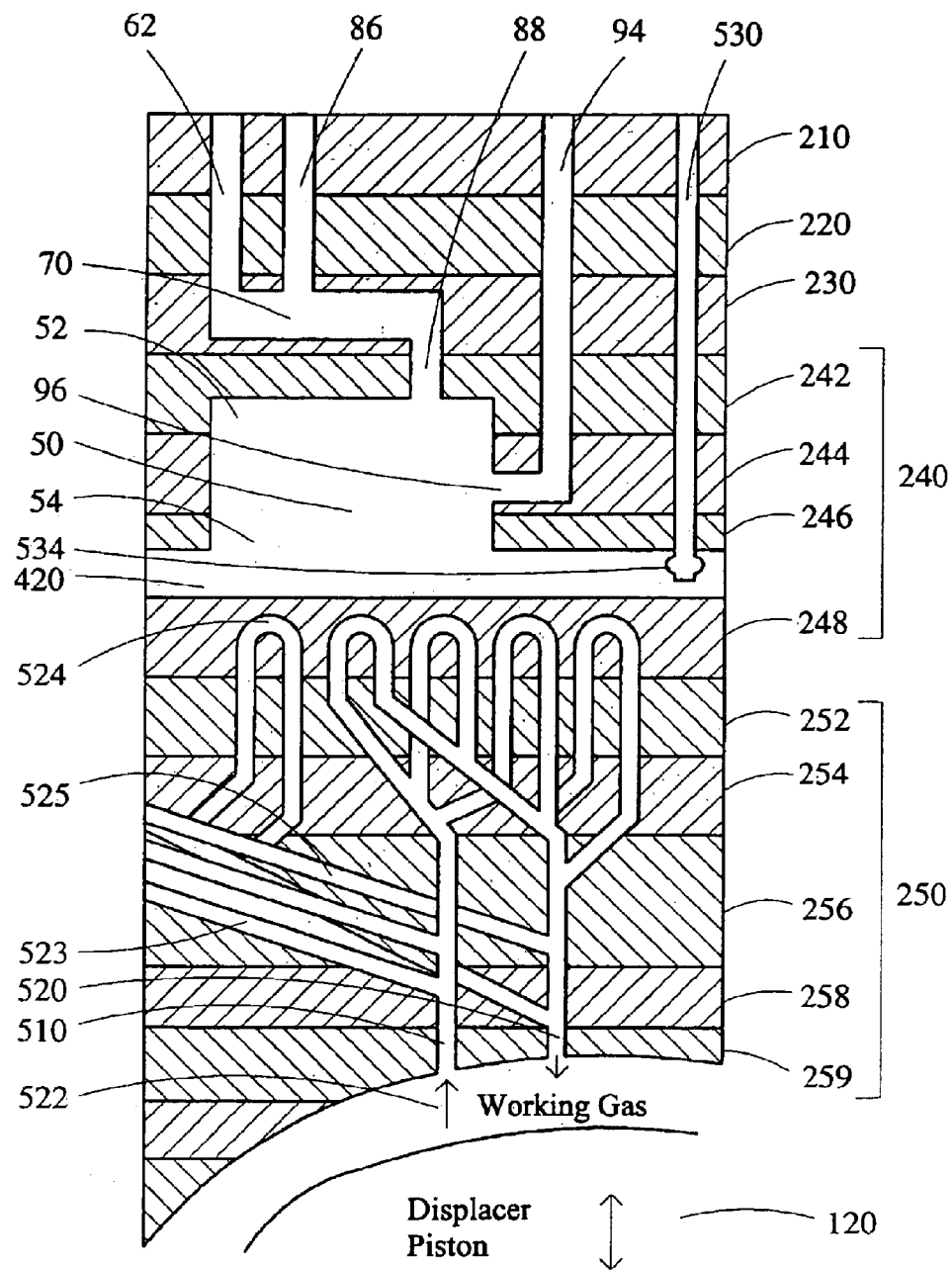
FIG. 15 is a cross-sectional view taken along the rectangle 15 shown in FIG. 8.

The exemplary combustion chamber 50, shown in FIGS. 15, is a generally annular member and includes the upper section 52 and the lower section 54 with the upper section 52 having a greater diameter than the lower section 54. As best shown in FIG. 6, the lower section 54 has an inward taper defined by an inwardly tapered wall 56. This results in the diameter of the lower section 54 being less than the diameter at the top section 52.

Figure 5:
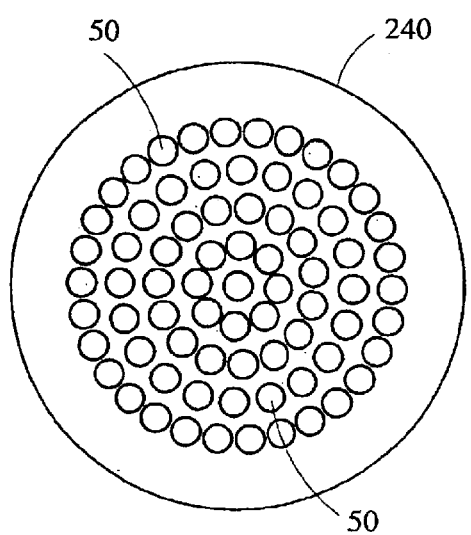
FIG. 5 is a cross-sectional view taken along the line 5—5.

As can be seen in FIG. 5 and in accordance with one embodiment, the combustion chambers 50 are formed in the heat transfer manifold 10 in a radial relationship so that a number of rings are formed. Unlike conventional burning devices, which typically have a length greater than about 14 inches, the combustion chamber 50 of the present invention has substantially reduced dimensions relative to conventional burner devices. According to the present invention, the combustion chamber 50 has a substantially reduced size relative to the conventional burning devices. For example, the height of the combustion chamber 50 is preferably only several inches, about 2 inches, for a 3-kilowatt engine. It will be appreciated that as the size of the Stirling engine increases, the size of the combustion chamber 50 will also change and in this case will increase correspondingly.

The heat transfer manifold 10 also includes working gas conduits 300 which carry the working gas, which is heated to cause the displacement of the pistons 120, 130 within the piston cylinder 110. Any number of types of working gases, which are suitable for use in Stirling engines, may be used in the present invention, including but not limited to helium gas. Each of the working gas conduits 300 is generally an U-shaped conduit formed in several platelets. In one embodiment, each working gas conduit 300 has a pair of open ends 302 which are in fluid communication with the piston cylinder 110 to permit the working gas to freely flow from the piston cylinder 110 and into any number of working gas conduits 300. An U-shaped bend 301 of the working gas conduit 300 is located proximate to one or more combustion chambers 50. In the embodiment shown in FIG. 6, the tapered second section 54 of the combustion chamber 50 is formed between adjacent working gas conduits 300. Because of the precision of platelet technology, the working gas conduits 300 can be formed relatively close to the combustion chamber 50. This results in more efficient heat transfer from the combustion chamber 50 to the working gas flowing within the working gas conduits 300 disposed around the combustion chamber 50. Advantageously, the platelet construction 200 permits the dimensions of the working gas conduits 300 to be reduced. For example, in conventional heater tubes, the working gas flows within the tube about 6 inches, to a location proximate the burner device before flowing back 6 inches to the piston cylinder. In the present invention, the working gas only flows about several inches within the working gas conduit before flowing back the same or similar distance to the piston cylinder 110. Because the length of the flow path of the working gas is substantially reduced, the amount of dead volume within the working gas conduit 300 is reduced. This results in more efficient flow of the working gas and as a result, the heat transfer efficiency is increased.

One will also appreciate that by providing a substantial number of combustion chambers 50 and working gas conduits 300 formed in the platelet structure 200, the deficiencies which were associated with the dead volume of the conventional burner design are eliminated or at least substantially reduced. Because the volume of the combustion chamber 50 is substantially less than the volume of a single burner device, the combustion is more efficient as less air is required to be heated for effective heat transfer through the platelet structure 200 to the working gas. This results in a cleaner combustion process and more efficient heating of the working gas. For a 3-kilowatt Stirling engine, the heat transfer manifold 10 may have a height between about 4 to about 6 inches. In any event, the height of heat transfer manifold 10 is considerably less than the height of conventional burner devices. It will be appreciated that as the size of the Stirling engine increases or decreases, the size of the heat transfer manifold 10 will also correspondingly increase or decrease.

As the working gas flowing within the working gas conduits 300 heats, it begins to expand. Because the ends 302 of the working gas conduits 300 are open and fluidly communicate with the piston cylinder 110, the expanding gas flows within the piston cylinder 110. The working gas serves as a working fluid, which causes the displacement of the displacer piston 120 and the working piston 130 within the piston cylinder 110.

In order for there to be no leaks between the heat transfer manifold 10 and the piston assembly 100, the platelet structure 200 is coupled to the piston assembly 100 such that a seal preferably results therebetween. It being understood that the open ends of the working gas conduits 300 are not sealed relative to the piston assembly 100 but rather are in direct fluid communication with the piston cylinder 110 by aligning the working gas conduits 300 with the channels 115. Thus, the number of and arrangement of channels 115 within the heater head member 111 corresponds to the number of and arrangement of working gas conduits 300. A seal between the heat transfer manifold 10 and the piston assembly 100, more particularly, the heater head member 111, may be formed using conventional techniques so long as the working gas conduits 300 and the channels 115 align with one another.

One of skill in the art will also appreciate that the Stirling engine has a "cold end" which is designed to provide among other things a cooling mechanism for cooling the heated working gas. While the heat transfer manifold 10 of the present invention is designed to serve as the "hot end" of the Stirling engine, the "cold end" may include any number of suitable cooling devices, which are designed for use as such in a Stirling engine. The cooling mechanism effectively withdraws heat from the working gas and thus causes compression of the working gas. While some of the energy of the working gas is used to displace the pistons 120, 130, there is still additional energy, which is to be withdrawn to cause the pistons 120, 130 to retract in the piston cylinder 110. The cooling mechanism is designed to withdraw this energy (heat) from the working gas.

The "cold end" of the Stirling engine also includes mechanical and electrical components, which operatively connect the piston assembly 100 to the drive portions of the Stirling engine. For example, one or more piston rods (not shown) typically extend through to the displacer and working pistons 120, 130 and are operatively connected to one or more connector rods (not shown). The one or more connector rods are disposed partially within the piston assembly 100 and also within a crank case (housing) which is connected to the piston assembly 100. The one or more connector rods are mechanically coupled to a crankshaft (not shown), which serves as a drive member. For example, the drive shaft may be connected to a generator (not shown).

The general details of the operation of a Stirling engine, including the "cold end" thereof, are described in U.S. Pat. Nos. 5,638,684; 4,481,771; 5,388,409; and 5,722,239, all of which are incorporated herein be reference.

The platelet structure 200 is formed by diffusion bonding, brazing, or other type of process. Diffusion bonding involves hot-pressing the platelets 200 together at elevated temperatures. The diffusion bonding causes grain growth between the platelets forming structure 200, thereby generating a monolithic structure with properties of the parent material. The platelets of structure 200 are formed of any number of suitable materials and preferably, the platelets are thin sheets of metal or metal alloys, such as copper, stainless steel, aluminum, nickel, titanium, and niobium. In addition, the platelets may be formed from ceramic materials.

Other details of suitable platelet materials and manufacturing details are disclosed in the previously incorporated U.S. Pat. Nos. 5,387,398; 5,455,401; 5,614,093; 5,683,828; 6,051,331; 5,858,507; 5,804,066; and 5,863,671.

While each of the platelets may have the same or similar width, it will be appreciated that the platelets do not need to have a generally uniform width and any one of the platelets may have a width greater or less than the width of the other platelets. In one exemplary embodiment, each platelet has a thickness of approximately 0.020 inch. The platelets are also not limited to an annular shape but rather may have any number of shapes, including rectangular or oval shapes. However, it will be understood that the platelet may have other thickness depending upon the precise construction and application.

It will also be understood that the present invention is not limited to the arrangement of working gas conduits 300 and combustion chambers 50 shown in FIGS. 2–5. These arrangements are merely exemplary in nature and illustrate one embodiment of the present invention.

Referring now to FIGS. 8–15, a heat transfer manifold according to a second embodiment is shown and indicated at 400. The heat transfer manifold 400 is similar to the heat transfer manifold 10 and therefore like elements are numbered alike.

The heat transfer manifold 400 includes a platelet structure 410 defined by the air/fuel intake platelet zone 210, the air preheat platelet zone 220, the air/fuel mixing platelet zone 230, the combustion platelet zone 240, and the working gas expansion/compression platelet zone 250. In this embodiment, the combustion platelet zone 240 is actually formed by first, second, third, and fourth combustion platelet zones 242, 244, 246, 248, respectively. In addition, the working gas expansion/compression platelet zone 250 is defined by first, second, third, and fourth platelet zones 252, 254, 256, and 258.

Like the platelet structure 200, the stack of platelets 410 are joined together to form a single monolithic structure. The stack of platelets 410 has a shape which is generally complementary to the shape of the piston cylinder 110 and accordingly, in this one embodiment, the stack of platelets 410 has a generally annular shape. The manifold 400 includes the air intake 40, the fuel intake 80, and the exhaust system 90, 92, 94, 96.

Figure 8:
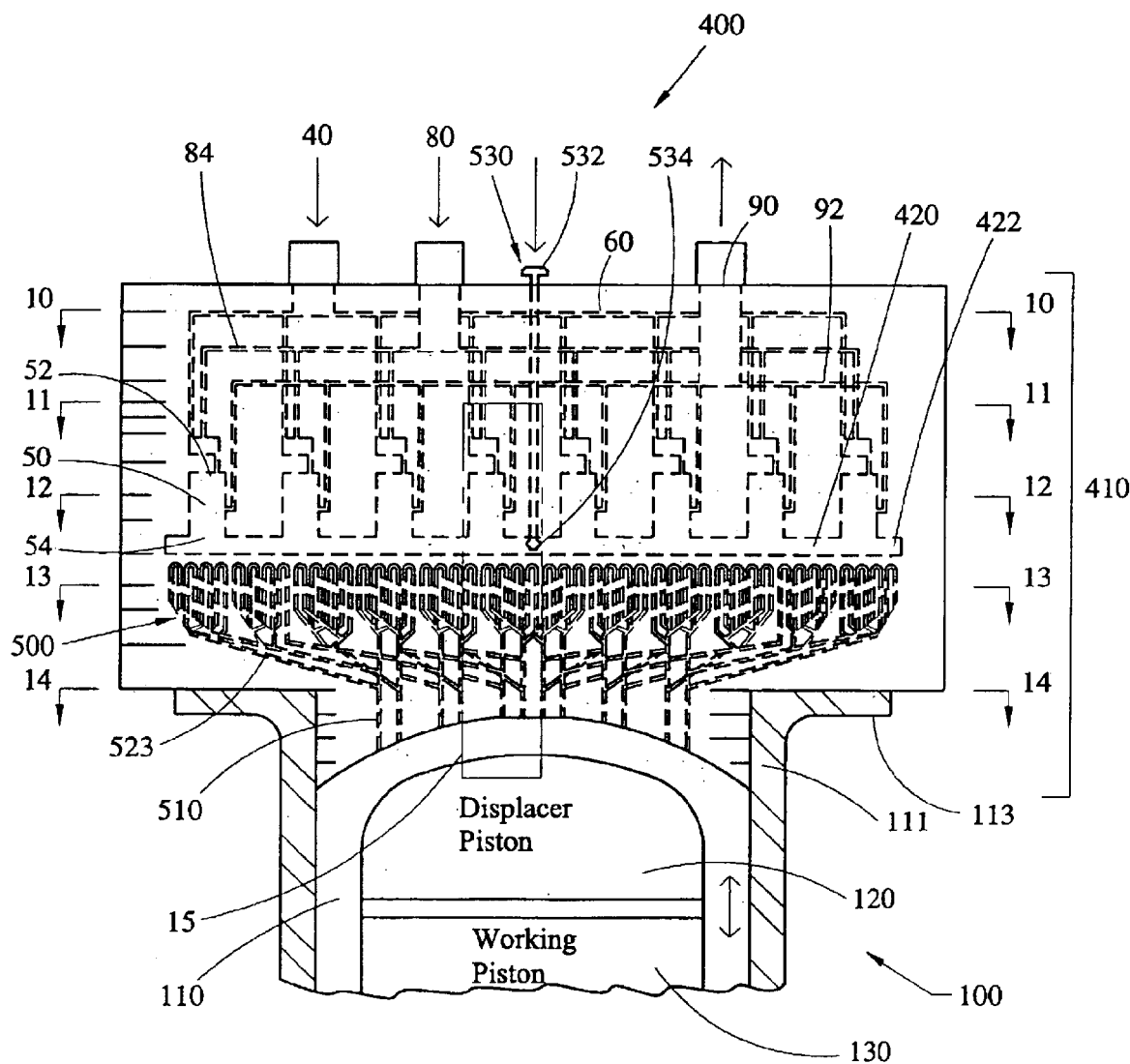
FIG. 8 is a schematic of a heat transfer manifold for use in a Stirling engine according to another embodiment.

In this second embodiment, the combustion chamber 50 is modified so that a series of combustion chambers 50 formed in the manifold 400 are connected to one another by a combustion connector conduit 420. The combustion connector conduit 420 is preferably in the form of a longitudinal conduit formed in one of the platelets of the combustion platelet zone 240. For example, the combustion connector conduit 420 may be formed in the third combustion platelet zone 246. As best shown in FIG. 8, the combustion connector conduit 420 has opposing closed ends 422 with the conduit 420 communicating with a number of combustion chambers 50 therebetween. For example, each lower section 54 of one combustion chamber 50 opens into a portion of the combustion connector conduit 420 to permit heat generated within the combustion chamber 50 to be transferred to the combustion connector conduit 420. The combustion connector conduit 420 permits heat to be distributed over a greater area of the platelet structure 400 so that heat is effectively and efficiently transferred to the working gas flowing within working gas conduits 500.

In the second embodiment, each working gas conduit 500 is defined by a series of branched tortuous pathways in which the working gas enters the conduit 500 through an inlet 510 and exits the conduit through an outlet 520. The flow of the working gas is generally indicated by the directional arrow 522. The conduit 500 has a number of U-shaped bends 524 which partially define the tortuous flow path of the working gas. The U-shaped bends 524 are formed in the combustion platelet zone 240 (e.g., the fourth combustion platelet zone 246). By positioning a multitude of U-shaped bends 524 near the combustion chambers 50 and the combustion connector conduit 420, the working gas flowing within these U-shaped bends 524 is more effectively heated by the heat generated in the combustion chambers 50 and present in the combustion connector conduit 420. In other words, by branching the conduit 500 into a number of pathways with portions (U-shaped bends 524) disposed in close proximity to one combustion chamber 50 and the conduit 420, the volume of gas exposed to the heat is increased, leading to more efficient heating thereof. After the working gas has been heated, the gas flows through the outlet 520 and into the piston cylinder 110 for displacement of the displacer piston 120.

As shown in FIG. 8, the working gas conduits 500 may have a number of connecting conduits 523 which permit inlet/outlet conduits 510 to feed working gas to a plurality of working gas conduits 500 which are positioned proximate to a plurality of combustion chambers 50. A number of inlet/outlet conduits 510 also provided the path for the working gas to enter and exit the piston cylinder 110.

The manifold 400 also includes an ignition device 530, which causes the fuel to selectively ignite resulting in the generation of heat. In one exemplary embodiment, the ignition device 530 has a first end 532, which extends beyond a top surface of the platelet zone 210 and an opposing second end 534, which is positioned within the combustion connector conduit 420. The ignition device 530 is formed in the platelet structure 410 from the outermost platelet 210 to the platelet having the combustion connector conduit 420 formed therein, e.g., third combustion platelet zone 246. Upon actuation of the ignition device 530, the second end 534 ignites the fuel/air mixture using known techniques, such as generating a spark or the like. The actuation of the ignition device 530 thus causes the ignition of the fuel/air mixture present in the combustion chambers 50 and the combustion connector conduit 420.

Figure 9:
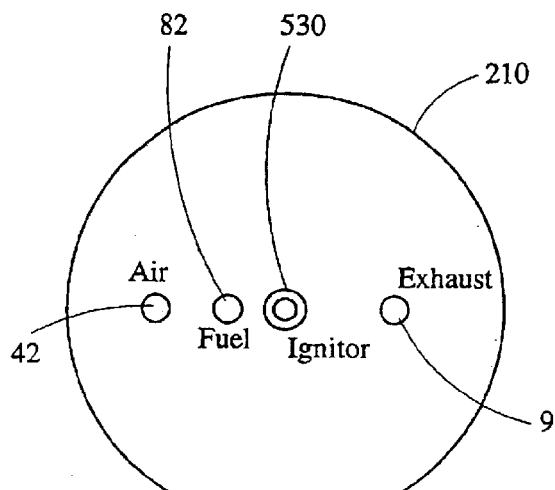
FIG. 9 is a top plan view of the heat transfer manifold of FIG. 8.
Figure 10:
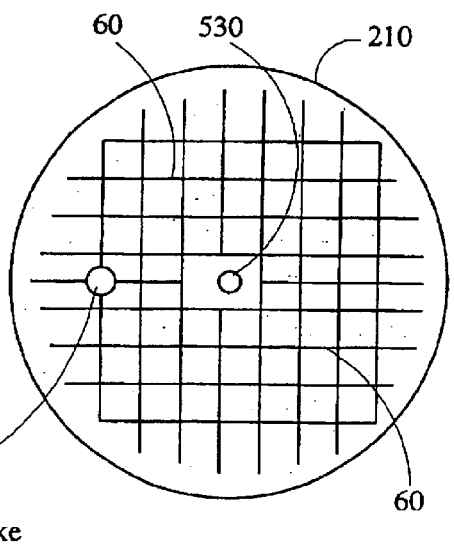
FIG. 10 is a cross-sectional view taken along the line 10—10 of FIG. 8.
Figure 11:
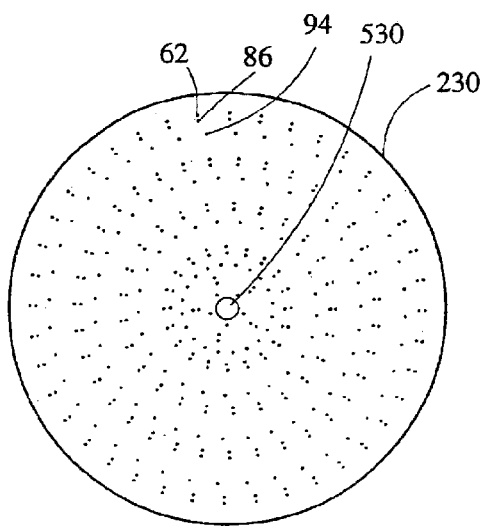
FIG. 11 is a cross-sectional view taken along the line 11—11 of FIG. 8.
Figure 12:
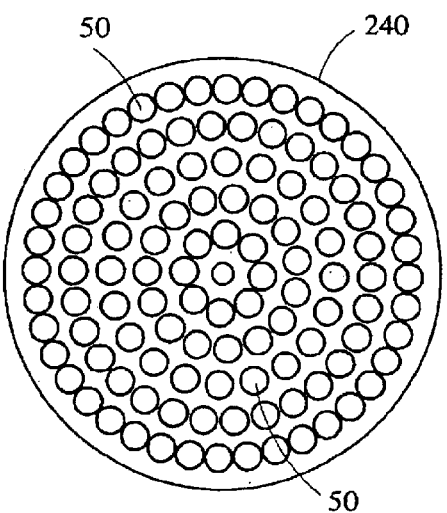
FIG. 12 is a cross-sectional view taken along the line 12—12 of FIG. 8.

FIG. 9 shows a top plan view of the manifold 400 of the second embodiment. FIGS. 10–15 show various cross-sectional views of the manifold 400.

Accordingly, the present invention teaches in one aspect the replacement of the traditional "hot end" assembly of the Stirling engine with a heat transfer manifold 10 formed of a stack of platelets. As one of skill in the platelet technology understands, each platelet is crafted so that upon stacking and joining the platelets together, openings and conduits formed therein are properly orientated to form a single monolithic structure, which functions as a heat transfer manifold 10.

Advantageously, the use of platelet technology permits the heat transfer manifold 10 of the present invention to be formed of a series of interrelated integrated fluid management (IFM) platelets. By incorporating the present heat transfer manifold 10 into the Stirling engine, improvements are seen in the combustion process and the overall efficiency of the engine because of improved heat transfer.

Figure 16:
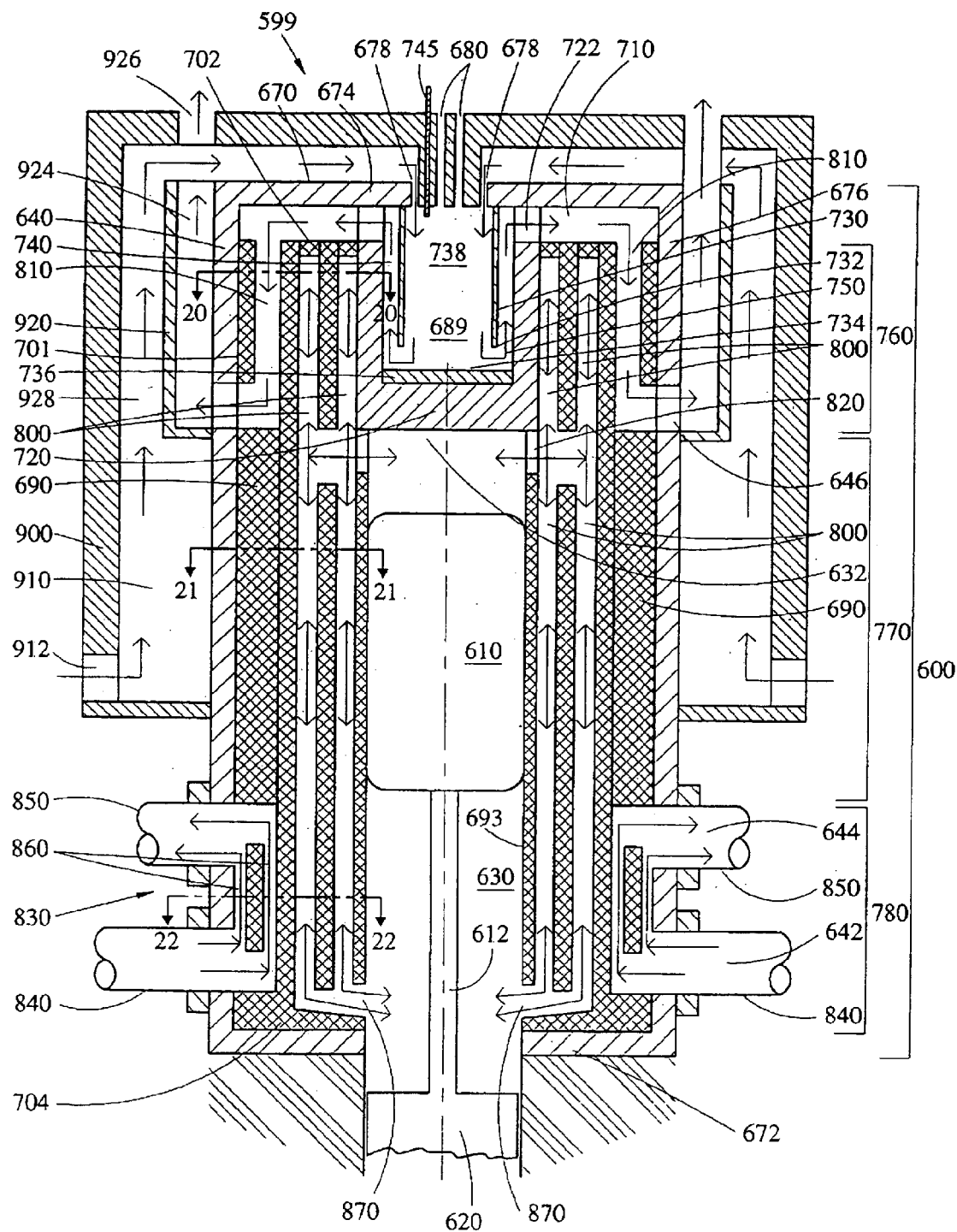
FIG. 16 is a cross-sectional schematic view of a heat exchange member incorporating a displacer cylinder head end of a Stirling engine.

Referring to FIG. 16, a hot end of a Stirling engine is generally indicated at 599 and includes a heat transfer platelet member 600. As with other Stirling engine designs, the present invention includes a displacer piston 610 and a working piston 620. The displacer piston 610 and the working piston 620 are operatively connected to one another using conventional methods, including providing a crank 612 connecting the pistons 610, 620. The crank 612 is typically operatively connected with or forms a part of a flywheel assembly (not shown). In addition, a Stirling engine typically has a generator (not shown), which is operatively connected to the crank 612. As one of skill in the art understands, a working gas is provided in a Stirling engine and the thermal heating and cooling of this working gas causes movement of the displacer piston 610 and the working piston 620. The displacer piston 610 actually serves to move or shuttle the working gas around the working areas of the Stirling engine. Because of the interconnection between the displacer piston 610, the crank 612, the working piston 620 and the flywheel and the generator, the movement of one component translates into movement of the other components. More specifically and as will be described in greater detail hereinafter, movement of the displacer piston 610 causes energy to be supplied to the flywheel and the generator in addition to the working piston 620.

In this embodiment, a piston chamber 630 is defined by the platelet member 600 itself. The piston chamber 630 has a first end 632 and a second end (not shown) with the displacer piston 610 being disposed near the first end 632 and the working piston 620 being disposed between the displacer piston 610 and the second end.

According to the present invention, the platelet member 600 incorporates both the hot end and the cold end of the heat exchanging components of the Stirling engine and also incorporates the displacer cylinder head end into its design. The platelet member 600 is formed using platelet technology and more specifically, it is formed of a stack of platelets that have been joined together in any of a variety of ways, such as diffusion bonding and brazing. As previously-mentioned, platelets are thin sheets of metal, metal alloys, ceramics, etc., which are joined to form a monolithic structure. The precise thickness of the platelet is not critical and typically, each platelet has a thickness between about 0.001 inch to about 0.040 inch.

In this embodiment, the platelet member 600 includes a number of channeled platelet heat exchanger elements, which are inserted into a housing 640. The housing 640 in one embodiment resembles a pressure vessel surrounding the platelet member 600 and is preferably, a high pressure capable conventionally machined metal housing 640. Typically, the housing 640 has a generally annular shape. The housing 640 has one or more coolant inlets 642 and one or more coolant outlets 644 formed in a side thereof. In addition, the housing 640 has one or more combustion gas outlets 646 formed in a side thereof. The housing 640 has a first end 670 and an opposing second end 672. The first end 670 is generally associated with the hot end of the platelet member 600 and the second end 672 is generally associated with the cold end of the platelet member 600.

The first end 670 is essentially closed with an end wall 674, which is integral with an annular sidewall 676 of the housing 640. The wall 674 does have a number of openings or ports formed and more specifically, the wall 674 has a plurality of air inlets 678 and a plurality of fuel inlets 680 formed therein. Preferably, the number of inlets 678, 680 and the dimensions of each are configured so that a mixture of 40% air and 60% fuel is introduced into a combustion chamber 689.

Figure 17:
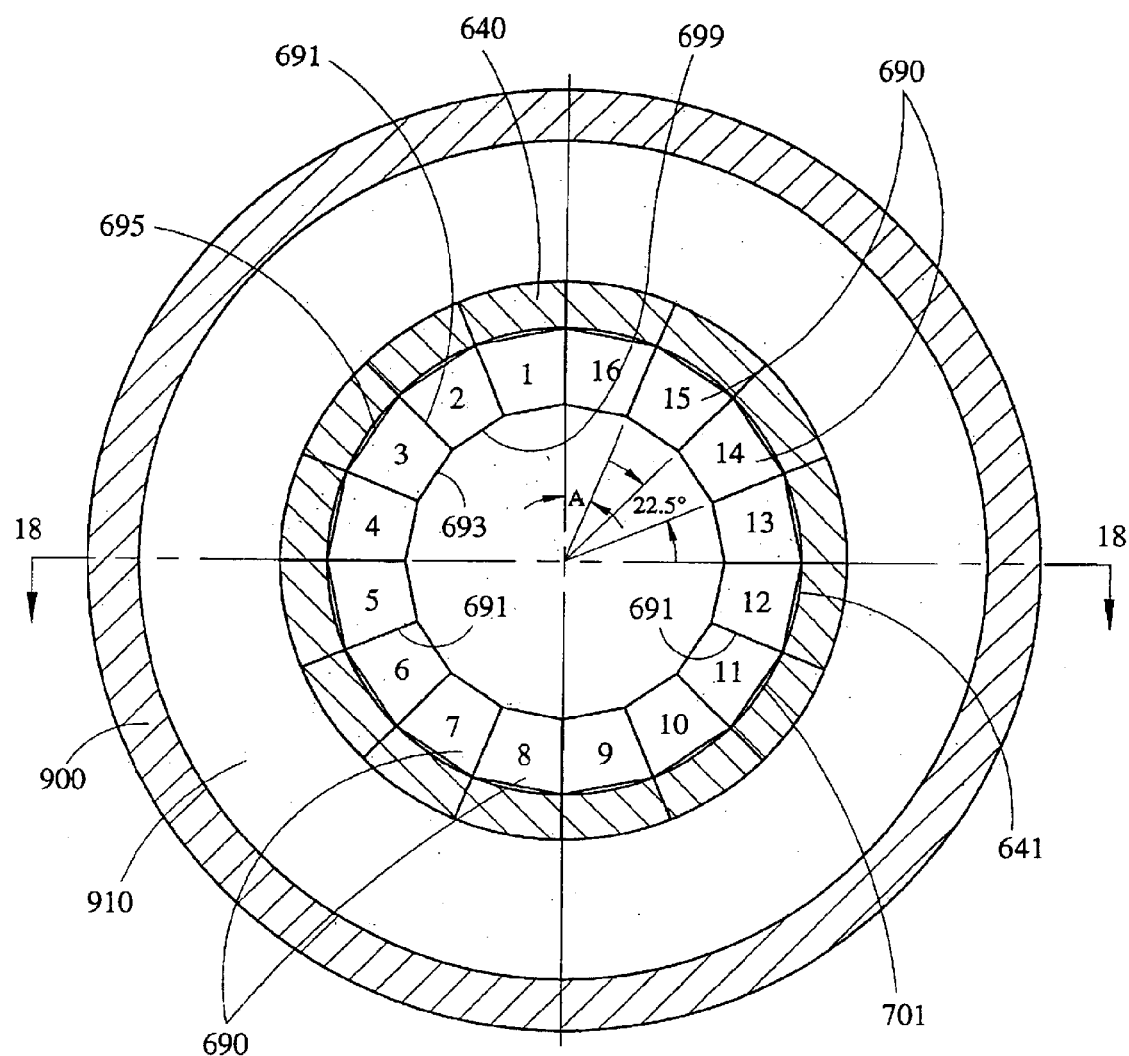
FIG. 17 is a simplified top plan view of channeled platelet heat exchangers, which incorporates the piston cylinder and head end of the Stirling engine and is inserted into a housing.
Figure 18:
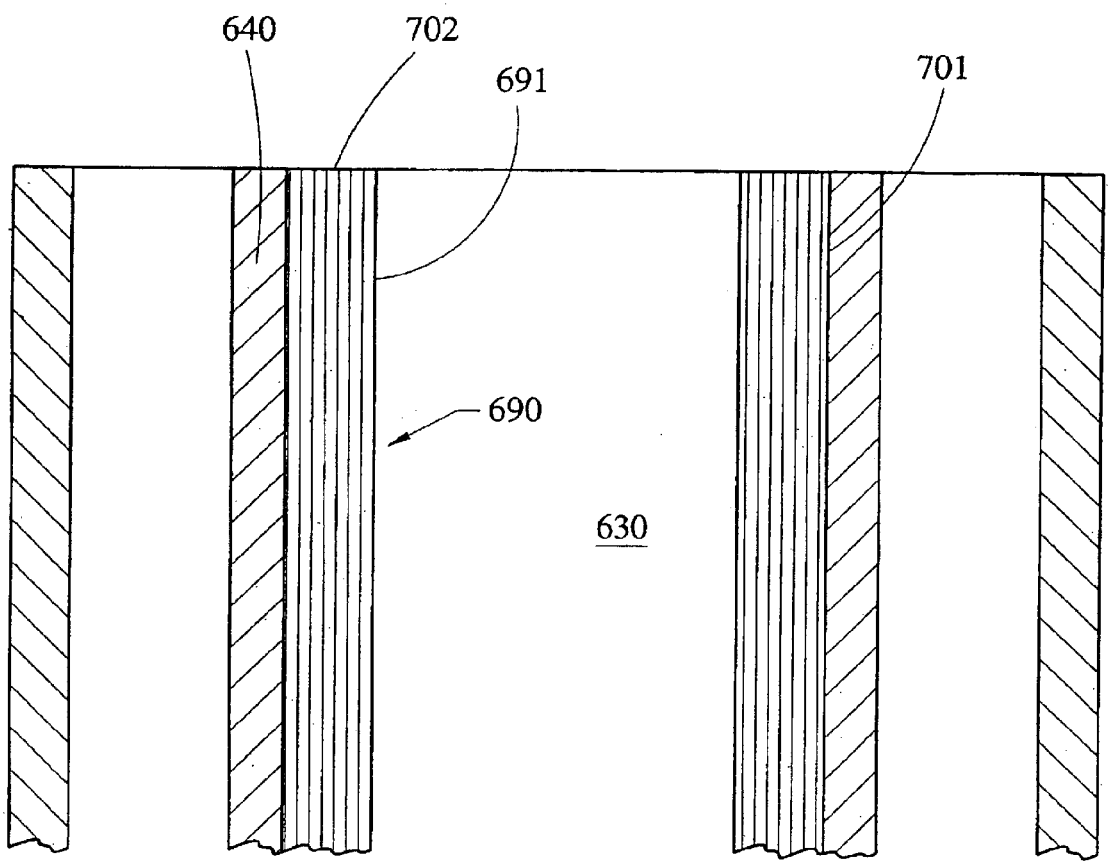
FIG. 18 is a cross-sectional view taken along the line 18—18 of FIG. 17.
Figure 19:
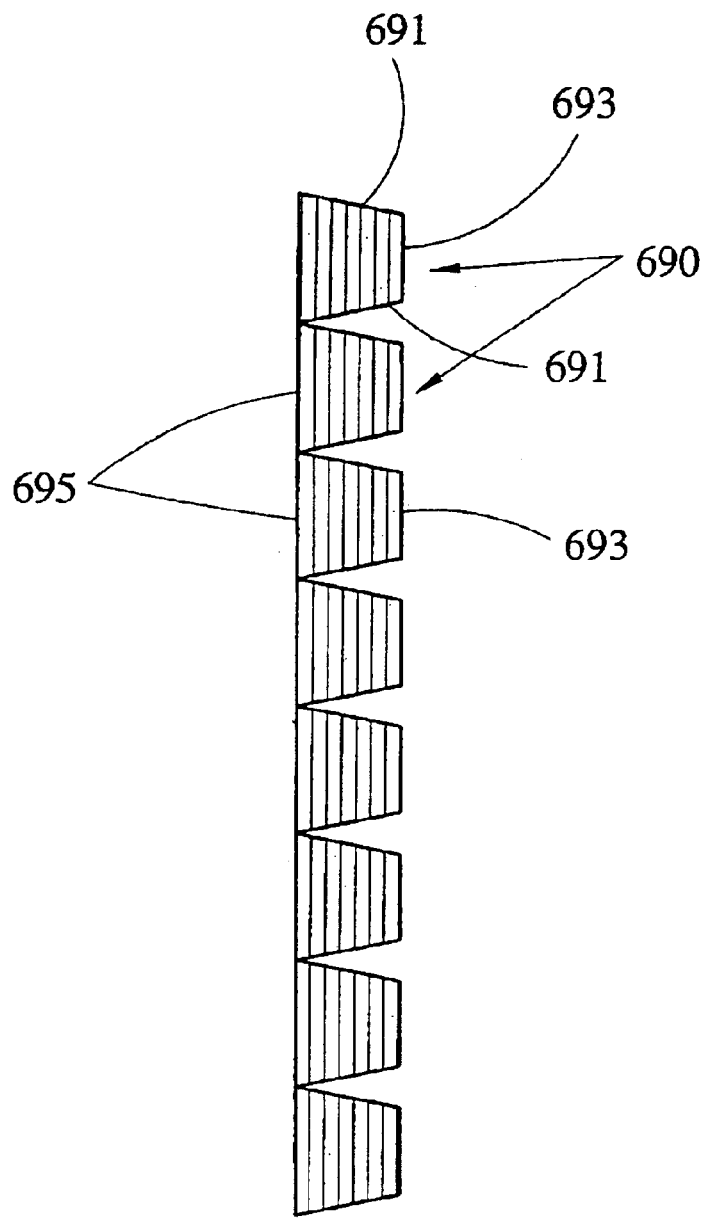
FIG. 19 is a fragmentary top plan view of the channeled heat exchangers of FIG. 17 shown in an extended, unwound position.

Referring now to FIGS. 16–19, the platelet member 600 preferably is formed of channeled heat exchanging elements, which are each generally indicated at 690 in FIGS. 17 and 19. As best shown in FIG. 19, each channeled heat exchanging element 690 is formed of a stack of platelets. The platelet layers shown in FIG. 19 are for purposes of illustration only and it will be appreciated that each platelet element 690 preferably includes a number of stacked platelets much greater than the number of stacked platelets shown in FIG. 19. Each platelet element 690 has a generally trapezoidal cross-sectional shape including opposing side faces 691 along with an inner face 693 and an outer face 695. The inner face 693 has a smaller surface area than the outer face 695.

FIG. 19 shows the channeled platelet elements 690 in an elongated position. Because of the corrugated nature of the elements 690, the elements 690 may be manipulated so as to form an annular member as shown in FIG. 17. In the exemplary embodiment shown, the corrugated structure contains sixteen (16) individual elements 690. When the elements 690 are manipulated to form the annular structure, side faces 691 of the elements 690 engage one another so that no gaps are present between the side faces 691 of the elements 690. The inner faces 693 form an inner annular surface, generally indicated at 699, and the outer faces 695 form an outer annular surface, generally indicated at 701. Preferably, the inner annular surface 699 is a smooth surface and in fact, the inner annular surface 699 defines the piston chamber 630. FIG. 18 is a cross-sectional view taken along the line 18—18 of FIG. 17, showing opposing platelet elements 690 and also shows that each individual element 690 is formed of a plurality of platelets.

FIG. 17 also shows that the channeled platelet elements 690 are disposed within the housing 640 such that the outer annular surface 701 seats against an inner surface 641 of the housing 640. For purpose of illustration only and not limitation, an angle A formed defined by converging planes that contain the side faces 691 is about 22.5°. It will be understood that this angle is merely exemplary and depending upon the number and size of each of the elements 690, the angle will vary. The number of individual platelet elements 690 which form the overall corrugated shape of the channeled platelet structure will depend upon a number of factors, including the dimensions of each individual platelet element 690 and the diameter of the housing 640 along with the desired diameter of the piston chamber 630 which is actually defined by the channeled platelet elements 690.

The platelet elements 690 each have a first end 702 and an opposing second end 704 and are elongated structures which extend from or near the second end 672 of the housing 640 to or near the first end 670 of the housing 640. As best shown in FIG. 16, there is preferably a space 710 between the first end 702 of the elements 690 and the end wall 674 of the housing 640. The combustion chamber 689 is defined by a combustion member 720. The combustion member 720 is preferably an annular member having the combustion chamber 689 formed in a central portion thereof. The combustion chamber 689 is thus an annular space where combustion of air and fuel occurs resulting in heat being generated. In one embodiment, the combustion member 720 is connected to the end wall 674 and thus forms a part of the housing 640. In this embodiment, there are a plurality of radial openings, generally indicated at 722, which define fluid passageways for gas to flow from the combustion chamber 689 to the first ends 702 of the platelet elements 690.

It is within the scope of the present invention, that the combustion member 720 may be formed so that it is a part of the platelet member 600. In this instance, the combustion chamber 689 is formed within the combustion member 720 using platelet technology. In yet another embodiment, the combustion member 720 may be formed of platelets but be a separate member from the channeled platelet elements 690. In this embodiment, the combustion member 720 is coupled to the platelet elements 690 using any suitable technique, including platelet diffusion bonding techniques. In this embodiment, the radial openings 722 are eliminated and instead, an annular space is formed between the first end of the combustion member 689 and the end wall 674.

Preferably, an annular baffle 730 is connected to and extends from the end wall 674 of the housing 640 into the combustion chamber 689. The annular baffle 730 has an end 732 which is spaced from a lower region 734 of the combustion chamber 689. The annular baffle 730 thus partitions the combustion chamber 689 into a first section 738 and a second section 740 with the first section 738 being located within the annular baffle 730 and the second section 740 being located between the annular baffle 730 and the combustion member 720. The air inlets 678 and the fuel inlets 680 are formed in the end wall 674 such that they communicate with the first section 738. Thus, air and fuel are introduced into the first section 738 of the combustion chamber 689. The air and fuel are introduced into the combustion chamber 689 using conventional devices, e.g., an injector. An insulation material 736 may be inserted into the lower region 734 of the combustion chamber 689.

An ignition device 745 is provided and preferably extends through the end wall 674 and into the first section 738. One suitable ignition device 745 is a spark plug device, which upon actuation generates a spark within the first section 738 while air and fuel are being introduced through the inlets 678, 680, respectively. As previously mentioned, a fuel rich mixture is preferably introduced into the first section 738 for combustion and an exemplary combustion temperature, which is generated due to the combustion of the air/fuel mixture, is about 2700° R. The combustion process within the first section 738 forms combustion gases, which flow according to defined flow path, which is indicated by arrows 750. The combustion gases flow around the first end 732 of the annular baffle 730 and into the second section 740 of the combustion chamber 689. The gases then flow up towards the end wall 674 and because of the communication between the combustion chamber 689 and the first ends 702 of the platelet elements 690, the gases flow to the first ends 702.

According to the present invention, the channeled platelet elements 690 act as heat exchanging elements which replace the conventional functions performed by the hot end, cold end, and regenerator of a conventional Stirling engine. As best shown in FIG. 16, each of the channeled platelet elements 690 has a first heat exchange section 760, a second heat exchange section 770, and a third heat exchange section 780. The first heat exchange section 760 extends from a first intermediate point to the first end 702, the third heat exchange section 780 extends from a second intermediate point to the second end 704 and the second heat exchange section 770 extends between the first and second intermediate points. The first heat exchange section 760 comprises a region in which heat transfer results between the hot combustion gas and a working gas. While helium is a suitable and typically preferred working gas, other working gases may be used. For example, hydrogen may be used as the working gas.

In the first heat exchange section 760, each platelet element 690 has a plurality of working gas channels 800 and combustion gas channels 810 formed therein using platelet technology. For example, the number, dimensions, and location of these channels 800, 810 may be tailored by using precise platelet channel techniques, such as a photo-etching process, a chemical etching process, or a laser cutting process. According to the present invention, the working gas channels 800 are sealed at the first ends 702 of the elements 690, while the combustion gas channels 810 are open at the first ends 702 of the elements 690. The combustion gas channels 810 are open at the first ends 702 so that the combustion gases flow into the channels 810 after the gases exit the combustion chamber 689. Opposite ends of the channels 810 communicate with the one or more combustion gas outlets 646 formed in the housing 640 so that combustion gases are vented from the platelet elements 690 after the gases flow from the first end 702 to the outlet(s) 646.

The working gas channels 800 are likewise formed in the first heat exchange section 760 according to a predetermined pattern in which the channels 800 and 810 are spaced from another by platelet walls. The platelet walls act as heat transfer members so that heat from the hot combustion gases, flowing through channels 810, is transferred through the platelet walls to the working gas contained within and flowing within the channels 800. This results in heating of the working gas. Thus, the temperature of the working gas is greater at or near the first end 702 of the elements 690. For purpose of illustration only, the working gas may have a temperature of about 720° C. near the first ends 702 and as it flows towards the second heat exchange section 770, the temperature of the gas may decrease to about 680–700° C. in the region where the combustion gases are vented from the elements 690.

Figure 20A:
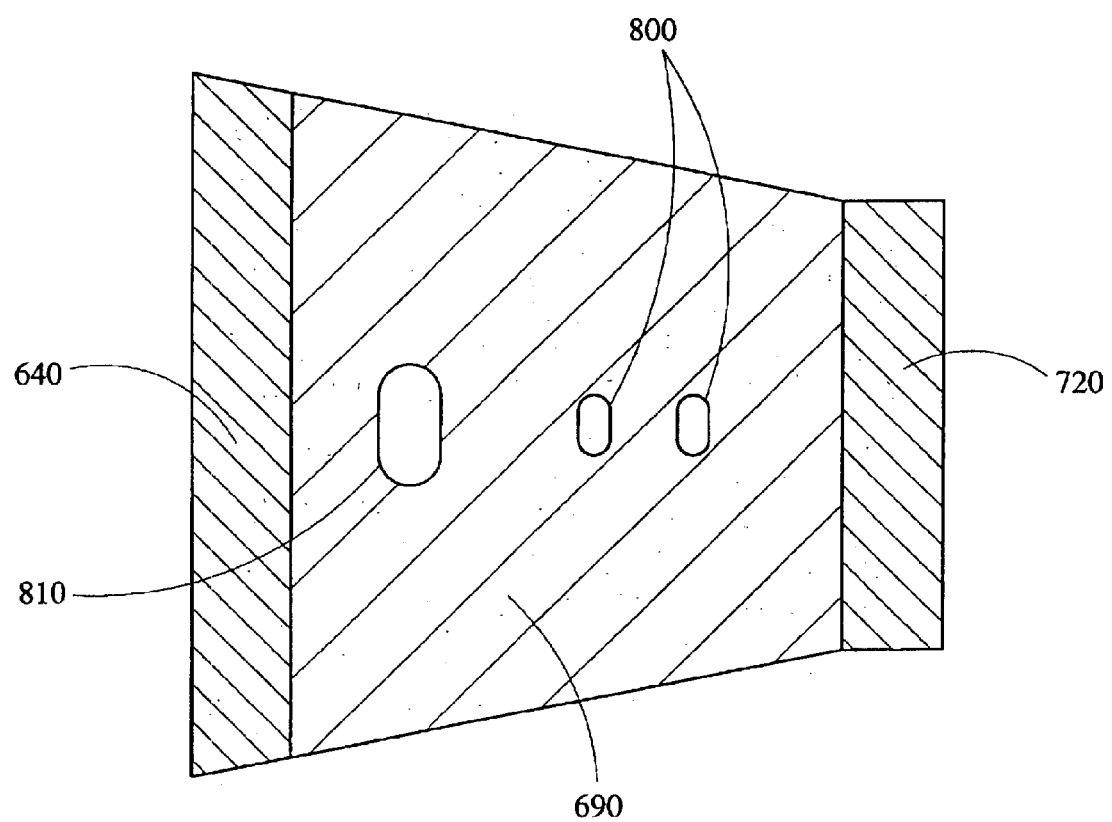
FIG. 20A is a cross-sectional view taken along the line 20—20 of FIG. 16.
Figure 20B:
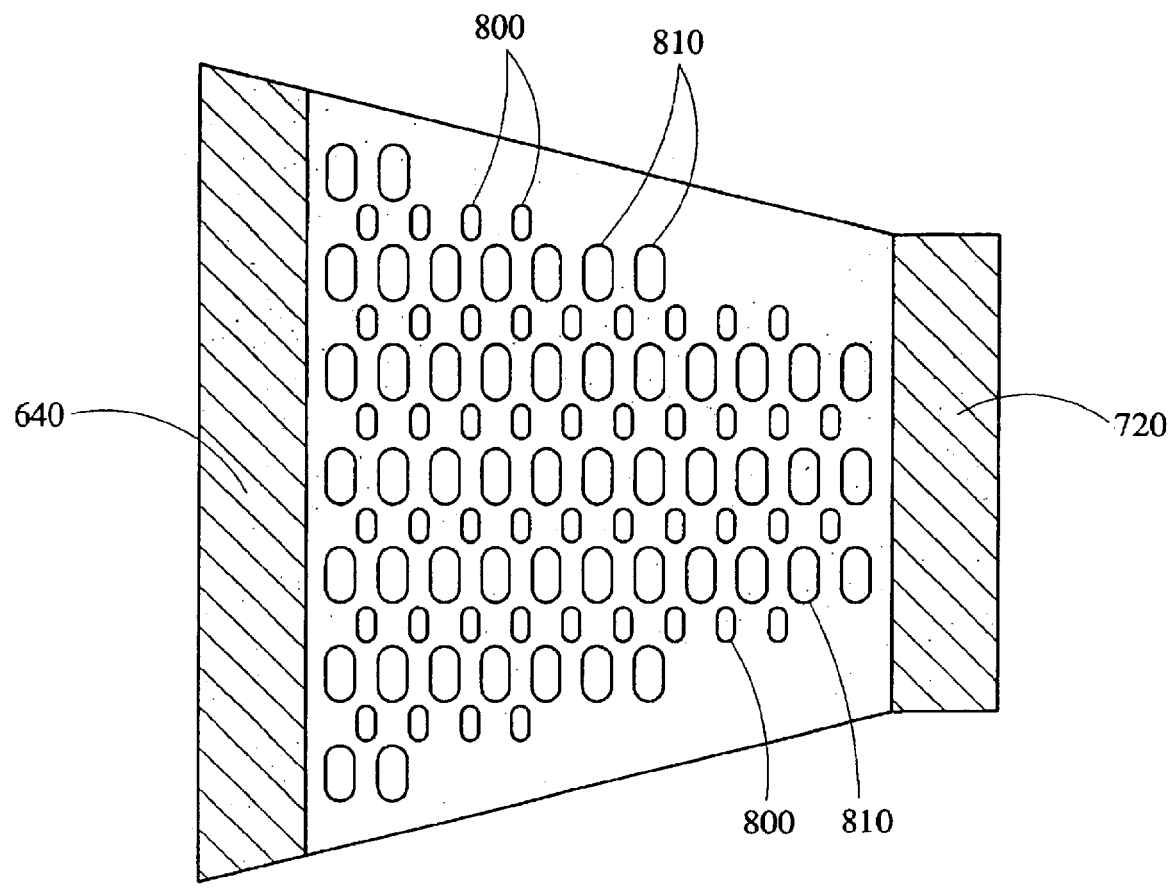
FIG. 20B is a cross-sectional view of a first region of the structure of FIG. 16.

FIG. 20A is a cross-sectional view taken along the line 20—20 of FIG. 16. However, one will understand that this figure only generally illustrates the present invention in a very simplified manner. In other words, FIG. 20A shows only several working gas channels 800 and one combustion channel 810. FIG. 20B illustrates an alternative and preferred cross-sectional view of the first heat exchange section 760. This figure shows that there is a plurality of both combustion gas channels 810 and working gas channels 800 and that these channels 800, 810 are arranged according to a predetermined pattern. In the illustrated embodiment, the channels 800, 810 are generally arranged in alternating columns such that one column of working gas 800 has one combustion gas channel columns 810 on each side thereof. This permits effective heating of the working gas flowing within channels 800 as heat from the hot combustion gas is transferred across the platelet member 690, in which the channels 800, 810 are formed, to effectively heat the working gas. Once again, FIG. 20B is merely exemplary in nature and it will be understood that there may be a greater number or a lesser number of channels 800, 810. Likewise, the channels 800, 810 may be formed in any number of arrangements. In one embodiment, the diameter of each of the combustion gas channels 810 is greater than the diameter of each of the working gas channels 800. This permits a greater volume of hot combustion gas to be disposed proximate to the flowing working gas.

Figure 21A:
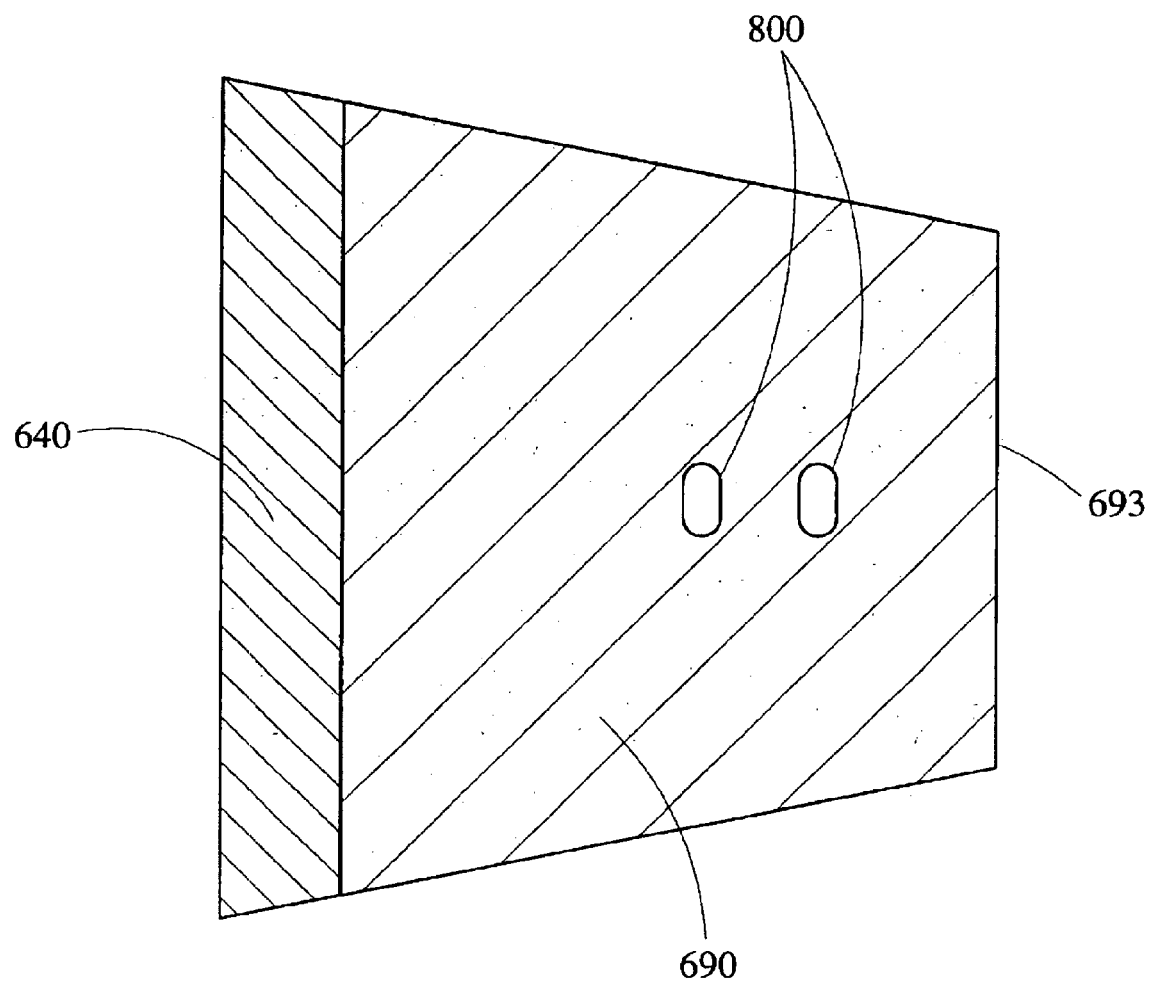
FIG. 21A is a cross-sectional view taken along the line 21—21 of FIG. 16.
Figure 21B:
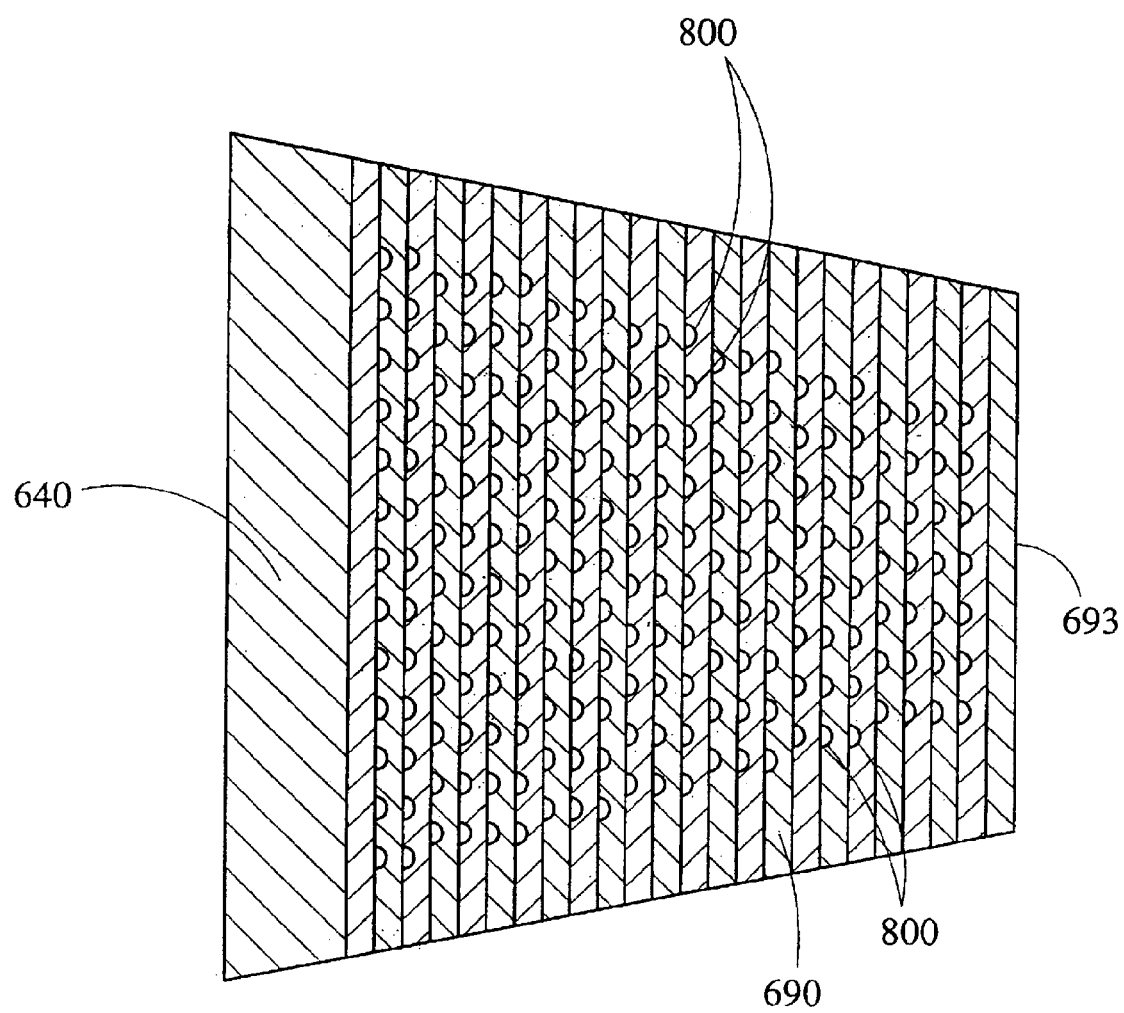
FIG. 21B is a cross-sectional view of a first region of the structure of FIG. 16.

Referring now to FIGS. 16 and 21A–21B, unlike the combustion gas channels 810, the working gas channels 800 are formed in the second heat exchange section 770 so that the heated working gas flows from the first heat exchange section 760 to the second heat exchange section 770. The second heat exchange section 770 is a working gas regenerator section, which acts similar to a conventional regenerator in a conventional Stirling engine. The second heat exchange section 770 serves to further transfer heat between the working gas and the platelet elements 690. More specifically, in this second heat exchange section 770, heat from the working gas is transferred to the platelet material forming the elements 690. This results in a continuous reduction in the temperature of the working gas as the gas flows from an upper end of the second heat exchange section 770 to a lower end thereof.

In one embodiment, the second heat exchange section 770 generally has a stacked screen-like configuration where a plurality of the working gas channels 800 extend therethrough. A matrix or other arrangement of metal strips may be arranged so as to withdraw heat from the flowing working gas as it flows through channels 800 from one end of the second heat exchange section 770 to the other. Any number of other heat exchange materials and configurations may be used so long as the second heat exchange section 770 acts as a heat transfer region between the working gas and the surrounding platelet structure. It will be appreciated that the only channels formed within the second heat exchange section 770 are the working gas channels 800.

For purpose of illustration only, the working gas may have a temperature of about 670–700° C. at the upper end of the second heat exchange section 770 (at or near the interface between sections 760, 770). As the working gas flows towards the lower end of the second heat exchange section 770, the temperature of the gas may decrease to about 110–120° C. prior to the gas working entering the third heat exchange section 780. It will be understood that these values do not limit the present invention in any way and are merely exemplary. The type of working gas and the overall design of the platelet elements 690 will impact the temperature profile of the flowing working gas.

FIG. 21A is a cross-sectional view taken along the line 21—21 of FIG. 16. However, one will understand that this figure only generally illustrates the present invention in a very simplified manner. In other words, FIG. 21A shows only several working gas channels 800 present in the second heat exchange section 770. FIG. 21B illustrates an alternative and preferred cross-sectional view of the second heat exchange section 770. This figure shows that there are a plurality of working gas channels 800 formed therein and that these channels 800 are arranged according to a predetermined pattern.

Referring back to FIG. 16, near the upper end of the second heat exchange section 770, a plurality of upper working gas ports 820 are formed in the platelet elements 690. More specifically, each inner face 693 of one element 690 contains one or more upper ports 820. The one or more ports 820 are connected to one or more working gas channels 800 such that the working gas freely flows between the ports 820 and the channels 800. The ports 820 open into an upper end of the piston chamber 630 and thus, the ports 820 permit the working gas to freely communicate between the upper end of the piston chamber 630 and the working gas channels 800. Importantly, the ports 820 are formed above the displacer piston 610 so that axial movement of the displacer piston 610 within the piston chamber 630 causes redistribution of the working gas in the entire heat exchange system as will be described in greater detail hereinafter.

As one of skill in the art understands, the working gas not only flows from the first heat exchange section 760 to the third heat exchange section 780, the working gas also flows in an opposite direction within the channels 800 due to the axial movement of the displacer piston 630. In this instance, the working gas is heated as it flows through the channels 800 from the third section 780 to the first section 760.

Because the platelet elements 690 are arranged annularly, the ports 820 are radially formed around the piston chamber 630. This permits the displacer piston 610 to uniformly distribute the working gas to the channels 800 of the various individual platelet elements 690 through the ports 820.

Figure 22A:
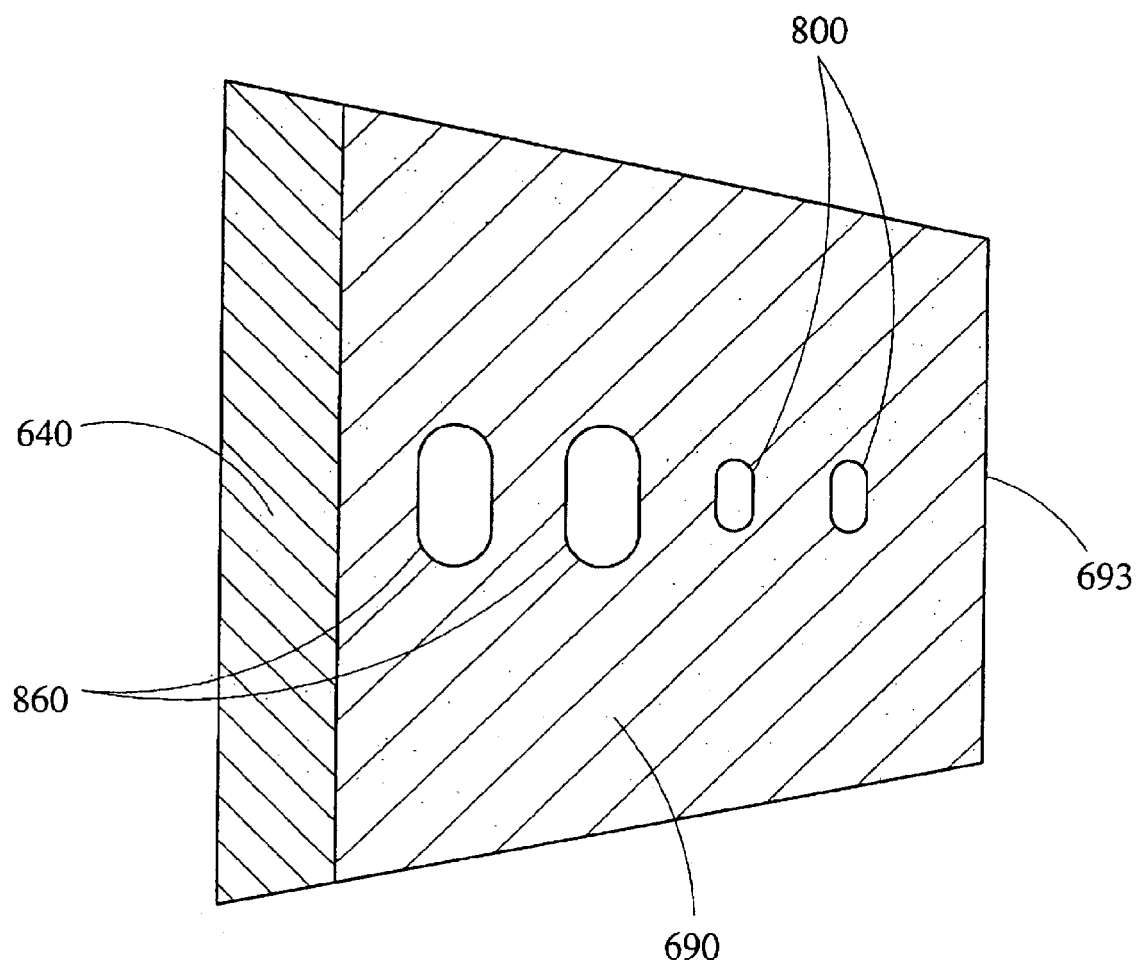
FIG. 22A is a cross-sectional view taken along the line 22—22 of FIG. 16.
Figure 22B:
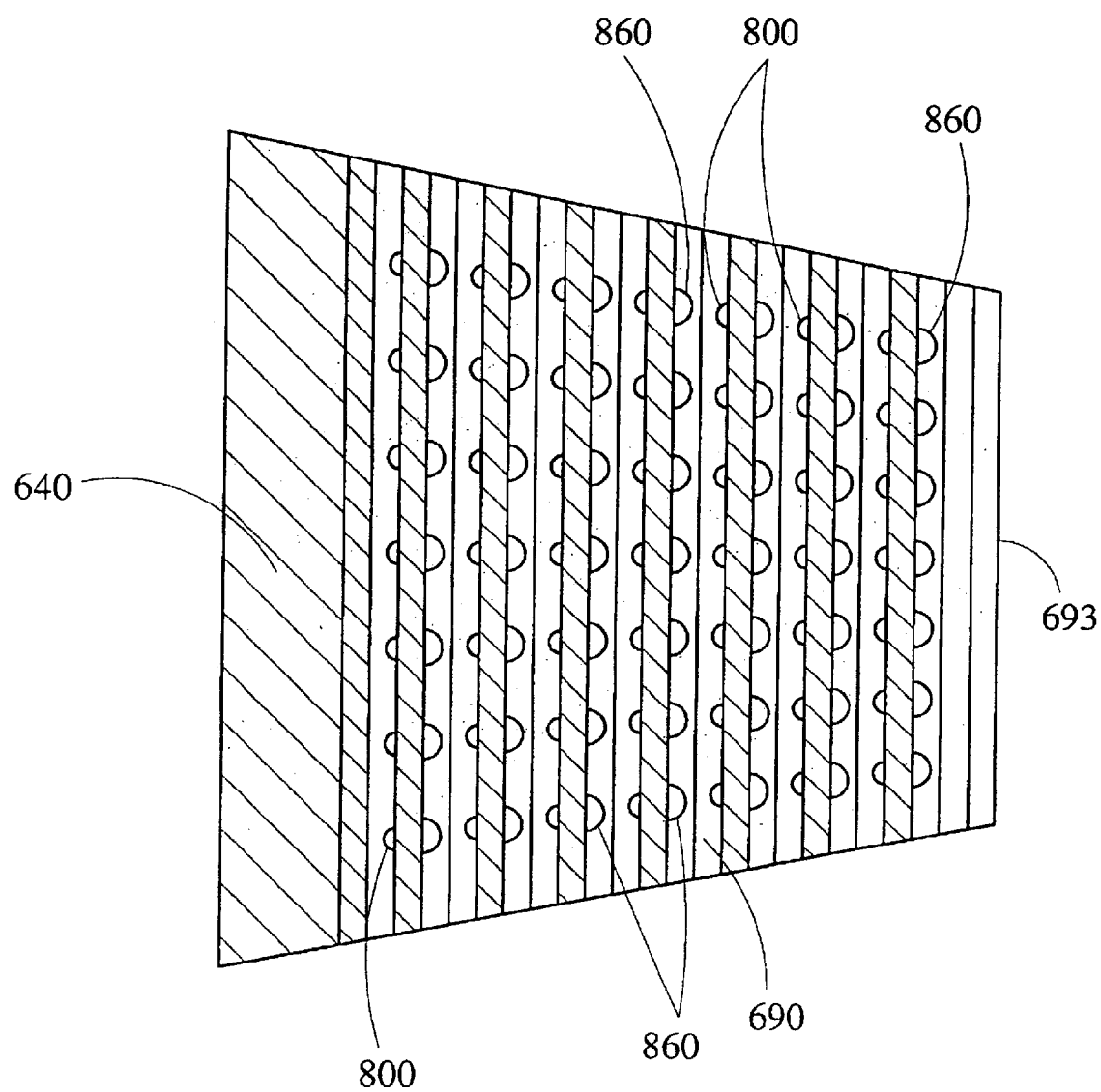
FIG. 22B is a cross-sectional view of a first region of the structure of FIG. 16.

As illustrated in FIGS. 16 and 22A–22B, the third heat exchange section 780 is formed adjacent the second section 770. The third section 780 functions as a working gas/coolant heat exchanger. More specifically, a closed loop cooling system, generally indicated at 830, is provided for cooling the working gas as the gas flows through channels 800 formed in the third section 780. The cooling system 830 includes a coolant inlet conduit 840 and a coolant outlet conduit 850. The inlet conduit 840 is connected to the one or more coolant inlets 642 of the housing 640 and the outlet conduit 850 is connected to the one or more coolant outlets 644 of the housing 640. The conduits 840, 850 may comprise any number of suitable conduit members, e.g., tubing, and the coolant may be any number of types of coolant, which is suitable for the intended use described herein. One preferred coolant is water, which is maintained below its boiling point during its flow through the closed loop system 830.

The one or more coolant inlets 642 and the one or more coolant outlets 644 formed in the housing 640 are in fluid communication with a plurality of coolant channels 860 formed in the platelet elements 690. Thus, each coolant channel 860 is connected at one end to the coolant inlet 642 and at the other end to the coolant outlet 644 so that the coolant flows through the inlet conduit 840 through the inlet 642 and into the plurality of coolant channels 860 where the coolant flows to the outlet 644 and then exits from the housing 640 through the outlet conduit 850.

FIG. 22A is a cross-sectional view taken along the line 22—22 of FIG. 16. However, one will understand that this figure only generally illustrates the present invention in a very simplified manner. In other words, FIG. 22A shows only several working gas channels 800 and one coolant channel 860 present in the third heat exchange section 780. FIG. 22B illustrates an alternative and preferred cross-sectional view of the third heat exchange section 780. In FIG. 22B, a plurality of coolant channels 860 and a plurality of working gas channels 800 are arranged according to a predetermined pattern. For example, the channels 800, 860 may be arranged in a number of rows and/or columns. Preferably, the channels 800, 860 are generally provided in pairs with one working gas channel 800 facing and being proximately located relative to one coolant channel 860. In this instance, a wall is provided between the channels 800, 860 to not only separate them but also act as a heat transfer member. This wall may be formed of the material, which forms the platelet and therefore likely resembles a metal strip of material extending between opposing rows of channels 800, 860.

As the coolant flows through the coolant channels 860, heat is transferred from the proximate working gas to the coolant. The coolant thus experiences a temperature increase as it flows through the channels 860. For example when the coolant is water, the water may enter the inlet 642 at a temperature of about 73° C. and then exit through the outlet 644 at a temperature of about 83° C. This results because heat from the working gas is transferred from the working gas through the platelet element 690 to the water. Conversely, the temperature of the working gas decreases as the working gas flows through the channels 800.

Referring back to FIG. 16, near the lower end of the third heat exchange section 780, a plurality of lower working gas ports 870 are formed in the platelet elements 690. More specifically, each inner face 693 of one element 690 contains one or more lower ports 870. The one or more ports 870 are connected to working gas channels 800 such that the working gas may freely flow between the ports 870 and the channels 800. The ports 870 open into a lower end of the piston chamber 630 and thus, the ports 870 permit the working gas to freely communicate between the lower end of the piston chamber 630 and the working gas channels 800. Importantly, the ports 870 are formed below the displacer piston 610 so that axial movement of the displacer piston 610 within the piston chamber 630 causes redistribution of the working gas in the entire heat exchange system as will be described in greater detail hereinafter.

As one of skill in the art understands, the working gas flows bi-directionally through the first, second, and third heat exchange sections 760, 770, 780 as a result of the axial movement of the displacer piston 630. When the working gas flow is from the first end 702 to the second end 704 of the elements 690, the temperature of the working gas progressively decreases, while the opposite is true when the working gas flows from the second end 704 to the first end 702.

Because the platelet elements 690 are arranged annularly, the ports 870 are radially formed around the piston chamber 630. This permits the displacer piston 610 to uniformly distribute the working gas to the channels 800 of the various individual platelet elements 690 through the ports 870 when the displacer piston 610 moves axially within the chamber 630 away from the combustion member 720.

A pre-heater 900 is preferably provided and disposed around the housing 640 so that a pre-heating space 910 is defined between the pre-heater 900 and the housing 640. The pre-heater 900 is partially shown in FIG. 16. Because of the annular shapes of the defining members, the pre-heating space 910 is also annular in nature. The pre-heater 900 includes one or more inlets 912 for receiving ambient air. This ambient air is directed into one or more air channels 928 which communicate at first ends thereof with the ignition device 745 so that the air is introduced into the combustion chamber 689 through the plurality of air inlets 678. According to one embodiment, one or more baffle members 920 are provided for separating the combustion gases, which are to be exhausted after exiting the housing 640 through the one or more outlets 646, from the ambient air which is introduced through the one or more inlets 912. The combustion gases are then fed into one or more exhaust channels 924, which lead to an exhaust vent 926.

At the same time, ambient air flowing through the one or more air channels 928, flows in the same direction as the exhausted combustion gases. Preferably, the air channels 928 and the exhaust channels 924 are parallel to one another and in one embodiment, the channels 924 and 928 are formed in an alternating manner. However, it will be understood that the exhaust channels 924 are open at or near the first end 670 of the housing 640, while the ambient channels 928 are closed in this region and instead lead to the ignition device 745.

Because of the high temperatures at which other components of the Stirling engine operate at, it is preferred to maintain the heat exchanging components, e.g., the platelet elements 690, at elevated temperatures also to reduce thermal stress, etc. This is achieved by preheating the ambient air introduced to the combustion chamber 689. The ambient air is preheated by using heat transfer between the combustion gases, which are being exhausted. In other words, by disposing the air channels 928 in close proximity to the exhaust channels 924, the ambient air is heated by the combustion gases as it flows to the combustion chamber 689. This further increases the overall efficiency of the entire Stirling engine since the benefits of heat transfer are optimized in as many different regions and by as many different operations as possible. In other words, the heat of the exhaust gases is not wasted, but rather is used to perform an additional heat transfer, which results in more efficient combustion and also reduces the risk that there will be a great temperature difference between the heat exchanger components of the Stirling engine and the other components thereof.

Figure 23:
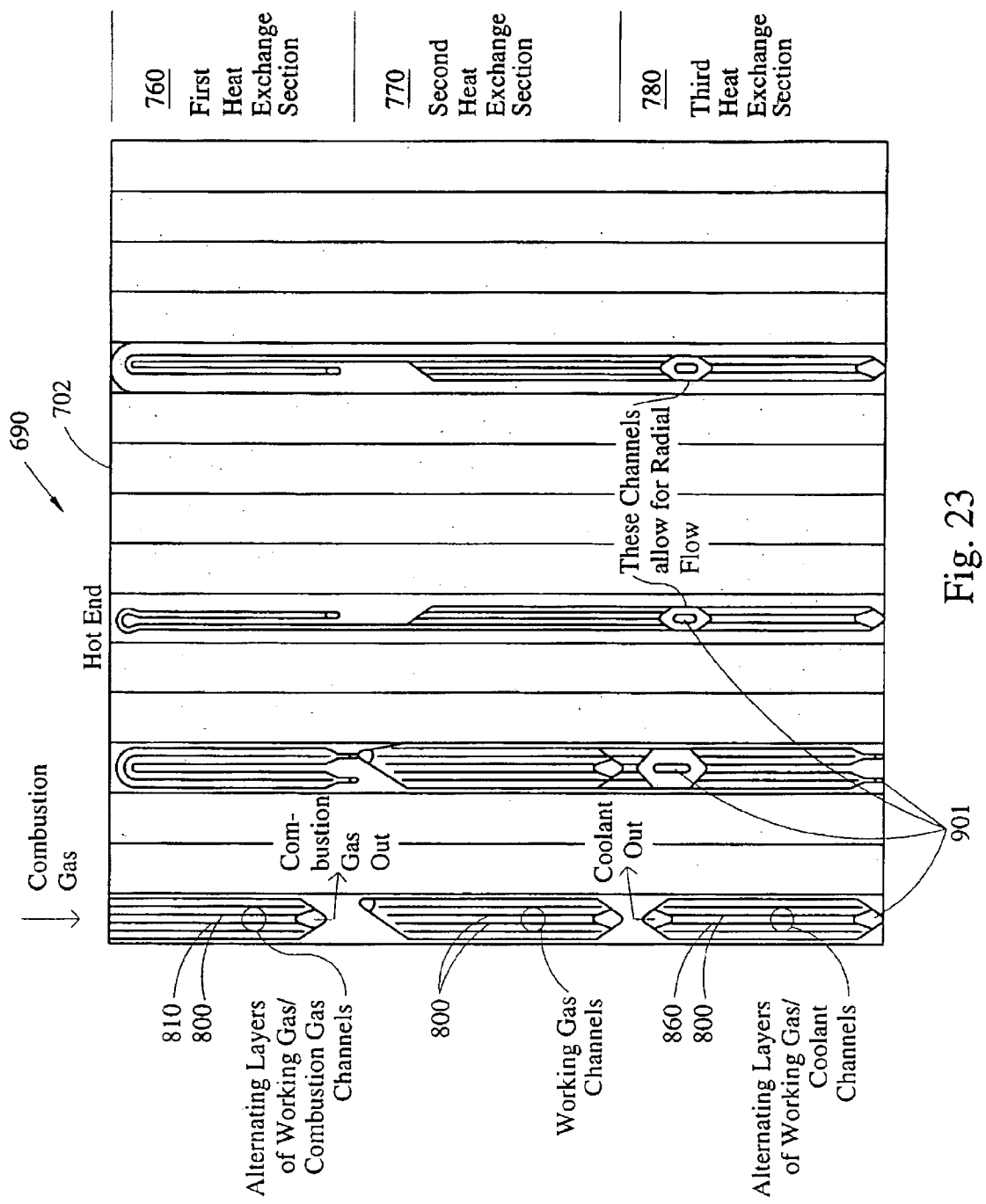
FIG. 23 illustrates different channel structures of the heat exchange sections in the heat transfer platelet use in a Stirling engine according to one embodiment.

FIG. 23 shows a number of channeled platelet elements 690 which are adapted to be positioned in an annular manner around the combustion member 720 to form the piston chamber 630. Each individual platelet element 690 may or may not have a different channel structure than adjacent platelet elements 690. In other words, the logic of the channels is tailored to provide the desired flow of the working gas, combustion gas, and the coolant. FIG. 23 illustrates that each of the elements 690 has the first heat exchange (HEX) section 760, the second heat exchange section 770, and the third heat exchange section 780. Because of precision of the platelet formation technology, very small diameter channels may be formed in the platelet substrate and the layers of each individual channel may be constructed so that the fluid flows according to the defined logic of the channels. For example, some of the channels may communicate with channels formed in other layers so that the fluid can flow through multiple layers and in another embodiment, at least some of the channels in one layer do not communicate with some of the channels in the other surrounding layers. In yet another aspect, some of the channels, generally indicated at 901, are formed in each of the individual platelet elements 690 such that a radial flow channel is formed around the displacer chamber 630.

The general operation of a Stirling engine having the heat exchanging components thereof formed of platelet elements 690 will now be described with reference to FIGS. 16–23. As previously mentioned, the Stirling engine of the present invention operates in essentially the same manner as a conventional Stirling engine with the exception that the hot and cold end of the heat exchange system are different. The displacer piston 610 serves to move the working gas through the working gas channels 800 and through the piston chamber 630. As best shown in FIG. 16, the only channels which are in fluid communication with the piston chamber 630 are the working gas channels 800. Thus, the piston chamber 630 is part of the closed loop working gas flow path.

As those of skill in the art will appreciate, the working gas flows in a bi-directional manner through the channels 800. The upper and lower ports 820, 870 permit the working gas to enter and exit the piston chamber 630 through each of the respective ports 820, 870 depending upon the flow direction of the working gas. In a first position, the displacer piston 610 is in an up most position in which the displacer piston 610 is just below the upper ports 820. In a first stage, often referred to as an isothermal compression stage, the displacer piston 610 is in the up most position and the working piston 620 is directed toward the displacer piston 610 by action of the flywheel, etc. The distance between the displacer piston 610 and the working piston 620 decreases and this causes working gas to flow out through the ports 870 and into channels 800. The working gas is compressed under pressure under constant volume. In this stage, the working gas is generally flowing upward through the channels 800 from the third heat exchange section 780 to the first heat exchange section 760 and the regenerator (second heat exchange section 770) serves to supply heat to the working gas as it flows toward the first heat exchange section 760 and also into the upper ports 820 so that the hot gas flows into the combustion chamber 630 above the displacer piston 610. In addition, the working gas is heated by the hot combustion gas flowing through channels 810. This corresponds to an isothermal expansion stage of the Stirling cycle and during isothermal expansion, the volume of the working gas expands due to the heating. In this stage, the displacer piston 610 moves downward in the chamber 630 toward the working piston 620. This movement of the displacer piston 610 causes the working gas to flow in an opposite reverse path such that the hot working gas flows downward in channels 800 through the first heat exchange section 760 to the third heat exchange section 780. As the working gas flows in this direction, the regenerator (second heat exchange section 770) serves to store heat as the working gas flows from the hot expansion space (first section 760) to the cool compression space (third section 780). This results in the working piston 620 being directed downward away from the displacer piston 610 resulting in the distance between the two pistons 610, 620 becoming greater as the displacer piston 610 reaches its lowermost position. Cold working gas enters through ports 870 below the displacer piston 610 but above the working piston 620.

This working gas cycle continuously proceeds so that the working gas flows through the regenerator (second heat exchange section 770) from the hot expansion space to the cool compression space resulting in the regenerator storing heat. The working gas then reverses its flow paths, due to the movement and action of the displacer piston 610, so that it flows from the cool compression space to the hot expansion space and the regenerator returns the heat to the working gas. This cycle of the working gas is continuously repeated as the pistons 610, 620 move axially in the chamber 630. By incorporating platelet technology into the hot and cold end heat exchangers of the Stirling engine, heat transfer efficiency is significantly improved resulting in a more efficient running engine. The present invention provides a robust/long life metal cooling capability by incorporating the internal region of the Stirling displacer cylinder head end in the platelet stack. FIG. 16 illustrates a flat cylinder head end; however, the cylinder head end may be domed-shaped instead. Platelet technology permits the coolant/working gas heating passages to be made with hundreds of small openings in the head end and thus eliminate the need for the present day ceramic insulation. This reduces the cost of the entire head end. The present invention also provides for an even, more effective and efficient heat transfer surface area and results in a more compact and lighter weight overall Stirling engine.

Furthermore, while the present invention illustrated in FIG. 16 shows a heat exchange structure which functions in a series fashion, it is within the scope of the present invention to provide the same functionality in a parallel configuration. For example, concentric cylinders may be provided with the working gas/water heat exchanger an inner diameter, followed by the working gas regenerator in the center cylinder and then the hot gas/working gas heat exchanger as the outermost cylinder. It will be appreciated that the concentric cylinders may be ordered in other alternative configurations.

Figure 24:
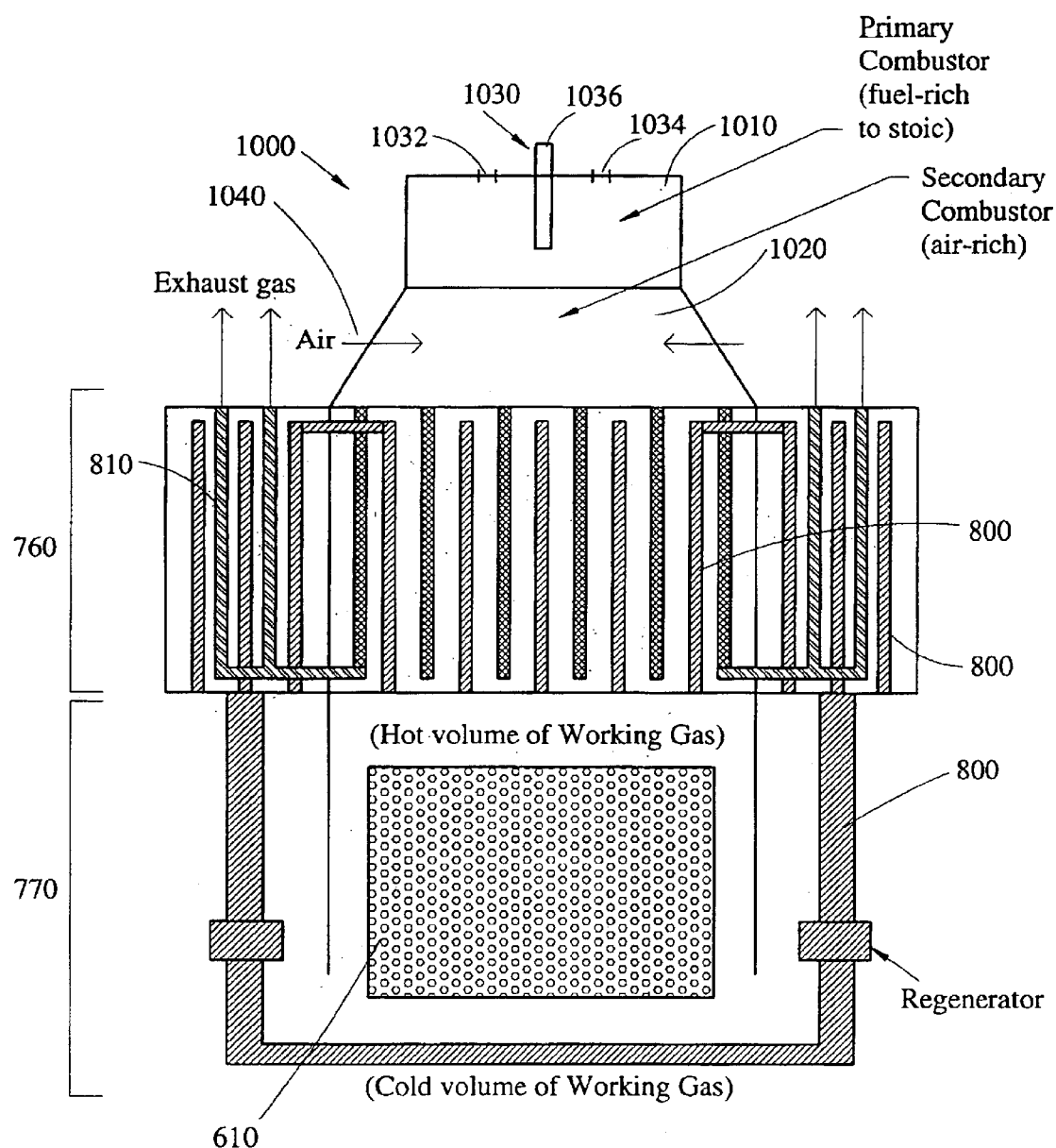
FIG. 24 is a schematic of a multi-stage combustor for use in a Stirling engine according to one embodiment.

FIG. 24 illustrates another aspect of the present invention. The present technology for conventional Stirling engines utilizes a single stage combustion process. High emission levels of CO and NO, are a critical environmental concern. Design approaches such as exhaust gas recirculation (EGR) or combustion gas re-circulation (CGR) have been used to reduce the emission of $NO_x$. Neither approach to date can achieve acceptable emission levels without sacrificing performance or incurring high parasitic pressure losses. According to another embodiment, the present invention provides a multi-stage combustor system, generally indicated at 1000. The multi-stage combustor system 1000 significantly reduces the emission level while maintaining high system performance and long hardware life.

In a first embodiment of the multi-stage combustor system 1000, shown in FIG. 24, a two-stage combustion process without inter-stage cooling is presented. FIG. 24 illustrates generally the heat exchange components of the multi-stage combustor system 1000. The heat exchange components of the multi-stage combustor system 1000 include the first section 760 and the second section 770 (regenerator). The third section 780 (FIG. 16) is not present in this embodiment since this embodiment does not include inter-stage cooling. The first section 760 has a plurality of working gas channels 800 which extend into the second section 770 and also includes a plurality of the combustion gas channels 810.

The multi-stage combustor system 1000 includes a first (primary) combustor 1010 and a second (secondary) combustor 1020. The first combustor 1010 is coupled to a fuel injection/ignition device 1030. The device 1030 includes a number of fuel channels 1032 and air channels 1034, which serve to provide fuel and air to the first combustor 1010. An ignitor 1036 provides a spark or the like to ignite the fuel/air mixture to generate heat and combustion gases. The first combustor 1010 can either operate at fuel-rich conditions or at the stoichiometric point where the mixture has equal fuel and air components. Preferably, the first combustor 1010 operates at fuel-rich conditions. The $NO_x$ emission is very low in the first combustor 1010 due to the lack of extra oxygen. In the first combustor 1010, the gas has a first temperature and in one embodiment, the first temperature is about 3000° R.

Figure 25:
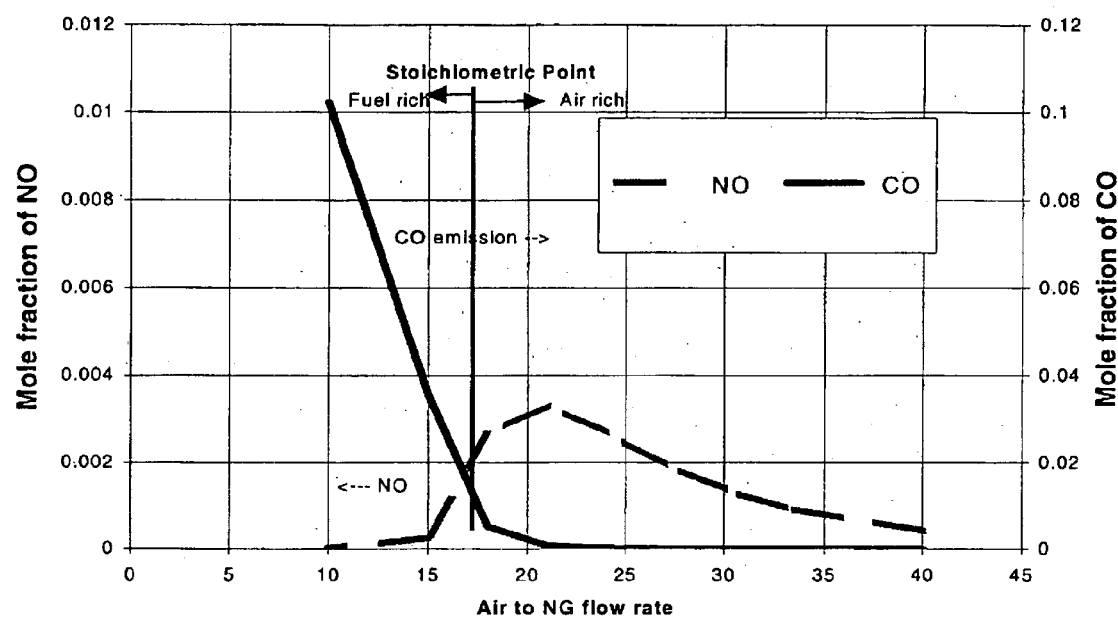
FIG. 25 is a graph illustrating NO and CO emission levels versus air to NG flow rate concerning the operation and advantages of the multi-stage combustor of FIG. 24.

After exiting the first combustor 1010, secondary air is introduced at 1040 into the second combustor 1020. This secondary air is rapidly mixed to dilute and reduce the combustion temperature while maintaining the $NO_x$ emission at the low level (as shown in FIG. 25). This results in the present multi-stage combustor system 1000 simultaneously achieving high system performance and low $NO_x$ emission level. Since the residence time for CO formation is long, CO will be converted to CO2 in the platelet passages (combustion channels 810) before being exhausted. In the second combustor 1020, the gas has a second temperature, which is less than the first temperature in the first combustor 1010. For example, the second temperature is less than 3000° R.

FIG. 25 illustrates the advantages provided by the systems according to the present invention. More specifically, FIG. 25 illustrates the CO and NO, variation with air and NG flow ration. The stoiochiometric point is also shown where the fuel and air components are about the same.

Figure 26:
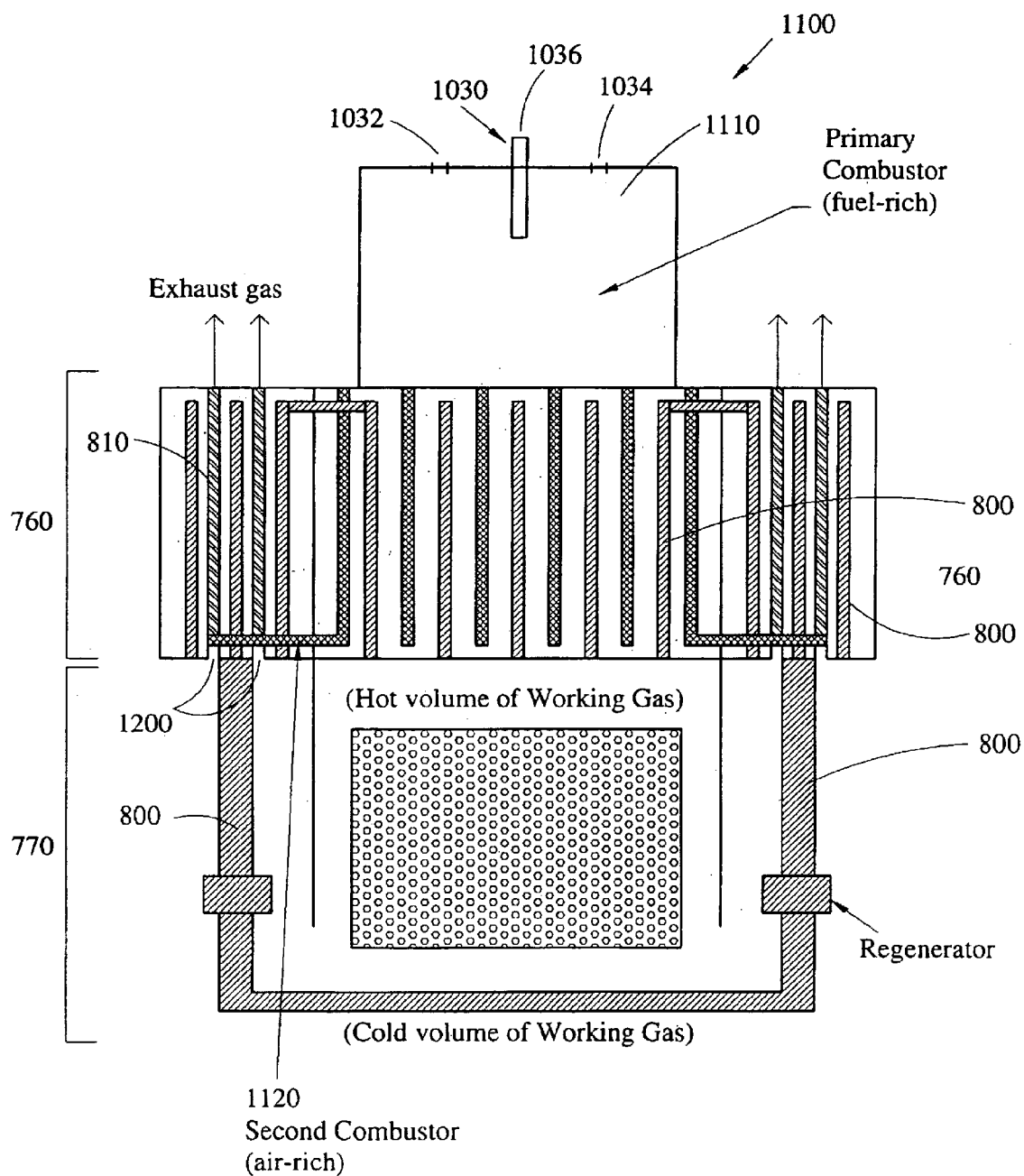
FIG. 26 is a schematic of a multi-stage combustor for use in a Stirling engine according to another embodiment.

FIG. 26 shows another embodiment of the present invention in which a multi-stage combustor system, generally indicated at 1100 is provided. The system 1100 significantly reduces the emission level while maintaining high system performance and long hardware life.

In a first embodiment of the system 1100, shown in FIG. 26, a two-stage combustion process with inter-stage cooling is presented. FIG. 24 illustrates generally the heat exchanging components of the multi-stage combustor system 1000. The heat exchanging components of the multi-stage combustor system 1000 include the first section 760 and the second section 770 (regenerator) and the third section (not shown). The system 1100 includes a first combustor 1110 and a second combustor 1120. The first combustor 1110 includes the fuel injection/ignition device 1030 for injecting fuel and air into the first combustor. The first combustor 1110 operates at fuel-rich conditions with gas temperature between about 2500° R to 3000° R. The hot combustion gases flow through the channel 810 in the first section 760 before being exhausted. As previously described in great detail, the flow of the hot combustion gases in the first section 760 transfers heat to the working gas, which is flowing in proximate working gas channels 800. After transferring energy to the working gas inside the heat exchanger, the combustion gas temperature deceases while maintaining the fuel-rich status.

According to this embodiment, a secondary air injection system 1200 injects air into the flowing combustion gases as it flows through the first section 760. By introducing secondary air, the gas temperature is brought back to the original design gas temperature of about 2500° R to about 3000° R because of the energy created by additional burning of the gas. The heat transfer mechanism from hot gas to working gas resumes beyond this point. This process of adding secondary air can be repeated several times, as required, with combustion gas temperature always staying below 2500° R, to 3000° R. The $NO_x$ emission level can be maintained at very low levels since the gas temperature during the entire combustion and heat transfer process is maintained at a temperature below the $NO_x$ kinetic threshold. A two-stage combustion process with inter-stage cooling according to one embodiment is shown in FIG. 26.

Accordingly, FIGS. 24–26 illustrate two exemplary multi-stage combustion systems, which offer the following significant advantages. First, the first stage of burning takes place at a low air/fuel ratio. This results in a cooler flame temperature and results in a more durable combustion chamber and working gas heat exchanger. Second, the overall volume of the cooler fuel rich gas is less than would be required if a stoiochiometric mixture of air was used for initial combustion. This results in a significantly lower temperature hot gas than would be generated by cooling the combustion with the addition of exhaust gas recirculation (EGR). Third, the staging of the combustion with the addition of more combustion air at about half way through the platelet stack heat exchanger provides for a more uniform heat input to the working gas heat exchanger at a time and place where the fuel rich gas has been cooled to just above the temperature necessary to re-ignite the fuel rich gases. Fourth, the second stage of combustion is thus significantly reduced in temperature compared to the stoiochiometric value that would have occurred if the first stage combustion had not been cooled down by heating the working gas. Fifth, the significantly cooler than stoiochiometric combustion described above results in significantly less $NO_x$ formation and therefore a much cleaner final exhaust.

Figure 27:
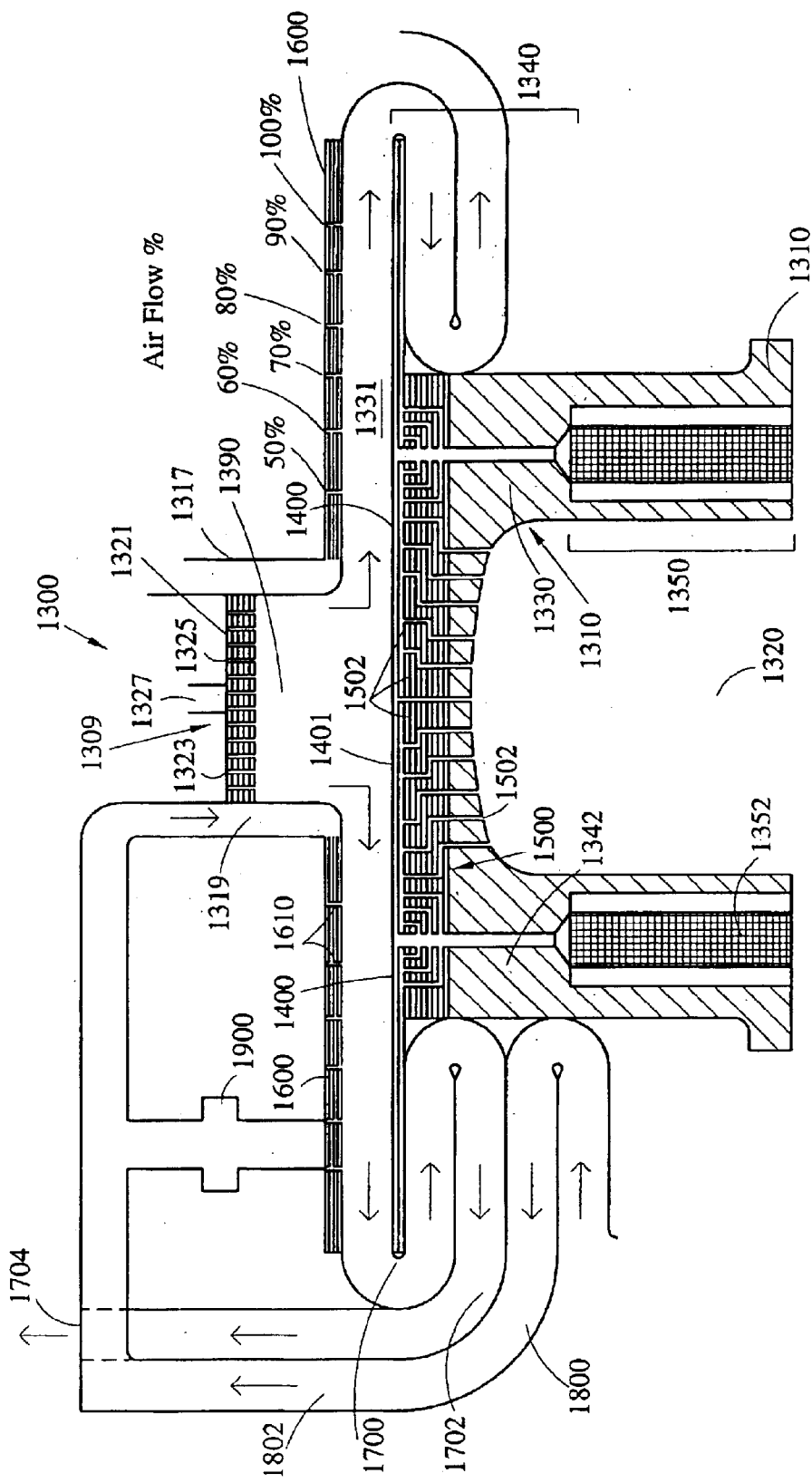
FIG. 27 is a cross-sectional view of a working gas heat exchanger incorporated with a combustion device and the hot end of a Stirling engine.
Figure 28:
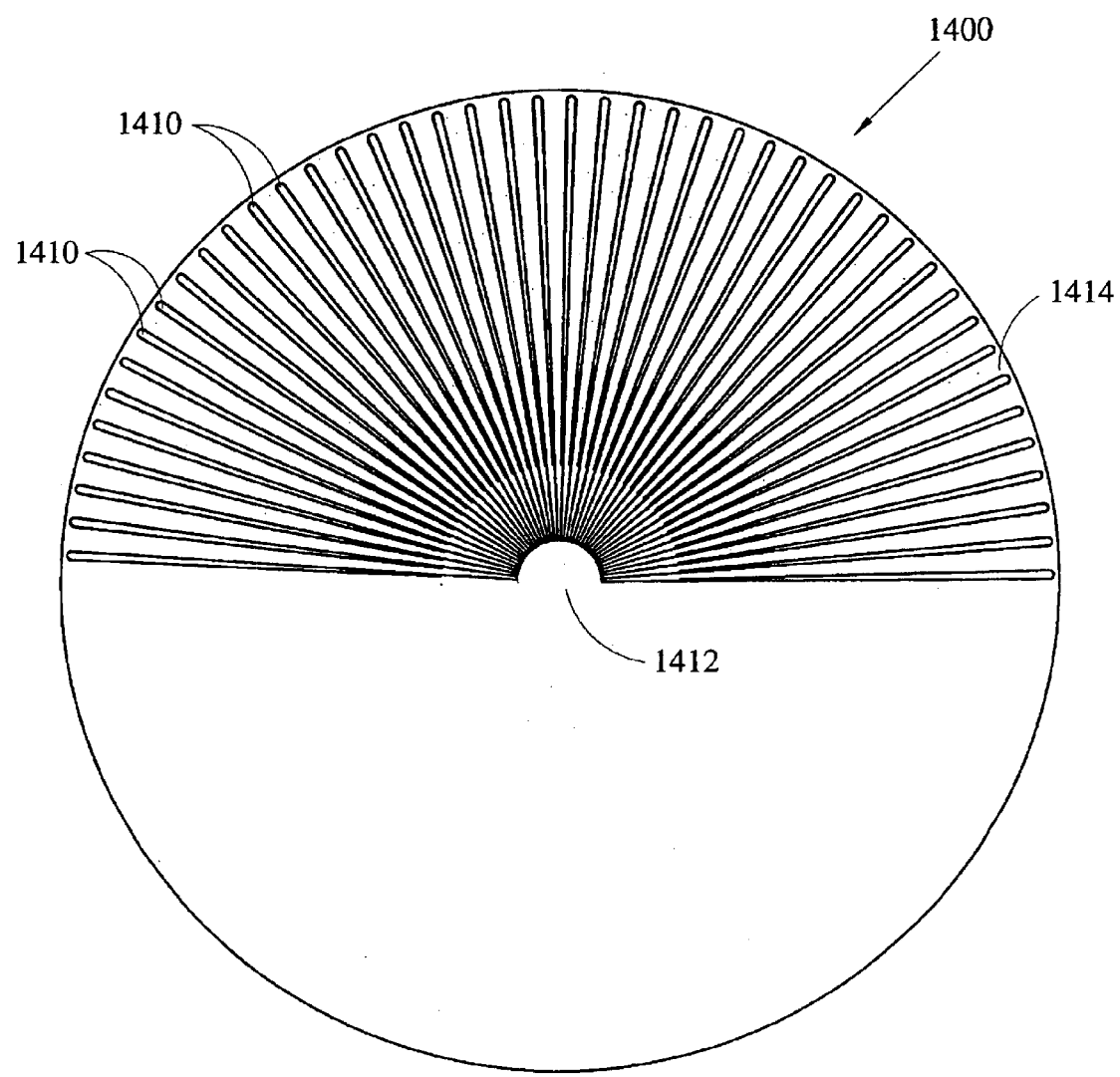
FIG. 28 is a bottom plan view of an exemplary working gas heat exchange platelet.
Figure 29:
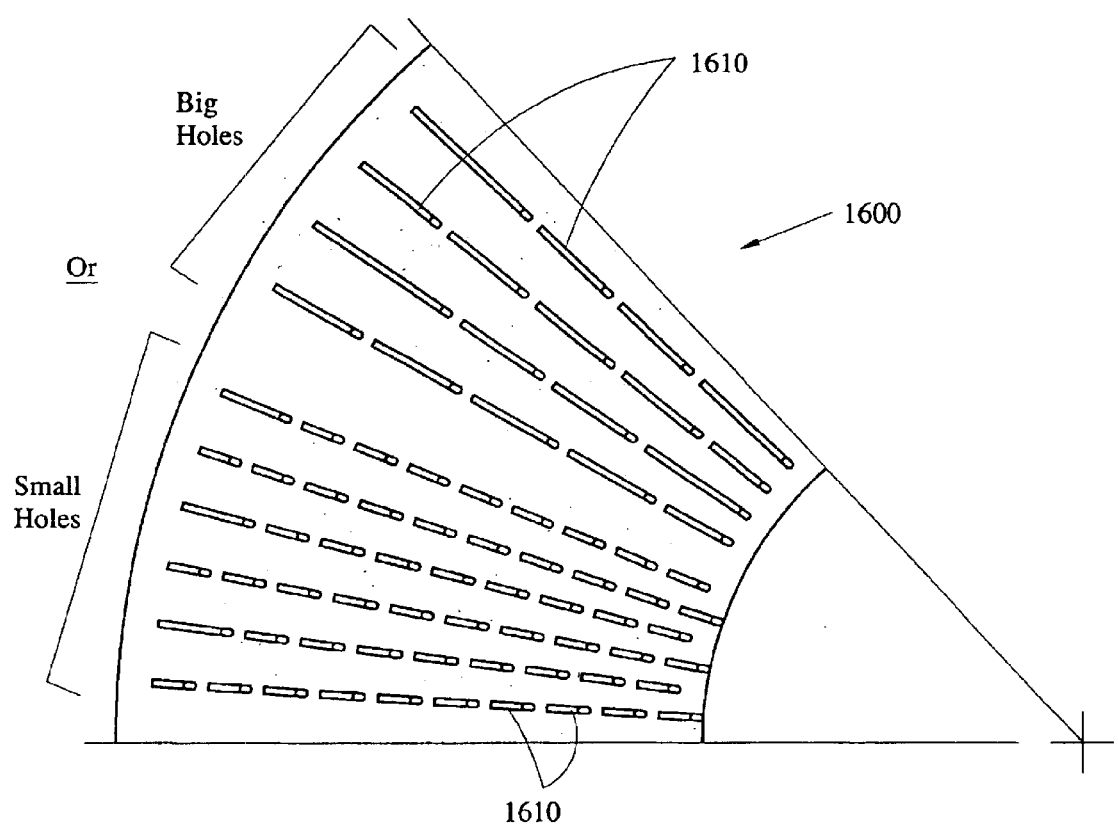
FIG. 29 is an enlarged partial top plan view of an air injector platelet for use with the device of FIG. 27.

Now referring to FIGS. 27–29, a combustion device 1300, a platelet working gas heat exchange plate 1400, a platelet manifold 1500 and a platelet air injector 1600 according to another embodiment of the present invention are presented. The device 1300, plate 1400, manifold 1500, and injector 1600 are intended to be used at the hot end of a Stirling engine and more specifically, these components operatively communicate with a displacer piston cylinder 1310. As with previous embodiments, the Stirling engine includes a number of heat exchangers, which act to transfer heat to and from the working gas as it flows. A piston chamber 1320 is provided and formed in the cylinder 1310 with the displacer and working pistons (not shown) being axially moved therein. These pistons function in the manner previously described. The piston chamber 1320 is defined at one end by a head end 1330 of the cylinder 1310, which in the case is dome shaped; however it may have a flat shape.

The cylinder 1310 may be formed conventionally using metal or the like or it may be formed of a series of stacked platelets having the desired channels formed therein using platelet technology. A first heat exchange section 1340 extends from one face 1401 of heat exchange plate 1400 to a second heat exchange section (regenerator) 1350. The first heat exchange section 1340 contains the heat exchange plate 1400, the manifold 1500 as well as the working gas channel 1342. The second heat exchange section 1350, in the exemplary embodiment, is thus located in series below the first heat exchange section 1340. The heat exchange plate 1400 in the first Heat exchange section 1340 serves as a heat transfer mechanism between combustion gases and the working gas, while the second heat exchange section 1350 acts as a regenerator where heat is transferred from or to the working gas. According to one embodiment, the regenerator 1350 comprises a screen like structure 1352 having a plurality of passages defined thereby. The working gas flows through these passages defined by the screen structure 1352. However, it will be appreciated that the screen structure 1352 may instead be formed of a platelet member, such as the second section 770 of the elements 690 shown in FIG. 16.

The working gas channel 1342 extends through the regenerator 1350 to the first section 1340. The working gas flows through this channel 1342. According to the present invention, a platelet working gas manifold 1500 is disposed on and bonded to the displacer piston cylinder 1310. The manifold 1500 is formed of a number of laminated diffusion bonded metal platelets that contain many manifold passageways 1502 which are formed using platelet technology. For example, the passageways 1502 may be formed by a chemical etching process and are utilized in the head end dome of the Stirling cycle engine. The manifold 1500 is bonded directly to the displacer piston cylinder 1310 and serves to distribute working gas to the plate 1400 as will be described. As shown in FIG. 27, the passageways 1502 are both horizontally and vertically formed. At least some of the vertically orientated passageways 1502 open into the piston chamber 1320. This serves as the means for introducing working gas above the displacer piston (not shown). The passageways 1502 are thus in fluid communication with the channel 1342 to distribute the working gas over a large area of the displacer piston cylinder 1310.

The working gas heat exchange plate 1400 is disposed above the manifold 1500 and preferably is bonded thereto. One exemplary plate 1400 is best shown in FIG. 28. The plate 1400 may comprise a flat disk metal platelet or it may be in the form of a bent and pleated cup shaped heat exchanger. The later embodiment resembles a plurality of stacked and bonded tin foil muffin cups and thus, this embodiment may be referred to as a "muffin liner" heat exchanger configuration. As best shown in FIG. 28, the exemplary plate 1400 has an annular disk having a plurality of channels 1410 formed on at least one surface thereof. Because of the annular shape of the plate 1400, the channels 1410 are radial channels, which extend from a center region 1412 of the plate 1400 to an outer edge 1414 of the plate 1400. The width of the channel 1410 may vary along the length thereof and in the illustrated embodiment, the channel 1410 has a greater diameter near the outer edge 1414 than at the center region 1412.

Because the plate 1400 is disposed on top of the manifold 1500, the passageways 1502 are provided with small entrance ports, which are in fluid communication with at least some of the channels 1410. In addition, the channel 1342 is also in fluid communication with the plate 1400 and actually the channel 1342 delivers the working gas to the plate 1400. The working gas then flows through the great number of channels 1410 before flowing through the entrance ports and into the passageways 1502 of the manifold 1500 and then ultimately into the piston chamber 1320.

One face 1401 of the plate 1400 faces a combustion chamber 1390, which contains hot combustion gases. The flowing hot combustion gases transfer heat to the working gas flowing through the channels 1410. By providing a great number of radial channels 1410, the working gas is effectively and uniformly distributed and heated and then delivered to the manifold 1500 where the hot working gas is then delivered to the piston chamber 1320. When the working gas flows in the reverse direction during the operation of the Stirling engine and more specifically in response to movement of the displacer piston (not shown), the opposite occurs in that the working gas is heated as it flows along the channels 1410 to the channel 1342 before flowing to the regenerator 1350, where the working gas experiences a significant decrease in temperature due to heat transfer. The effective heat transfer that is provided by the plate 1400 eliminates the need for the present day ceramic insulation technology normally used in the hot end of the Stirling engines. It also provides for a more effective and efficient heat transfer surface area resulting in a more compact and lighter weight hot end. The channels 1410 formed in the plate 1400 thus act as heat transfer passageways to efficiently heat the working gas and to provide metal cooling capability.

The combustion device 1300 includes an injector/ignition device 1309, which acts to provide fuel and air to the combustion chamber 1390. The device 1309 has a body, which defines the combustion chamber 1390 and generally has an annular shape. The body has a sidewall 1317, which has formed therein a pre-heated air channel 1319. Extending between the sidewall 1317 is a platelet member 1321, which actually forms an upper wall enclosing the combustion chamber 1390. The platelet member 1321 has a plurality of fuel channels 1323 and a plurality of air channels 1325 formed therein for delivering fuel and air to the combustion chamber 1390. In addition, the device 1309 includes an ignitor 1327, e.g., a spark plug, which causes combustion of the fuel/air mixture. By using platelet technology, the channels 1323, 1325 are carefully formed and tailored to provide the desired fuel/air mixture. For example and according to one embodiment, a fuel rich mixture is provided to the combustion chamber 1390. In one embodiment, the mixture is about 40% air and 60% fuel and the temperature within the combustion chamber 1390 is about 2700° R. Opposite the platelet member 1321, the combustion chamber 1390 opens into a space 1331, which is above the face 1401 of the plate 1400. Thus, the hot combustion gases are in contact with the face 1401 and this results in heat transfer from the hot combustion gases through the plate 1400 to the working gas flowing therein. Because of the annular nature of the plate 1400 and the combustion device 1300, the space 1331 is also annular in nature. The platelet air injector 1600 forms a part of the combustion device 1300 and is in communication with the preheated air channel 1319. Thus, the space 1331 is defined between the platelet air injector 1600 and the plate 1400 and the hot combustion gases are channeled through this space 1331 to an exhaust manifold 1700. As best shown in FIG. 27, the manifold 1700 defines an exhaust channel 1702 for delivering the combustion gases to one or more exhaust ports 1704.

The air injector 1600 is formed of a plurality of bonded platelets. The combustion device 1300 also has an associated ambient air manifold 1800, which directs ambient air into an ambient air channel 1802, which directs air into a pre-heater device, generally indicated at 1900. The ambient air manifold 1800 has a complementary shape to the exhaust manifold 1700 and in one embodiment, is disposed around the exhaust manifold 1700. Both manifolds 1700, 1800 are generally annular members disposed around the cylinder 1310 and extend upwardly toward the platelet member 1321. Because of the close relationship between the manifolds 1700, 1800, the ambient air flowing through the channel 1802 is heated by the hot combustion gases that are exiting the combustion chamber 1390 through the exhaust channel 1702.

This partially heated ambient air is delivered to the pre-heater device 1900, which is generally disposed above the air injector 1600. The pre-heater device 1900 receives the partially heated ambient air and acts to provide additional heat to the ambient air. The device 1900 is operatively connected to a plurality of air orifices 1610 formed in the platelet injector 1600. The air orifices 1610 are formed in the platelet structure and provide entrances into the space 1331, where the hot combustion gases are flowing from the combustion chamber 1390. Thus, the air orifices 1610 are designed to provide multi-stage micro-combustor air injection "staging" of the combustion with the addition of more combustion air (the pre-heated ambient air) as it passes over the face 1401 of the plate 1400. This design provides for a very uniform temperature and heat input to the plate 1400 and also the combustion gases are continuously maintained at a temperature well above the temperature necessary to re-ignite the fuel-rich gases. By successively feeding ambient air into the combustion gases, additional combustion occurs resulting in the combustion gases maintaining heat instead of having a decreasing temperature due to loss of heat to the plate 1400. In this manner, the combustion gases flow into the exhaust channel 1702 at a temperature much greater than would have been the case had the combustion gases simply flowed from the combustion chamber 1390 and over the plate 1400, where heat transfer takes place. By maintaining the exhaust gases at elevated temperatures, the ambient air flowing into the channel 1802 is more effectively heated.

The air injector 1600 is essentially a platelet manifold that provides air to the fuel rich unburned combustion gases and in combination with the device 1900 serves to pre-heat the incoming ambient air. All augmentation air is injected from swirler orifices 1610 that are regeneratively cooled as best shown in FIG. 29. FIG. 29 illustrates that the orifices 1610 may have different sizes and the number of orifices will likely vary depending upon the size and shape of the orifices 1610. The air is then aimed at the face 1401 of the plate 1400 to enhance combustion mixing and aid in heat transfer. In addition, by encasing the plate 1400 (which reaches high temperatures) and the upper end of the hot end with the pre-heater 1900 and the ambient manifold 1800, the outer surfaces of the system are maintained near ambient temperature conditions thus eliminating the need for external protective insulation.

This embodiment utilizes multi-staged micro-combustion for burning the fuel rich gas to completion resulting in significant advantages. First, the initial stage of the burning takes place at a low fuel/air ratio. This results in a cooler flame temperature and results in more durable fuel and air injectors, combustion chamber walls, and helium heat exchanger walls. Second, the overall combustion gas volume required by the multi-stage combustor is much less than a conventional burner design for several important reasons. This type of combustor has a much cooler initial fuel rich gas combustion stage which has much less volume than would be required in 100% of the air required for stoiochiometric combustion were used for initial stage combustion. The combustion requires less volume because the combustion gases are much denser since they are cooler than stoichiometrically burned gases and the combustion gases do not contain any exhaust gas recirculation, a technique commonly used to cool the combustion gases.

Furthermore, this approach maintains the combustion process at an almost constant temperature which is much cooler than the stoiochiometric value that would have occurred if the combustion had taken place in one step and gases had not been continuously cooled down by transferring heat to the plate 1400 and then being reheated in multiple micro-combustion stages. Each orifice 1610 may be thought of as being associated with one micro-combustion stage in which the gas is reheated by introducing ambient air to the combustion gases causing more combustion. The uniform lower combustion gas temperature reduces the thermal gradients in the structural components forming both the plate 1400 and the staged air injection manifold 1600 and the pre-heater 1900. The cooler multi-stage micro-combustion process results in significantly less $NO_x$ formation and therefore provides a cleaner final exhaust.

It will also be appreciated that the platelet principles discussed herein may be adapted to provide a multiple cylinder platelet hot end. In Stirling engines that have multiple cylinders, each cylinder will have its own platelet hot end. Conventionally, multiple cylinder Stirling engines have used a single hot end serving all cylinders of the engine. There are several disadvantages associated with a construction where one hot end is used to supply the heat for all cylinders. First, the efficiency of the system is usually not optimized as heat is wasted because of the size of the hot end, which is needed to supply heat to all cylinders. Second, the maintenance and repair of this single hot end and the cylinders themselves are difficult because the single hot end serves all cylinders and therefore must be dealt with during maintenance or repair of any of the cylinders.

In contrast, the platelet hot end construction disclosed herein provides a more modular type arrangement in that each cylinder has its own platelet hot end unit. In other words, the device shown in FIG. 27 is used with one cylinder and each cylinder has its own corresponding hot end unit formed of platelets. This provides greater efficiency and versatility. Because each cylinder is powered by its own closed loop platelet hot end unit, the efficiency of the overall Stirling engine is increased because the energy waste per each cylinder is significantly reduced. In other words, a reduction in the amount of energy wasted in the operation of each cylinder results in increased operating efficiency.

Another advantage is that the modular type arrangement permits one modular hot end unit to be repaired or replaced without requiring the other hot end units to be taken apart or otherwise disrupted. For example, if one cylinder needs to be repaired, the platelet hot end unit for this particular unit is removed or otherwise worked on, while the other platelet hot end units are left in tact.

Figure 30:
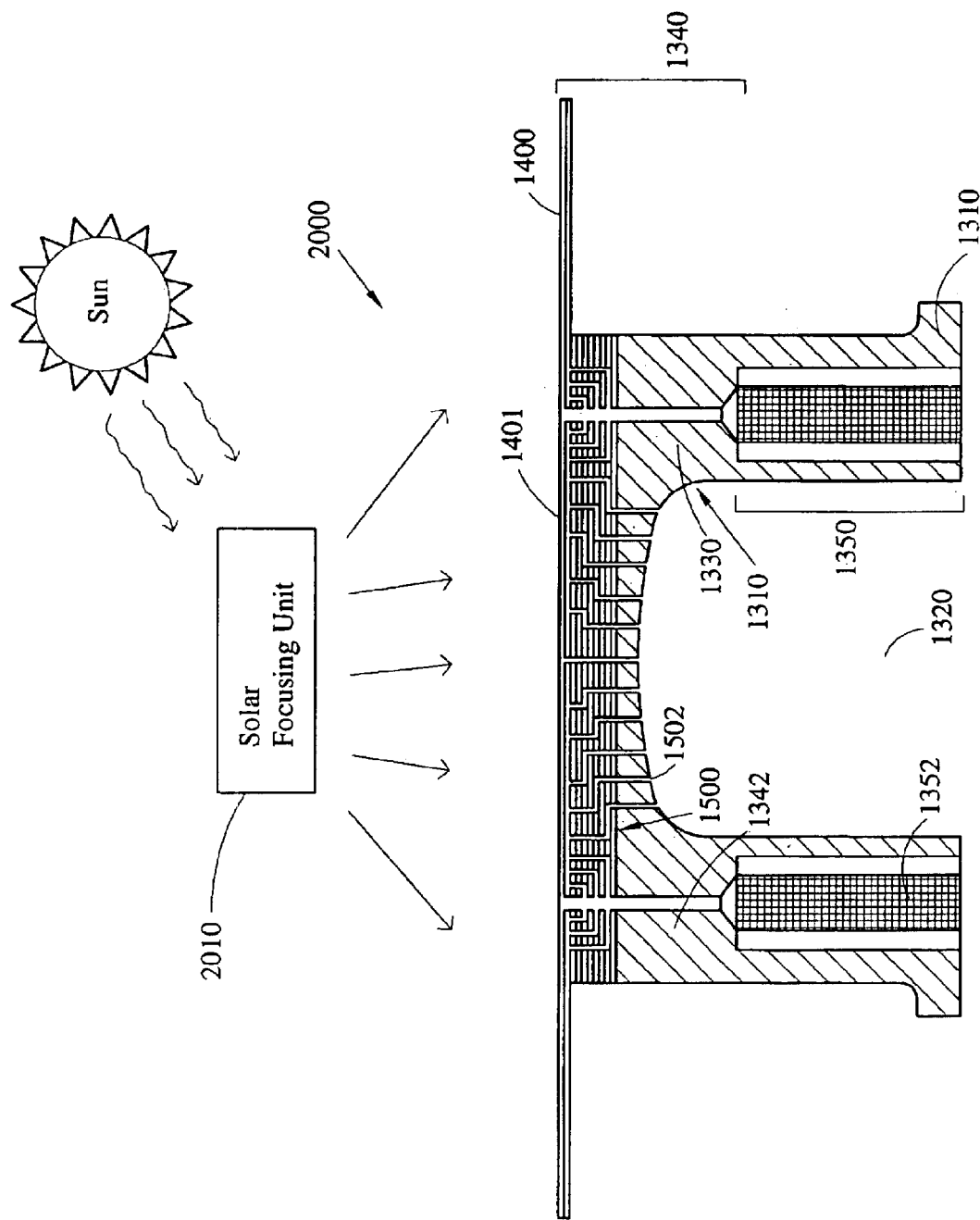
FIG. 30 is a cross-sectional view of a working gas heat exchanger illustrating a hot end having a solar focusing unit for providing energy to the working energy.

FIG. 30 illustrates another embodiment of a Stirling engine constructed using a platelet design and having a heat transfer manifold or hot end 2000. This embodiment is similar to the embodiment shown in FIGS. 27–29 and therefore like components are numbered alike and will not be discussed in any detail. The major difference between the hot end 2000 of FIG. 30 and the hot end constructions of the previously-discussed embodiments is the manner of heating the working gas. The prior embodiments were combustion based systems having a combustion device, such as device 1300 of FIG. 27, which served to convert fuel into heat which was then transferred to the working gas as it flowed through discrete channels formed in the platelets at the hot end. The hot end 2000 of this embodiment eliminates the combustion device 1300 and instead uses solar energy as the means for heating the working gas flowing through the platelet manifold 1400.

The solar hot end 2000 may be constructed in a similar manner as the embodiment in FIG. 27 with the exception that the upper portion of the hot end 2000 is the working gas heat exchange plate 1400 instead of the combustion device 1300, which is eliminated. The heat exchange plate 1400 may have the construction shown in FIG. 28 or it may have a different construction. The heat exchange plate 1400 is disposed on top of the manifold 1500. Channels formed in the heat exchange plate 1400 are in fluid communication with passageways 1502 formed in the manifold 1500. The working gas is thus permitted to flow within a circuit defined by the piston chamber 1320, the manifold 1500, the heat exchange plate 1400 as well as the working gas channel 1342 which are part of the first heat exchange section 1340.

In this embodiment, the one face 1401 of the heat exchange plate 1400 is an exposed surface of the hot end 2000. A solar focusing unit 2010 is used to focus sunlight directly on the one face 1401 so as to provide an energy source for heating the working gas (e.g., helium) as it flows through the numerous intricate channels formed in the heat exchange plate 1400. The solar focusing unit 2010 may comprise any number of commercially available units, which act to focus sunlight into a concentrated area, in this case the one face 1401 of the heat exchange plate 1400. The solar focusing unit 2010 will normally include some type of mirror array or lens construction, which focuses sunlight onto a small, precise area at an elevated intensity. For example, some lenses are available that can concentrate the sunlight to 20 times its normal intensity.

It will be appreciated that the precise type and strength of the lens or other components of the solar focusing unit 2010 will depend and vary from application to application. For any given application, the solar focusing unit 2010 can be optimized by focusing sunlight of an optimized intensity on the one face 1401. One of skill in the art will understand that solar units have different maximum intensity values. It is desirable to optimize the sunlight intensity and other characteristics of the focused sunlight in order to optimize efficiency of the working gas heat transfer operation and thus optimize the efficiency of the Stirling engine itself. If the sunlight intensity is too high, then the heat exchange plate 1400 or other components may become damaged by exposure to excessive heat. Conversely, if the sunlight intensity is too low, then an inefficient heating of the working gas results because the heat transfer to the working gas is less than optimized. This results in the working gas not reaching the desired temperatures to ensure optimal operation of the Stirling engine.

Figure 31:
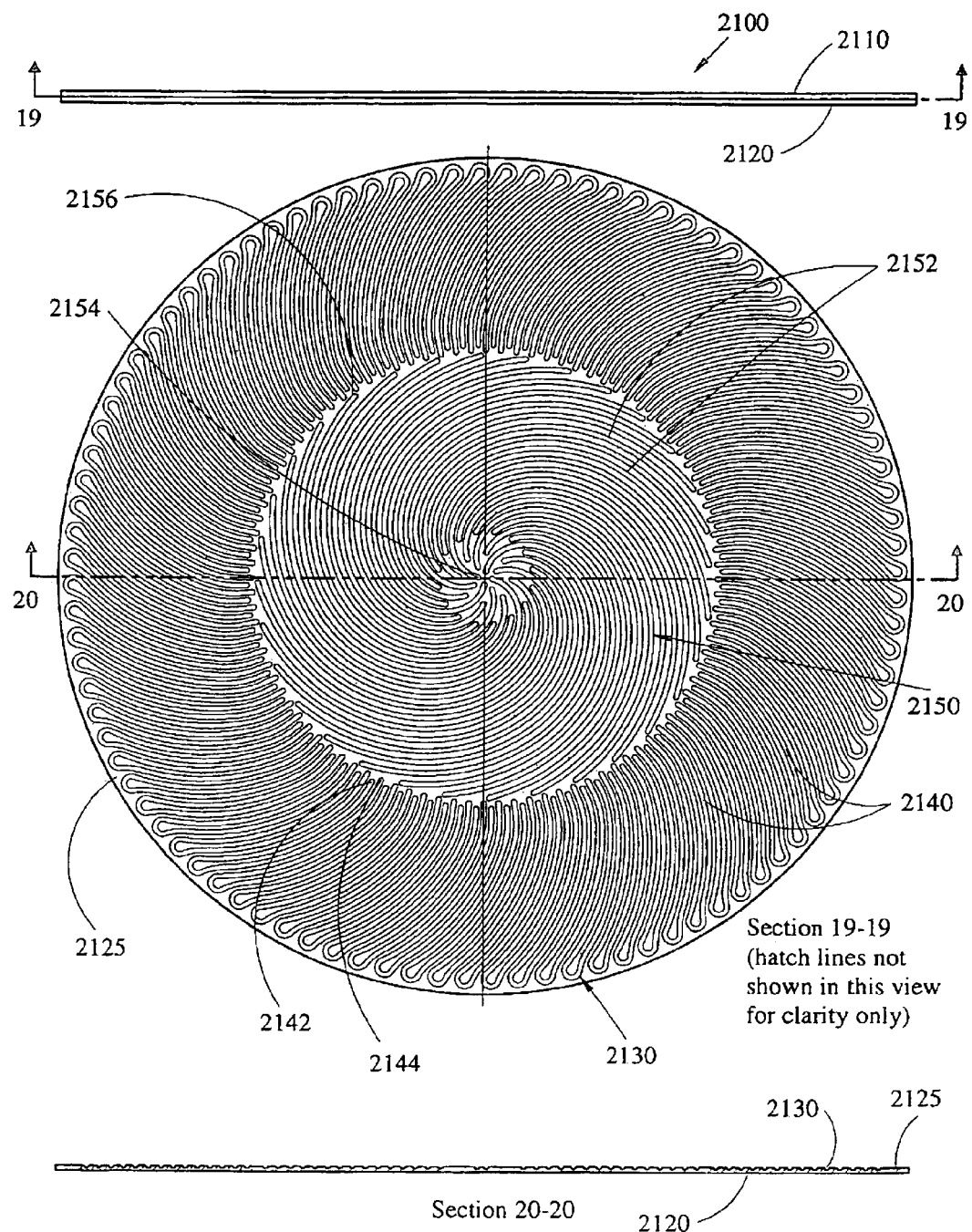
FIG. 31 is a bottom plan view of another exemplary working gas heat exchange platelet.

FIG. 31 illustrates a working gas heat exchange plate 2100 of another embodiment. In one embodiment, the heat exchange plate 2100 is used in place of the heat exchange plate 1400 (FIG. 27 and FIG. 30) and accordingly, is designed to provide fluid flow of the working gas from and to the other components of the system. The exemplary heat exchange plate 2100 has a first face 2110, which is designed to face away from the piston chamber 1320 (see FIG. 30) and a second face 2120, which faces the piston chamber 1320 and is disposed over the manifold 1500. The heat exchange plate 2100 is an annular shaped disk consists of two or more individual platelets. The individual platelet has a plurality of channels formed in the first face 2125. More specifically, the channels are arranged in two discrete radial circuits. A first outer circuit, generally indicated at 2130, is formed of a plurality of first channels 2140 and a second inner circuit, generally indicated at 2150, is formed of a plurality of second channels 2152. Optionally, channels (not shown) can be formed in the face 2110 to reduce the mass of the plate 2100. These channels may have a similar pattern as the channels 2140, 2152 or they may assume other patterns. By forming channels in the face 2110, the overall weight of the plate 2100 is advantageously reduced without jeopardizing the performance thereof. The channels in the face 2110 also increase heat transfer by creating turbulent flow and simultaneously reducing the wall thickness of the channels 2140 and 2152.

The first and second circuits 2130, 2150 are arranged in a concentric manner in the illustrated embodiment. Each channel 2140 of the first outer circuit 2130 is kept separate from the other channels 2140 and includes a first end 2142 and a second end 2144. The channel 2140 is formed in a looped configuration where the first and second ends 2142, 2144 are proximate one another. Because of the annular shape of the plate 2100, the channels 2140 are radially formed and in one aspect of this embodiment, the spacing between adjacent channels 2140 is kept constant. As best shown in FIG. 31, each channel 2140 has a generally elongated, narrow U-shape, which is radially curved also. The channels 2140 are formed within the heat exchange platelet 2100 using any number of techniques described hereinbefore. Platelet techniques permit discrete, small dimension channels to easily be formed in the platelet substrate, which in this case is the heat exchange plate 2100. Therefore, the precise spacing between the channels 2140, the number of channels 2140, and the shape and dimensions of the channels 2140 can be carefully controlled and tailored. Each of the channels 2140 preferably has the same length.

The second inner circuit 2150 is formed within the center of the first outer circuit 2130. The plurality of channels 2152 are also formed in a radial arrangement within the heat exchange plate 2100. In one exemplary embodiment, the channels 2152 are arranged in a swirl-like pattern with each channel 2152 having a first end 2154 and a second end 2156. The first ends 2154 converge toward the center of the heat exchange plate 2100, while the second ends 2156 define an outer edge of the first inner circuit 2150. Each channel 2150 is formed with a defined curvature and preferably the defined curvature for each channel 2150 is the same so that each of the channels 2150 has the same length. The channels 2150 should be formed so that each is curved in the same direction, thereby providing the swirl-like pattern. The second ends 2156 are formed proximate to the first and second ends 2142, 2144 of the channels 2140.

The spacing between the channels 2152 is kept constant. The spacing between the channels 2152 does not necessarily have to be the same as the spacing between the channels 2140. In the illustrated embodiment, the spacing between the channels 2152 is greater than the spacing between the channels 2140. Accordingly, each of the circuits 2130, 2150 maintains a constant spacing between its own channels 2140, 2152, respectively. This spacing is a function of the radius.

In another aspect, the length of each of the channels 2140 is about equal to the length of each of the channels 2152. The swirl-like pattern of this embodiment permits not only a dual circuit construction but also permits the lengths of the channels 2140, 2152 to be greater than the channel lengths of prior embodiments, such as the embodiment of FIG. 27. The channels of FIG. 27 are more of a linear spoke-like fashion, which reduces the overall length that each of them can assume.

The swirl-like pattern of FIG. 31 provides an advantageous arrangement because efficient heat transfer is a function of the number of channels in which the fluid flows and also the lengths of the respective channels. By increasing the length of the channels and maintaining a great number of channels, more efficient heat transfer is realized. In one embodiment, the surface area of the channels 2140 is approximately the same as the surface area of the channels 2152. In this embodiment, the fluid (e.g., the working gas), which flows within the heat exchange plate 2100, is delivered to the plate 2100 such that approximately half of the fluid (by volume) is directed into the first outer circuit 2130, while the other half of the fluid is directed into the second inner circuit 2150.

In order to accomplish this, the heat exchange plate 2100 is fluidly connected to the other components of the hot end (e.g., the manifold 1500) such that discrete fluid passageways fluidly communicate with the channels 2140 and other discrete fluid passageways fluidly communicate with the channels 2152. For example, the passageways 1342 (FIG. 27) may be fluidly connected to the channels 2140 while the channels 1502 (FIG. 27) may be in fluid communication with the channels 2152.

The use of a dual circuit flow construction within the heat exchange plate 2100 provides increased versatility and design options. More specifically, the components of the hot end, such as the manifold 1500, can be tailored to provide inlets and outlets connected to each of the first outer circuit 2130 and the second inner circuit 2150. Improved heat transfer results because the fluid (e.g., the working gas) is spread out over a great number of channels 2140, 2152 and is exposed to either a combustion device (FIG. 27) or a solar focusing unit (FIG. 30) which transfers heat energy to the fluid. The heat exchange plate 2100 also results in a more elastic working gas heat exchange structure since the heat exchange plate 2100 provides more opportunity for channels to be formed therein resulting in increased flexibility.

Another advantage of the dual circuit configuration of FIG. 31 is that it provides adequate bonding surface area between channels 2140 and between channels 2152. As with the heat exchange plate 1400 of FIG. 27, the heat exchange plate 2100 of FIG. 31 is disposed on top of the manifold 1500, which is also formed of a platelet construction. Accordingly, the heat exchange plate 2100 is bonded to the platelet manifold 1500 using the techniques described hereinbefore. In order to ensure a strong bond between the heat exchange plate 2100 and the manifold 1500, an adequate bonding surface needs to be provided on each member so that these surfaces mate together and bond together during the bonding operation. The heat exchange plate 2100 provides a bonding surface, which is preferably uniform across its diameter. By having constant spacing between the channels 2140, 2152 of each of the circuits 2130, 2150, a uniform bonding surface area is provided within each of the circuits 2130, 2150 between the channels 2140, 2152. In contrast, the plate 1400 of FIG. 28 does not have a uniform bonding area as the outer radial spacing between the channels 1410 is greater than the inner radial spacing between the channels 1410. This results in the outer radial edge of the plate 1400 having more bonding surface area than the inner radial edge of the plate 1400.

Figure 32:
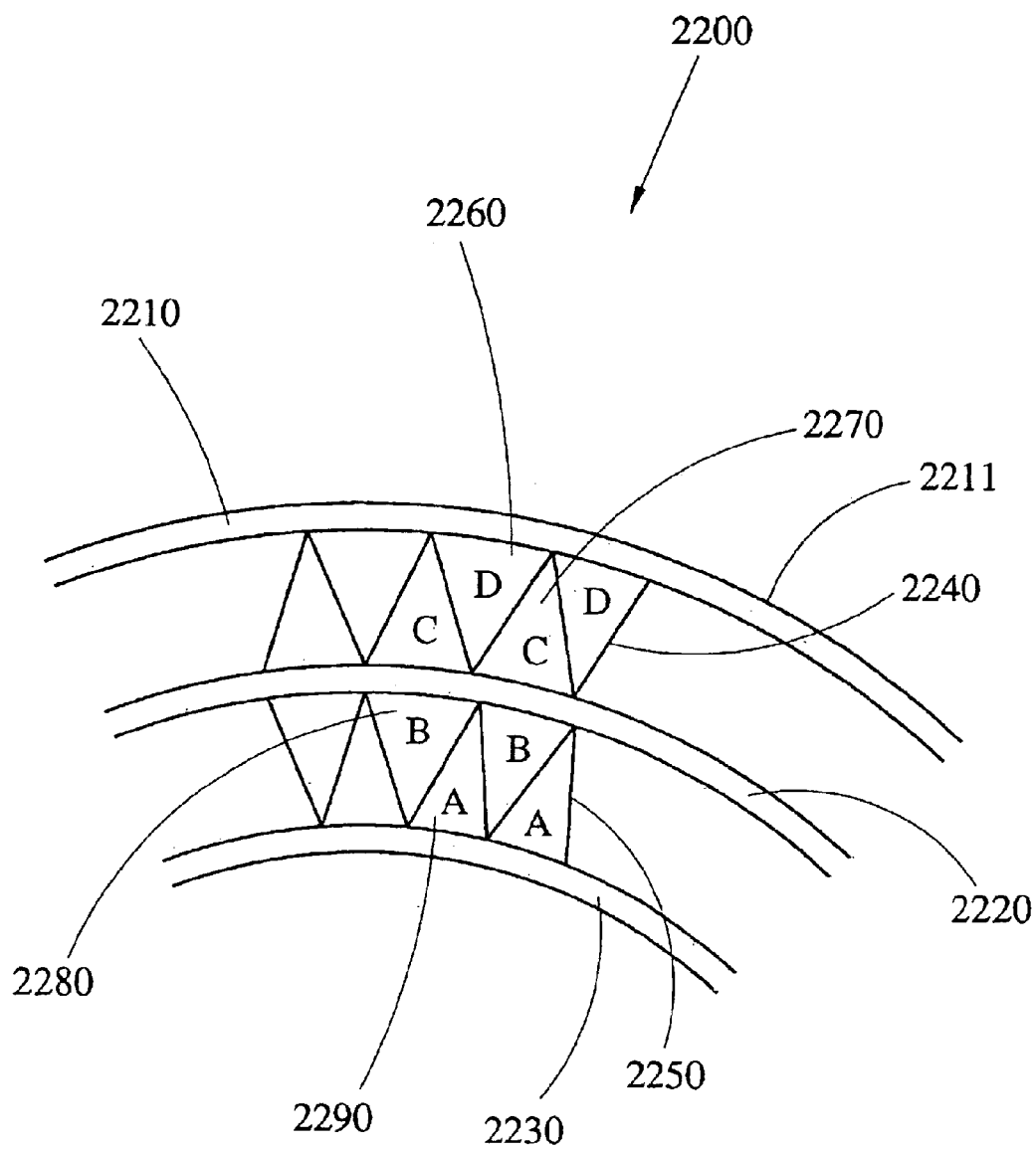
FIG. 32 is a top plan view of a bi-directional fluid transfer duct for use in a hot end of the Stirling engines of the prior embodiments.
Figure 33:
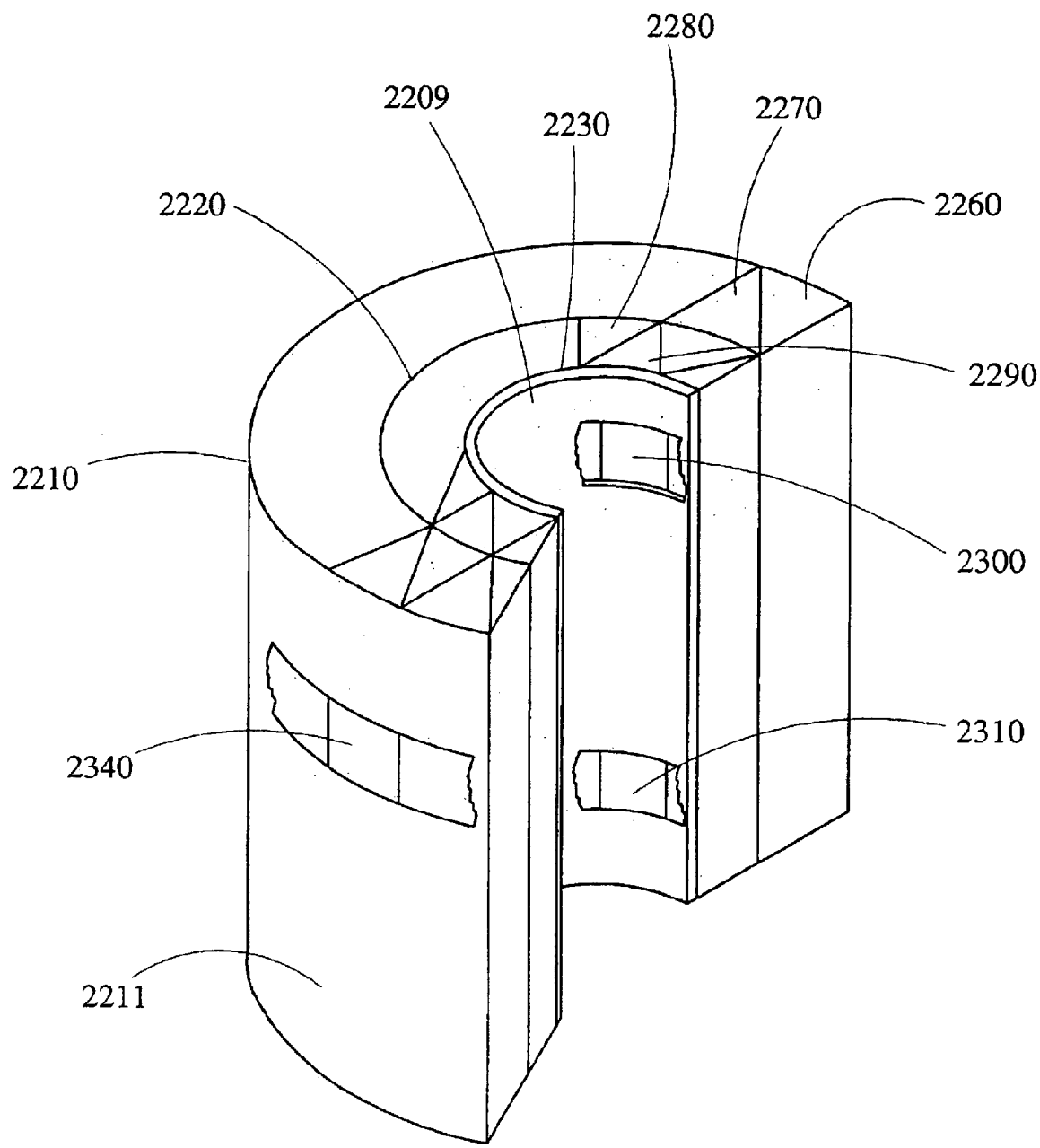
FIG. 33 is a perspective view of the bi-directional fluid transfer duct of FIG. 32 showing inlet and outlet ports formed therein for directing the fluid with discrete flow circuit flow paths.
Figure 34:
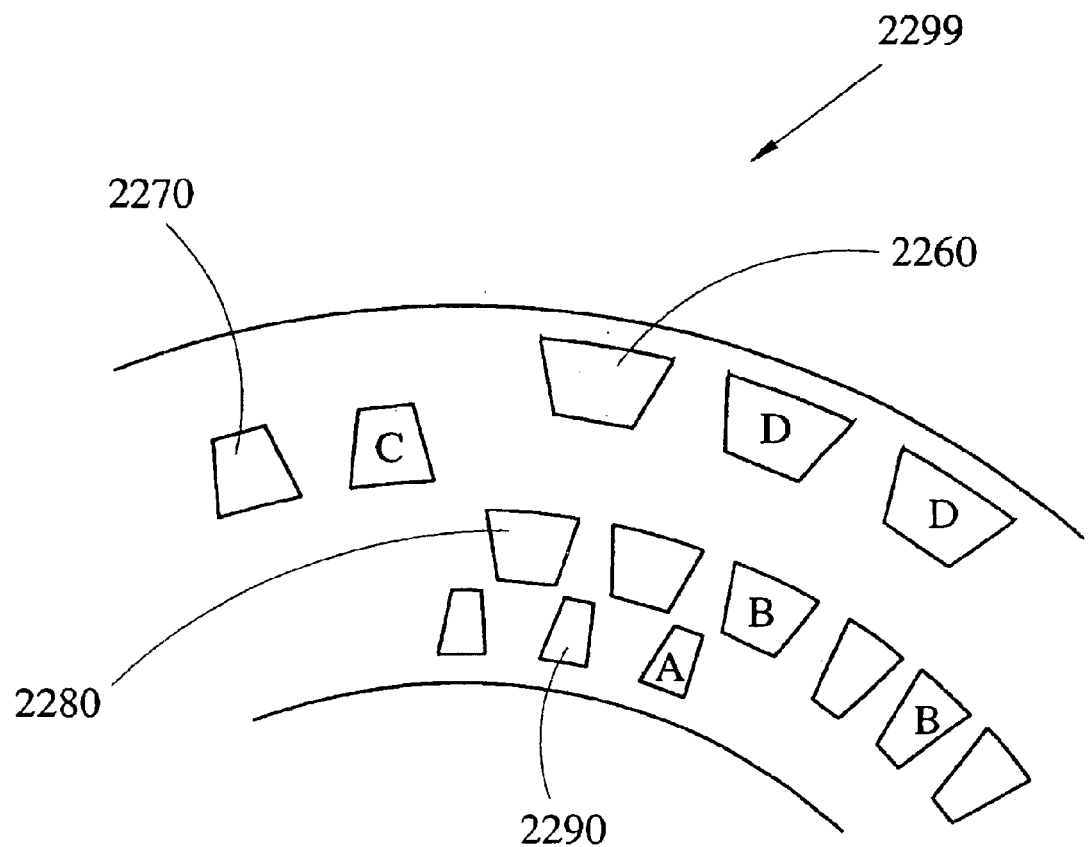
FIG. 34 is a top plan view of an end plate for use with the bi-directional fluid transfer duct of FIG. 32 to provide fluid inlets and/or outlets into and out of the discrete flow circuit flow paths.

FIGS. 32–34 illustrate a bi-directional fluid transfer duct, generally indicated at 2200. In fluid and thermal management systems, the occasion may arise where a hot (or cold) fluid must first flow in one direction then reverse flow in the opposite direction. Furthermore, it may be desirable to have a second fluid circuit also flow in the system either bi-directionally or uni-directionally. This second fluid circuit defines a flow path for a second fluid, which can be at a different temperature than the first fluid flowing in the first fluid circuit. The second fluid can flow in either one or both directions in the second fluid circuit. It may be further advantageous to either enhance heat transfer (heat exchange) or thermally insulate temperature differential between the two fluid streams while in transit.

FIG. 32 is a top plan view of the bi-directional fluid transfer duct 2200. The duct 2200 includes a first annular wall 2210, a second annular wall 2220, and a third annular wall 2230. Preferably, the first, second, and third annular walls 2210, 2220, and 2230 are concentric with respect to one another. In this embodiment, the first annular wall 2210 is an outermost member, the third annular wall 2230 is the innermost member, and the second annular wall 2220 is an intermediate member. Each of the first, second, and third walls 2210, 2220, and 2230 may be thought of as being a cylindrical structure.

The duct 2200 further includes a first heat exchange element 2240 and a second heat exchange element 2250. The first heat exchange element 2240 defines a first flow circuit and the second heat exchange element 2250 defines a second flow circuit. The first heat exchange element 2240 is disposed between the first annular wall 2210 and the second annular wall 2220 and the second heat exchange element 2250 is disposed between the second annular wall 2220 and the third annular wall 2230. In one embodiment, the first and second heat exchange elements 2240, 2250 each is in the form of a corrugated metal sheet.

The first corrugated heat exchange element 2240 defines two distinct fluid circuits, namely first fluid circuits 2260 and second fluid circuits 2270. The first fluid circuits 2260 generally border the first annular wall 2210 and the second fluid circuits 2270 generally border the second annular wall 2220. In the exemplary embodiment, each of the fluid circuits 2260, 2270 is generally pie-shaped with the cross-sectional area of the first fluid circuit 2260 being greater near the first annular wall 2210 and the cross-sectional area of the second fluid circuit 2270 being greater near the second annular wall 2220. It will be understood that the term "fluid" describes any number of fluids that are suitable for flowing within the first and second flow circuits. For example, the fluids may be in a liquid form, a gaseous form, or a combination thereof or in another form in which the fluid can flow within the flow circuits. In one embodiment, a gas, such as air, flows within the first flow circuit and a gas or liquid flows within the second flow circuit. In another embodiment, a liquid, such as water, flows within the first flow circuit and a gas flows within the second flow circuit.

Similarly, the second corrugated heat exchange element 2250 defines two fluid circuits, namely third fluid circuits 2280 and fourth fluid circuits 2290. The second corrugated heat exchange element 2250 is disposed between the second and third annular walls 2220, 2230 such that the third fluid circuits 2280 generally border the second annular wall 2220 and the fourth fluid circuits 2290 generally border the third annular wall 2230. In this embodiment, the third and fourth circuits 2280, 2290 are also pie-shaped with the third fluid circuits 2280 bordering the second fluid circuits 2270. In the illustrated embodiment, each of the first, second, third and fourth fluid circuits 2260, 2270, 2280, 2290 has the same cross-sectional area as the others. It will be appreciated that the fluid circuits 2260, 2270, 2280, and 2290 can assume any number of shapes besides the illustrated shape.

However, it will be appreciated that the cross-sectional areas of the first, second, third, and fourth fluid circuits 2260, 2270, 2280, 2290 may differ from one another depending upon the given application. For example, the distance between the second and third annular walls 2220, 2230 may be increased relative to the distance between the first and second annular walls 2210, 2220 resulting in the third and fourth fluid circuits 2280, 2290 occupying a greater area than the first and second fluid circuits 2260, 2270. Alternatively, the distance between the second and third annular walls 2220, 2230 may be made reduced compared to the distance between the first and second annular walls 2210, 2220. This results in the third and fourth fluid circuits 2280, 2290 occupying a lesser area than the first and second fluid circuits 2260, 2270.

Exemplary uses of the duct 2220 will now be described; however, the following examples are merely exemplary and do not limit the scope of potential uses. In a first application, both a first fluid flowing in the first flow circuit and a second fluid flowing in the second flow circuit are maintained at nearly equal temperatures and heat exchange is not an issue. In a first case, both fluids are bi-directional in that the first fluid flows up and down in the first flow circuit and the second fluid flows up and down in the second flow circuit. The configuration of the first and second flow circuits permits the first fluid to either travel up or down the first fluid circuit 2260 and then flow in an opposite direction in the second fluid circuit 2270. Similarly, the second fluid may travel either up or down the third fluid circuit 2280 and then flow in an opposite direction in the fourth fluid circuit 2290. When heat transfer is not desired, as in this embodiment, the bi-directional flow capabilities in each of the first and second flow circuits provides versatile fluid routing for the first and second fluids. This permits the user to easily and conveniently deliver and/or remove the first and second fluids to or from one location of the duct 2200.

In a second case, the first and second fluids are still at nearly equal temperatures and heat exchange is not an issue. In this second case, one of the first and second fluids is bi-directional while the other is uni-directional. For example, the first fluid travels up or down the first fluid circuit 2260 and then flows in an opposite direction within the second fluid circuit 2270. The second fluid flows either up or down either the third or fourth circuit 2280, 2290. Thus, one of the third and fourth circuits 2280, 2290 does not have a fluid flowing in it and therefore remains unoccupied.

In another embodiment, the duct 2200 is used to transfer the first and second fluids having different temperatures. However, heat exchange is undesirable in this embodiment and therefore the first and second fluids must be properly located relative to one another. One of the first and second fluids flows bi-directionally while the other flows uni-directionally. For example, the second fluid flows up the fourth fluid circuit 2290 and flows down the third fluid circuit 2280, while the first fluid flows either up or down the first fluid circuit 2260. In this embodiment, the second fluid circuit 2270 is left unoccupied because heat transfer between the fluids flowing at different temperatures within the adjacent second and third fluid circuits 2270, 2280 is undesirable. By leaving the second fluid circuit 2270 unoccupied, a "buffer" or insulating zone is formed between the first and second fluid circuits 2260, 2270. This permits the first and second fluids to flow within their respective flow circuits without heat transfer occurring between the first and second fluids.

One potential application for this is to have the first fluid be a cooling fluid, which flows up the first fluid circuit 2260. The first fluid circuits 2260 are the circuits which border the first annular wall 2210 and therefore it is desirable if the fluid flowing within the outermost radial section of the duct 2200 has a temperature cool enough to permit the user to grip, touch, or otherwise manipulate the duct 2200. This self-insulating capability protects against having a hot exterior surface that can accidentally be touched and also reduces the amount of heat thrown off the external surface 2211 of the duct 2200 to a person in close proximity. Advantageously, the first fluid is also delivered to the upper portion of the duct 2200 where it can be directed to and used in one of the upper components of the Stirling engine (e.g., a combustion chamber).

In another embodiment, the first and second fluids are at different temperatures and heat exchange is desirable between the first and second fluids. One fluid flows in a bi-directional manner while the other fluid flows in a uni-directional manner. For example, the second fluid travels either up or down the fourth fluid circuit 2290 and then flows in the opposite direction in the third fluid circuit 2280. The first fluid flows either up or down the second fluid circuit 2270 with the first fluid circuit 2260 being unoccupied. Because the first and second fluids are at different temperatures, heat transfer results between adjacent fluid circuits. In other words, the higher temperature fluid flowing either in the second fluid circuit 2270 or the third fluid circuit 2280 will transfer some of its heat to the fluid flowing in the other of the second and third fluid circuits 2270, 2280. This configuration permits fluids to be thermally managed in a system, which provides for bi-directional flow. The fluids can be transferred within the duct 2200 from one location to another location in an environment in which heat transfer is permitted or discouraged between the fluids.

Once the flow direction and circuit location of each of the fluids is determined, the entry and exit locations for each of the fluids are determined. FIG. 33 illustrates various methods of introducing fluids into and out of the first and second fluid flow circuits from either an internal surface 2209 or an external surface 2211 of the duct 2200. More specifically, first and second windows 2300, 2310 are formed in the internal surface 2209 of the duct 2200. The internal surface 2209 is actually an inner surface of the third annular wall 2230. In the illustrated embodiment, the first window 2300 is formed in an upper portion of the third annular wall 2230 and the second window 2310 is formed in a lower portion of the third annular wall 2230. The first and second windows 2300, 2310 are illustrated as generally being in axial alignment; however, they do not have to be arranged in such a manner (e.g., they can be formed in a non-axial arrangement). The first and second windows 2300, 2310 may assume any number of shapes and sizes so long as each one is in fluid communication with the fourth fluid circuit 2290.

The first window 2300 may function as an inlet window receiving the second fluid which is to flow within the fourth fluid circuit 2290 or an outlet window, which receives the second fluid from the fourth fluid circuit 2290. The second window 2310 will thus function in an opposite manner compared to the first window 2300 in this embodiment. In other words, if the first window 2300 is an inlet window then the second window 2310 is an outlet window and vice versa.

It will also be appreciated that both the first and second windows 2300, 2310 may share a common function in that the first and second windows 2300, 2310 may either both function as inlet windows or both function as outlet windows. In the instance that they both function as inlet windows, the second fluid is introduced into the first and second windows 2300, 2310 and then flows within the fourth fluid circuit 2290 until it either exits at some location or is directed into the third fluid circuit 2280, where is flows in an opposite direction. In the instance that the first and second windows 2300, 2310 both function as outlet windows, the second fluid exits through the windows 2300, 2310 as it flows within the fourth fluid circuit 2290 from another location, such as the third fluid circuit 2280.

FIG. 33 also illustrates forming a third window 2340 in the external surface 2211 of the duct 2200. The third window 2340 is in direct communication with the first fluid circuit 2260 and functions as either an inlet window or an outlet window for the first fluid. Both the first and second fluids are typically pumped or otherwise directed through the first and second fluid circuits 2260, 2270 of the duct 2200 from one location to another location.

FIG. 34 illustrates another aspect of the duct 2200 and more specifically, FIG. 34 illustrates particular ways to introduce one or more of the first and second fluids into or out of the first and second flow circuits from either end of the duct 2200. The duct 2200 will usually have end plates, generally indicated at 2299 at one or both of its ends. The end plates 2299 may be constructed so that selected ones of the first, second, third and fourth circuits 2260, 2270, 2280, 2290 are open while selected ones are sealed. The circuits that are open serve to either receive or discharge the respective fluid flowing. In the exemplary embodiment shown in FIG. 34, only the circuits that are open are illustrated. For example, the illustrated first and second fluid circuits 2260, 2270 are formed such that the open circuits are offset from one another. However and as illustrated by the third and fourth fluid circuits 2280, 2290, opposing third and fourth fluid circuits 2280, 2290 may be open. The illustrated embodiment shows a set of third fluid circuits 2280 that are open across from a set of open fourth fluid circuits 2290.

Furthermore, another set of open third fluid circuits 2280 are shown as not having any open fourth fluid circuits 2290 facing them.

The entry and exiting manifolding for two bi-directional fluids is less complex if either the entry or exit manifold (e.g., window) for a bi-directional second fluid has its fourth fluid circuit 2290 manifold formed in the internal surface 2209 of the duct 2200, as shown in FIG. 33, while a bi-directional first fluid has its first fluid circuit 2260 manifold on the external surface 2211. Accordingly, the manifolds for the second and third fluid circuits 2270, 2280 are most readily located on one or more of the end plates 2299 (as demonstrated in FIG. 34). In the instance where the first fluid flow uni-directionally, the circuit manifold may be located either in one or more end plates 2299 or it may be formed in the external surface 2211 of the duct 2200. One of the more complex embodiments is where both the first and second fluids flow bi-directional and both the entry and exit manifolds for both the first and second fluids are formed in the same end plate 2299. Even in this embodiment, the manifolds may be formed to permit such entry and exiting of both fluids at the same end plate 2299.

Figure 35:
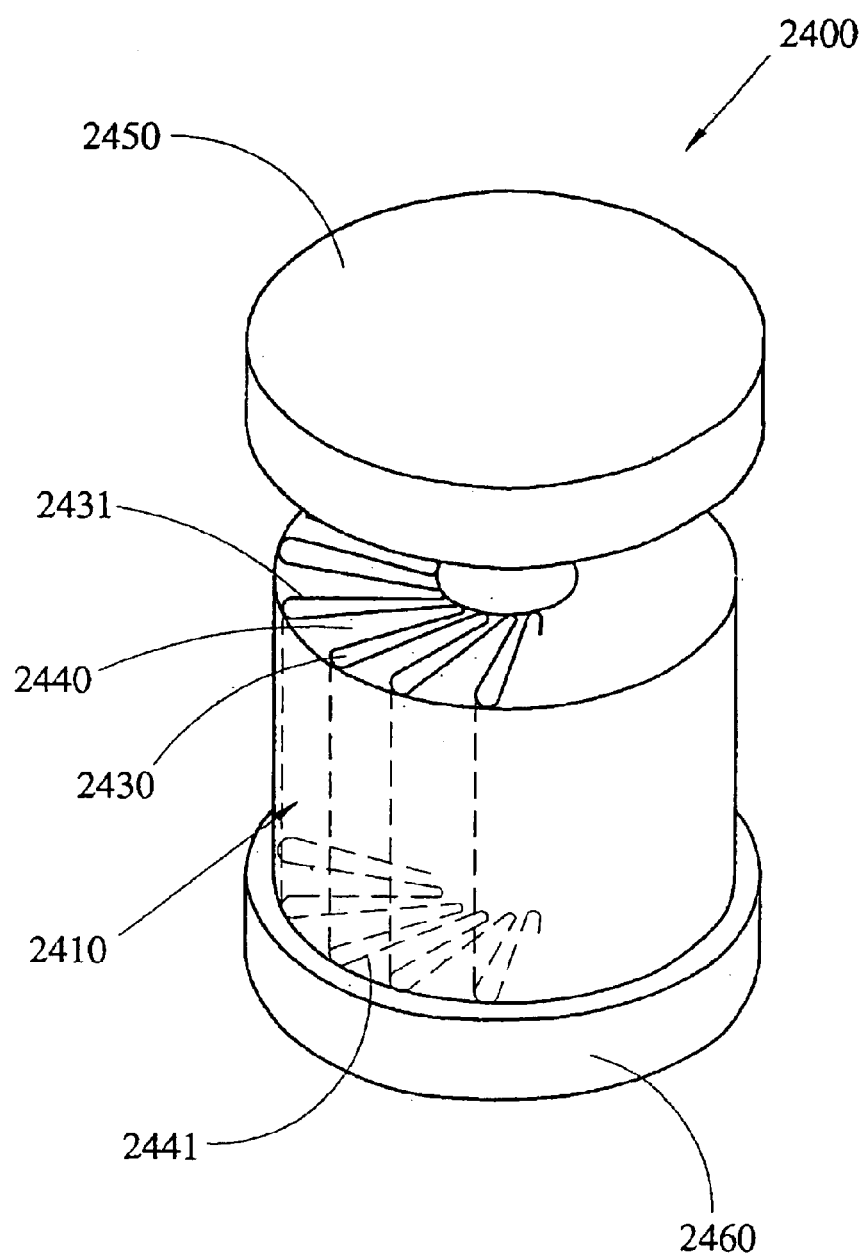
FIG. 35 is a partially exploded perspective view illustrating an exemplary heat exchanger.
Figure 36:
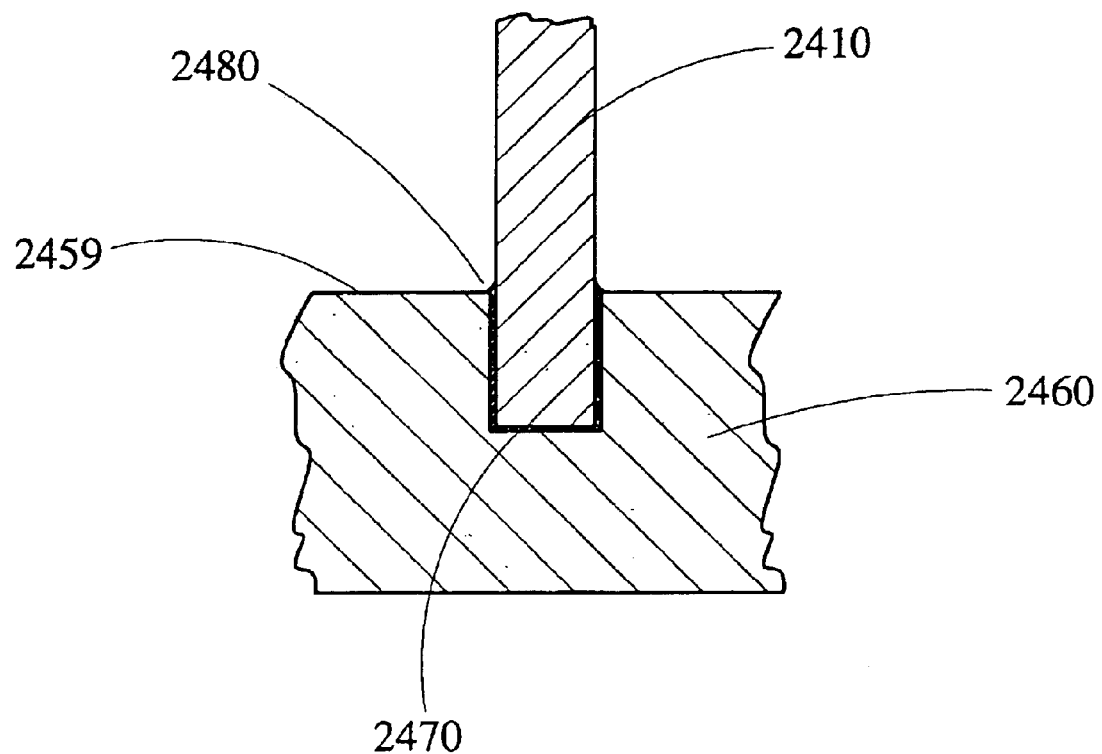
FIG. 36 is an enlarged partial view of a section of the heat exchanger of FIG. 35 illustrating a method of attaching end plates to the heat exchanger body.

FIGS. 35 and 36 illustrate yet another aspect of the present Stirling engine assembly. FIG. 35 is a partially exploded perspective view of a highly efficient heat exchanger, generally indicated at 2400. This type of heat exchanger 2400 is usually referred to as a pre-heater. Such a pre-heater is used to transfer wasted heat from exhaust products to incoming feed fluids. This enhances the economic efficiency of many energy conversion or chemical processes. High thermal efficiencies of these heat exchangers are characterized by (1) large surface areas between the two fluid streams, (2) thin and highly conductive materials separating the two streams, (3) low pressure drops, (4) uniform mass distributions between the two streams for uniform heat transfer, and (5) long residence times. If feed flexibility allows, counter flow heat exchangers are more efficient than parallel flow devices.

For low capacity units, tubular heat exchangers are typically used. One fluid is passed through the inside of the tube while the other fluid is passed over its external surface. The tubes can either be coiled in a transverse plane with the other fluid, e.g., gas, crossing it axially, or a series of parallel longitudinal tubes can be arranged axially with the opposite fluid either passed axially or crosswise through the forest of tubes. For high mass throughput heat exchangers, tubular designs become less efficient. This may be due to having to use fewer than optimum large diameter tubes or having to use less tubes to limit pressure drops. These types of heat exchangers also incur high manufacturing costs for large numbers of small diameter tubes with low velocities to limit the pressure drop where large component envelope is required.

One approach for designing high mass throughput heat exchangers which overcome the above-noted limitations is to use pre-formed thin sheet stock, generally indicated at 2410, with side by side planes of opposite fluids in adjacent gaps. This improved design offers the benefits of (1) large surface area, (2) low pressure drop, (3) uniform mass distribution, (4) small fluid hydraulic diameter and (5) low manufacturing cost. The pre-formed stock 2410 is bent to assume a generally serpentine shape. This arrangement results in first fluid flow paths 2430 being formed to carry the first fluid as well as second fluid flow paths 2440 being formed to carry a second fluid. The first and second fluid flow paths 2430, 2440 are formed in an alternating pattern such that the first and second fluid flow paths 2430, 2440 are adjacent one another to permit heat transfer between the first and second fluids as they flow through the heat exchanger 2400.

The biggest challenge is the lowest cost method of blocking two ends 2431, 2441 of the pre-formed stock 2410 so as to form a fully operational, efficient heat exchanger. FIGS. 35 and 36 show one method, whereby two end plates 2450, 2460 are used. The end plates 2450, 2460 include inlet and outlet distribution feed systems for transferring and directing the fluids into the first and second fluid flow paths 2430, 2440.

FIG. 36 illustrates an effective yet low cost method of attaching the pre-formed stock 2410 to the end plates 2450, 2460. FIG. 36 is a cross-sectional view of a section of one of the end plates 2450, 2460. Retention channels 2470 are formed in a first surface 2459 of each of the end plates 2450, 2460 using any number of suitable techniques, which permit channels of precise dimensions to be formed in a substrate, such as end plates 2450, 2460. For example, suitable techniques for forming the retention channels 2470 include but are not limited to an end milling process, photo etching or other means for forming carefully tailored channels within the end plates 2450, 2460.

The retention channels 2470 are formed and spaced in a pattern, which is complementary to the dimensions and shape of the pre-formed stock 2410. This permits ends 2430, 2440 of the pre-formed stock 2410 to be easily aligned with and inserted into the retention channels 2470.

Braze material 2480 is packed into each of the retention channels 2470 to provide a material to bond the preformed stock 2410 to the end plates 2450, 2460. The braze material 2480 may be introduced into the retention channels 2470 in a number of different forms. For example, the braze material 2480 can be packed into the retention channels 2470 via foil, powder or slurry mixtures. The braze material 2480 is then exposed to a suitable treatment process to cause the bonding between the pre-formed stock 2410 and the end plates 2450, 2460. Typically the braze material 2480 is introduced to heat via an oven or other heating device and this heat causes the braze material 2480 to melt and flow and its re-cooling provides the bonding between the pre-formed stock 2410 and the end plates 2450, 2460.

The formation of retention channels 2470 and the use of braze material 2480 provide an effective and low cost method of sealing the ends 2431, 2441 of the pre-formed stock 2410. As the braze material is heated it flows around the surrounding components (the pre-formed stock 2410 and one of the end plates 2450, 2460) and creates a bond between therebetween when the heat is removed and it re-cools and hardens.

In another aspect, the end plates 2450, 2460 are attached to the pre-formed stock 2410 in two discrete processing steps. More specifically, two braze materials 2480 are used with one braze material 2480 having a sufficiently higher melting point than the other braze material 2480. In this embodiment, a first braze material is disposed in the retention channels 2470 of one of the end plates, for example end plate 2450, and then the pre-formed stock 2410 is inserted into the retention channels 2470. The end plate 2450 and at least the corresponding end of the pre-formed stock 2410 is placed into a heater or the like and is exposed to temperatures equal to or greater than the melting point of the first braze material. This results in the melting of the first braze material and the subsequent bonding between the pre-formed stock 2410 and the end plate 2450 upon re-cooling.

Once the end plate 2450 is securely attached to the one end of the pre-formed stock 2410, a second braze material is disposed in retention channels 2470 formed in the other end plate (in this case end plate 2460). The second braze material must have a melting point temperature sufficiently lower than the melting point temperature of the first braze material because typically, the complete heat exchanger 2400 will be placed into the heater (e.g., oven) and therefore the hardened first braze material is exposed to heat again. The heat exchanger 2400, including the end plate 2460 with the second braze material, is exposed to temperatures equal to or greater than the melting point temperature of the second braze material but less than the melting point temperature of the first braze material. Because the temperature of the heater is not permitted to reach the melting point temperature of the first braze material, the first braze material does not re-melt but instead is left intact.

When each of the end plates 2450, 2460 is attached to the pre-formed stock 2410, the respective end plate 2450, 2460 is preferably disposed during the heating operation so that the retention channels 2470 open upward so that the braze material 2480 will not flow down the sides of the pre-formed stock 2410. If the end plate 2450, 2460 is positioned oppositely in the heater, the braze material would have a tendency to flow by gravity down the sides of the pre-formed stock 2410 as soon as the braze material reaches its melting temperature. This is undesirable because it results in the braze material flowing out of the retention channels 2470, thereby increasing the likelihood that a weak bond will result between the pre-formed stock 2410 and the end plate 2450, 2460.

It will be appreciated by persons skilled in the art that the present invention is not limited to the embodiments described thus far with reference to the accompanying drawing. Rather the present invention is limited only by the following claims.

What is claimed:

1. A heat exchange platelet manifold for use in a Stirling engine, the manifold comprising, in combination:
   a housing; and
   a platelet member in said housing, wherein said platelet member is formed by a plurality of channeled platelet elements that are joined together, each of said channeled platelet elements having a plurality of heat exchange sections, wherein said platelet member defines a piston chamber.

2. The manifold of claim 1 wherein said platelet member further comprises a plurality of combustion chambers.

3. The manifold of claim 2 wherein said plurality of heat exchange sections comprises:
   a first heat exchange section having a plurality of working gas channels and a plurality of combustion gas channels, wherein working gas is heated by combustion gas present in said combustion gas channels;
   a second heat exchange section adjacent said first heat exchange section, said second heat exchange section having a plurality of working gas channels, wherein heat from said working gas is transferred to said platelet member; and
   a third heat exchange section adjacent said second heat exchange section, said third heat exchange section having a plurality of working gas channels and a cooling system having a coolant, wherein said working gas transfers heat to said coolant.

4. The manifold of claim 3 wherein said combustion chamber comprises:
   a plurality of air inlet channels;
   an ignition device; and
   a plurality of exhaust outlet channels.

5. The manifold of claim 4 further comprising a pre-heater disposed around said housing, said pre-heater accepting ambient air into a pre-heating space between said pre-heater and said housing, said pre-heating space in close proximity to said plurality of exhaust outlet channels, wherein air in said pre-heating space is directed into said combustion chamber.

6. The manifold of claim 5 wherein said cooling system is a closed loop cooling system, the system comprising:
   a plurality of coolant inlets in said housing;
   a plurality of coolant outlets in said housing; and
   a plurality of coolant channels in fluid communication with said coolant inlets and said coolant outlets, wherein said coolant channels are formed in said platelet elements.

7. A heat exchange manifold for use in a Stirling engine, the manifold comprising, in combination:
   a housing having first and second ends;
   a platelet member in said housing, said platelet member comprised of a plurality of platelets, and said platelet member defining a piston chamber, and said platelet member including a combustion chamber therein;
   a plurality of air inlet channels at said first end of said housing, said channels leading to said combustion chamber; and
   a plurality of exhaust outlet channels at said first end of said housing, said channels exhausting outside said housing.

8. The manifold of claim 7 wherein said platelet member further comprises a plurality of heat exchange sections, the sections comprising:
   a first heat exchange section having a plurality of working gas channels and a plurality of combustion gas channels, wherein working gas is heated by combustion gas present in said combustion gas channels;
   a second heat exchange section adjacent said first heat exchange section, said second heat exchange section having a plurality of working gas channels, wherein heat from said working gas is transferred to said platelet member; and
   a third heat exchange section adjacent said second heat exchange section, said third heat exchange section having a plurality of working gas channels and a cooling system having a coolant, wherein said working gas transfers heat to said coolant.

9. The manifold of claim 8 wherein said piston chamber comprises:
   a piston having a top end and a bottom end, said top end of said piston aligned toward said first end of said housing;
   a plurality of upper ports in said platelet member above said top end of said piston in said second heat exchange section, said upper ports allowing working gas to be admitted and expelled above said piston; and
   a plurality of lower ports in said platelet member below said bottom end of said piston in said third heat exchange section, said lower ports allowing working gas to be admitted and expelled below said piston
   wherein said working gas flows in a bi-directional manner in a closed path through said working gas channels.

10. The manifold of claim 9 wherein said heat exchange sections are oriented in a series configuration.

11. The manifold of claim 9 wherein said heat exchange sections are oriented in a parallel configuration.

12. A heat exchange manifold for use with a Stirling engine, the manifold comprising, in combination:
   a plurality of combustors;
   a plurality of platelets that are fused together to form a platelet stack heat exchanger, said platelet stack heat exchanger comprising:
      a first heat exchange section, wherein heat is transferred to a working gas, said working gas flowing in working gas channels through said first heat exchange section;
      a second heat exchange section, wherein heat from said working gas is transferred to said platelet stack heat exchanger; and
      a plurality of conduits for combustion gas flow from said combustors through said platelet heat stack exchanger, wherein said working gas channels and said plurality of conduits are proximate one another.

13. The manifold of claim 12 further comprising a secondary air injection system, wherein air is injected into said combustion gas flowing through said first heat exchange section.

14. A heat exchange system for use with a Stirling engine, comprising, in combination:
   a combustion device;
   a platelet working gas heat exchange plate proximate said combustion device;
   a platelet manifold adjacent said platelet working gas heat exchange plate;
   a platelet air injector, wherein ambient air is directed into air exiting said combustion device; and
   an exhaust manifold, wherein air traveling from said combustion device and said working gas heat exchange plate is directed to exhaust ports.

15. The system of claim 14 wherein said platelet manifold further comprises:
   a first heat exchange section, wherein heat is transferred between a working gas and a combustion gas; and
   a second heat exchange section comprising a regenerator, said regenerator having a plurality of passages therein, wherein heat is transferred to or from said working gas.

16. The system of claim 15 wherein said platelet working gas heat exchange plate is bonded to said platelet manifold.

17. The system of claim 16 wherein said platelet manifold is bonded directly to a displacer piston cylinder in the Stirling engine.

18. A multiple cylinder Stirling engine, comprising, in combination:
   a plurality of individual hot ends, each distinct from the other, one for each cylinder of said multiple cylinder Stirling engine, whereby each said individual hot end is associated with its own individual heat source, wherein each said individual hot end is a platelet hot end, the platelet hot end comprising:
      a plurality of platelets that are bonded together to form a platelet member, wherein said platelet member contains working gas channels and combustion gas channels, and said platelet member comprises a plurality of heat exchange sections.

19. A heat exchange system for use with a Stirling engine, comprising, in combination:
   a solar focusing unit;
   a platelet working gas heat exchange plate proximate said solar focusing unit; and
   a platelet manifold adjacent said platelet working gas heat exchange plate, wherein said platelet manifold further comprises:
      a first heat exchange section, wherein heat is transferred from said solar focusing unit to a working gas; and
      a second heat exchange section comprising a regenerator, said regenerator having a plurality of passages therein, wherein heat is transferred to or from said working gas.

20. The heat exchange system of claim 19 wherein said platelet working gas heat exchange plate comprises two discrete radial circuits.

21. The heat exchange system of claim 20 wherein said two discrete radial circuits are arranged in a swirl-like pattern in said platelet working gas heat exchange plate.

22. The heat exchange system of claim 20 wherein said two discrete radial circuits are arranged in a linear, spoke-like pattern in said platelet working gas heat exchange plate.

23. The heat exchange system of claim 20 wherein a face of said platelet working gas heat exchange plate comprises channels in its surface, wherein turbulent flow is created at said face.

24. A heat exchange manifold for use in a Stirling engine, comprising, in combination:
   a plurality of platelets that are joined together, said platelets defining:
      an air/fuel intake platelet zone;
      an air pretreat platelet zone;
      an air/fuel mixing platelet zone;
      a plurality of combustion platelet zones; and
      an expansion/compression platelet zone.

25. The heat exchange manifold of claim 24, wherein said air/fuel intake platelet zone further comprises:
   a plurality of fuel intake openings and fuel intake conduits;
   a plurality air intake openings and air intake conduits; and
   a plurality of exhaust ports and exhaust conduits;
   wherein each type of conduit is located at a different level in said air/fuel intake platelet zone such that crossover/interference is prevented.

26. The heat exchange manifold of claim 25 further comprising means to utilize solid, liquid, or gaseous fuel.

27. A heat exchange manifold for use in a Stirling engine, comprising, in combination:
   a plurality of platelets that are joined together, said platelets defining:
      a plurality of fuel intake openings;
      a plurality of air intake openings;
      a plurality of combustion chambers;
      a plurality of conduits to transport air and fuel from said air intake openings and said fuel intake openings to said combustion chambers;
      a plurality of exhaust outlets; and
      a plurality of exhaust conduits to transport exhaust gases from said combustion chambers to said exhaust outlets.

28. The heat exchange manifold of claim 27 wherein said plurality of platelets is coupled to a piston assembly of the Stirling engine, a seal formed therebetween, wherein said piston assembly includes a piston cylinder.

29. The heat exchange manifold of claim 28 wherein said plurality of platelets further defines a plurality of working gas conduits, said working gas conduits defined by a plurality of U-shaped bends, said U-shaped bends proximate said combustion chambers, wherein said working conduits transport working gas to and from said piston cylinder of the Stirling engine.

30. The heat exchange manifold of claim 29 wherein each of said working gas conduits is defined by a series of branched tortuous pathways, said tortuous pathways comprising a plurality of U-shaped bends, said U-shaped bends proximate said combustion chambers.

31. The heat exchange manifold of claim 29 wherein said plurality of platelets further defines a plurality of connecting conduits, said connecting conduits directing working gas to and from said working gas conduits.

32. The heat exchange manifold of claim 27 wherein said plurality of platelets further defines a plurality of combustion connector conduits, said combustion connector conduits connecting said combustion chambers to one another.

33. The heat exchange manifold of claim 32 further comprising ignition means to ignite a mixture of fuel and air present in said plurality of combustion chambers and in said combustion connector conduits.

34. The heat exchange manifold of claim 29 wherein said plurality of platelets defines a single monolithic structure, said single monolithic structure sealed to said piston assembly.

* * * * *